(12) United States Patent
Gabilondo et al.

(10) Patent No.: US 10,077,483 B2
(45) Date of Patent: Sep. 18, 2018

(54) METHOD AND SYSTEM FOR LASER HARDENING OF A SURFACE OF A WORKPIECE

(71) Applicant: ETXE-TAR, S.A., Elgóibar (Guipúzcoa) (ES)

(72) Inventors: Amaia Gabilondo, Guipúzcoa (ES); Jesús Domínguez, Guipúzcoa (ES); Carlos Soriano, Guipúzcoa (ES); José Luis Ocaña, Madrid (ES)

(73) Assignee: ETXE-TAR, S.A., Elgóibar (ES)

( * ) Notice: Subject to any disclaimer, the term of this patent is extended or adjusted under 35 U.S.C. 154(b) by 624 days.

(21) Appl. No.: 14/426,680

(22) PCT Filed: Aug. 29, 2013

(86) PCT No.: PCT/EP2013/067949
§ 371 (c)(1),
(2) Date: Mar. 6, 2015

(87) PCT Pub. No.: WO2014/037281
PCT Pub. Date: Mar. 13, 2014

(65) Prior Publication Data
US 2015/0211083 A1 Jul. 30, 2015

(30) Foreign Application Priority Data

Sep. 6, 2012 (EP) ..................................... 12382343
Jul. 19, 2013 (EP) ..................................... 13177323

(51) Int. Cl.
*B23K 26/06* (2014.01)
*C21D 1/09* (2006.01)
(Continued)

(52) U.S. Cl.
CPC .............. *C21D 1/09* (2013.01); *B23K 26/082* (2015.10); *B23K 26/0823* (2013.01); *C21D 1/06* (2013.01);
(Continued)

(58) Field of Classification Search
CPC .... B23K 26/082; B23K 26/0823; C21D 1/09; C21D 1/06; C21D 1/18
(Continued)

(56) References Cited

U.S. PATENT DOCUMENTS 3,848,104 A 11/1974 Locke
3,952,180 A 4/1976 Gnanamuthu
(Continued)

FOREIGN PATENT DOCUMENTS

| CN | 103215411 A | 7/2013 |
|---|---|---|
| CN | 103290176 A | 9/2013 |

(Continued)

OTHER PUBLICATIONS

International Preliminary Report on Patentability for corresponding application PCT/EP2013/067949 filed Aug. 29, 2013; dated Jan. 7, 2015.
(Continued)

*Primary Examiner* — Brian Jennison
(74) *Attorney, Agent, or Firm* — Cantor Colburn LLP

(57) ABSTRACT

Method of laser hardening of a surface area of a workpiece, such as a surface of a journal of a crankshaft, comprising: generating a relative movement between the surface of the workpiece and a laser source to allow a laser spot to subsequently be projected onto different portions of said surface area, and during said relative movement, repetitively scanning the laser beam (2) so as to produce a two-dimensional equivalent effective laser spot (5) on said surface area. The energy distribution of the effective laser spot is adapted
(Continued)

so that it is different in a more heat sensitive subarea, such as in an area adjacent to an oil lubrication opening, than in a less heat sensitive subarea, so as to prevent overheating of said more heat sensitive subarea.

59 Claims, 19 Drawing Sheets

(51) Int. Cl.
| | |
|---|---|
| C21D 9/30 | (2006.01) |
| C21D 1/06 | (2006.01) |
| C21D 1/34 | (2006.01) |
| F16C 3/06 | (2006.01) |
| F16C 41/00 | (2006.01) |
| B23K 26/08 | (2014.01) |
| C21D 1/18 | (2006.01) |
| C21D 6/00 | (2006.01) |
| C22C 38/00 | (2006.01) |
| G05B 19/18 | (2006.01) |
| B23K 26/082 | (2014.01) |
| B23K 101/00 | (2006.01) |

(52) U.S. Cl.
CPC .............. *C21D 1/18* (2013.01); *C21D 1/34* (2013.01); *C21D 6/00* (2013.01); *C21D 9/30* (2013.01); *C22C 38/00* (2013.01); *F16C 3/06* (2013.01); *F16C 41/008* (2013.01); *G05B 19/182* (2013.01); *B23K 2201/005* (2013.01); *C21D 2221/00* (2013.01); *Y10T 74/2173* (2015.01)

(58) Field of Classification Search
USPC ..................................................... 219/121.85
See application file for complete search history.

(56) References Cited

U.S. PATENT DOCUMENTS

| | | | |
|---|---|---|---|
| 4,313,771 A | 2/1982 | Lorenzo | |
| 4,797,532 A | 1/1989 | Maiorov | |
| 5,446,258 A | 8/1995 | Mordike | |
| 5,705,788 A | 1/1998 | Beyer | |
| 2002/0096503 A1 | 6/2002 | Hackel | |
| 2003/0080098 A1* | 5/2003 | Yamazaki | B23K 26/0626 219/121.62 |
| 2004/0108306 A1 | 6/2004 | Wiezbowski | |
| 2004/0244529 A1 | 12/2004 | Toplack | |
| 2008/0053384 A1* | 3/2008 | Haake | C21D 1/09 123/18 R |
| 2008/0229877 A1* | 9/2008 | Iwasaki | B23K 26/0066 74/595 |
| 2010/0126642 A1 | 5/2010 | Brenner | |
| 2012/0312159 A1* | 12/2012 | Liu | C21D 1/06 92/169.1 |

FOREIGN PATENT DOCUMENTS

| | | |
|---|---|---|
| CN | 103484653 A | 1/2014 |
| DE | 242358 A1 | 1/1987 |
| DE | 4018355 A1 | 6/1990 |
| DE | 291717 A5 | 7/1991 |
| DE | 4142216 A1 | 7/1991 |
| DE | 4241592 C1 | 12/1992 |
| DE | 4123577 A1 | 1/1993 |
| DE | 4126351 A1 | 11/1993 |
| DE | 4209938 C1 | 12/1993 |
| DE | 19853733 C1 | 2/2000 |
| DE | 102005005141 B3 | 6/2006 |
| DE | 102006031273 A1 | 1/2008 |
| DE | 102008020794 A1 | 8/2009 |
| DE | 10118291 C5 | 7/2010 |
| DE | 102009057390 A1 | 5/2011 |
| DE | 10261710 B4 | 7/2011 |
| DE | 10210048645 A1 | 4/2012 |
| EP | 3905551 A1 | 8/1990 |
| EP | 0698800 A1 | 2/1996 |
| EP | 0822027 B2 | 2/1998 |
| EP | 1308525 A2 | 5/2003 |
| EP | 1972694 A2 | 9/2008 |
| EP | 2309126 a1 | 4/2011 |
| JP | 59164817 U | 11/1984 |
| JP | 6158950 A | 3/1986 |
| JP | 03122212 A | 5/1991 |
| JP | 2003231914 A | 8/2003 |
| JP | 2004084931 A | 3/2004 |
| JP | 2008202438 A | 9/2008 |
| JP | 2012144768 A | 8/2012 |
| WO | 9118705 A1 | 12/1991 |

OTHER PUBLICATIONS

International Search Report for corresponding application PCT/EP2013/067949 filed Aug. 29, 2013; dated May 8, 2014.

F. Vollertsen, et al., "State of the art of Laser Hardening and Cladding", Proceedings of the Third International WLT-Conference on Lasers in Manufacturing 2005, Munich, Jun. 2005.

Hideki Hagino, et al, "Design of a computer-generated hologram for obtaining a uniform hardened profile by laser transformation hardening with a high-power diode laser", Precision Engineering 34 (2010) 446-452.

M. Seifert, et al., "High Power Diode Laser Beam Scanning in Multi-Kilowatt Range", Proceedings of the 23rd International Congress on Applications of Lasers and Electro-Optics 2004.

S M Shariff, "Laser Surface Hardening of Crankshaft", International Advanced research center for powder metallurgy and new materials (ARCI), SAE 2009-28-0053 Copyright 2009.

Shakeel Safdar, et al., "An Analysis of the Effect of Laser Beam Geometry on Laser Transformation Hardening", Journal of Manufacturing Science and Engineering, Aug. 2006, vol. 128, pp. 659-667.

German Search Report for corresponding application DE11 2013 004 368.8; Report dated Jul. 20, 2015.

German Office Action with English Translation for corresponding application DE11 2013 004 368.8; Report dated Jul. 20, 2015.

GB Office Action dated Jan. 5, 2016 re: Application No. GB1503822.7; pp. 1-5.

JP Office Action dated Oct. 4, 2016 re: Application No. 2015-530353; pp. 1-4.

JP Decision of Refusal dated Jun. 1, 2017 re: Application No. 2015-530353; pp. 1-3.

JP Decision of Rejection dated Jun. 6, 2017 re: Application No. 2015-530353; p. 1-2.

CN Office Action dated Nov. 6, 2017 re: Application No. 201580013179.7; pp. 1-23.

\* cited by examiner

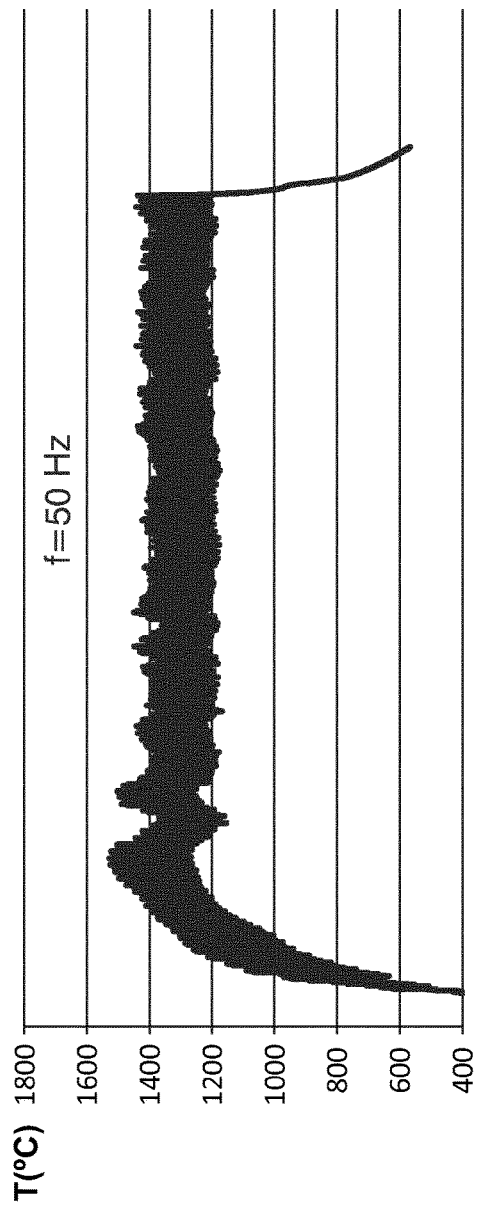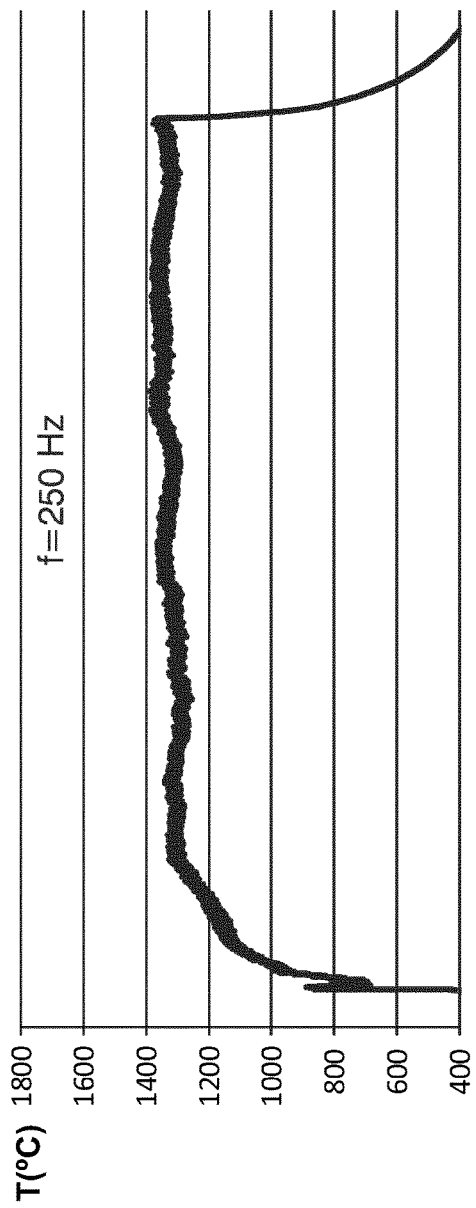

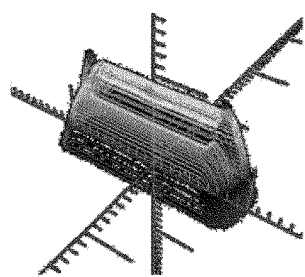 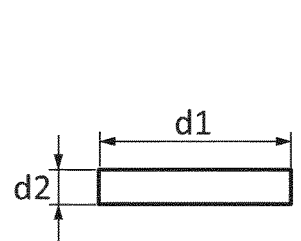 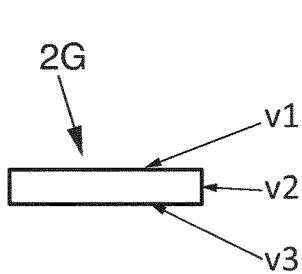
FIG. 16A　　FIG. 16B　　FIG. 16C
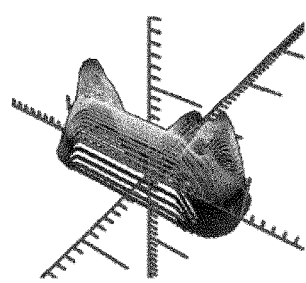 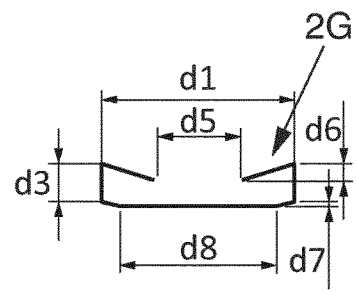 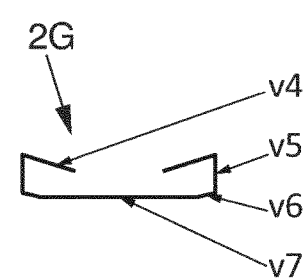
FIG. 17A　　FIG. 17B　　FIG. 17C
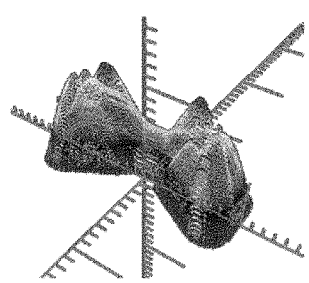 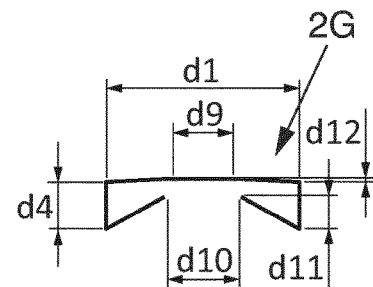 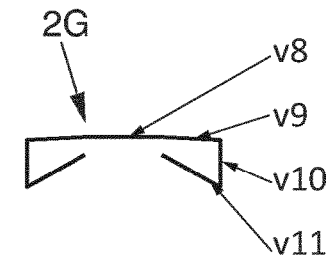
FIG. 18A　　FIG. 18B　　FIG. 18C

METHOD AND SYSTEM FOR LASER HARDENING OF A SURFACE OF A WORKPIECE

TECHNICAL FIELD

The present invention is related to the field of surface hardening of products of ferrous materials such as steel, for example, crankshafts, by laser.

STATE OF THE ART

It is well known in the art to harden ferrous materials, such as medium carbon steel, by heating the material to a high temperature, below its melting temperature, and subsequently quenching it, that is, cooling it rapidly enough to form hard martensite. Heating can take place in furnaces or by induction heating, and cooling can take place by applying a cooling fluid, such as water or water mixed with other components.

Often, it is only the surface that needs to be hardened. Surface hardening increases the wear resistance of the material and can sometimes also be used to increase fatigue strength caused by residual compressive stresses. Surface hardening can be useful for hardening surfaces that will be subjected to substantial wear when in use, for example, bearing surfaces, such as journal surfaces of crankshafts.

Laser surface hardening is a method of surface treatment in which high energy laser light is employed as a heat source to harden the surface of a substrate. It is known to use laser light to achieve surface hardening, cf., for example:

F. Vollertsen, et al., "*State of the art of Laser Hardening and Cladding*", Proceedings of the Third International WLT-Conference on Lasers in Manufacturing 2005 Munich, June 2005;

M. Seifert, et al., "*High Power Diode Laser Beam Scanning in Multi-Kilowatt Range*", Proceedings of the 23$^{rd}$ International Congress on Applications of Lasers and Electro-Optics 2004;

S. Safdar, et al., "*An Analysis of the Effect of Laser Beam Geometry on Laser Transformation Hardening*", Journal of Manufacturing Science and Engineering, August 2006, Vol. 128, pp. 659-667;

H. Hagino, et al., "*Design of a computer-generated hologram for obtaining a uniform hardened profile by laser transformation hardening with a high-power diode laser*", Precision Engineering 34 (2010), pp. 446-452;

U.S. Pat. No. 4,313,771-A;
DE-4123577-A1;
EP-1308525-A2;
EP-2309126-A1;
JP-2008-202438-A;
JP-S61-58950-A;
U.S. Pat. No. 4,797,532-A.

Using laser light for surface hardening involves several advantages: the laser beam is essentially independent of the workpiece, is easily controlled, requires no vacuum, and generates no combustion products. Also, as the laser beam generally only heats the metal product or workpiece locally, the rest of the workpiece can act as a heat sink, assuring rapid cooling, which is also known as self-quenching: the cold interior of the workpiece constitutes a sufficiently large heat sink to quench the hot surface by heat conduction to the interior at a rate high enough to allow martensite to form at the surface. Thus, the need for external cooling media, such as cooling fluids, can be obviated.

One problem involved with the use of laser light as the heat source in metal hardening processes is that the width of the hardening zone is limited by the dimensions of the laser spot. It is known to use optics to modify the shape of the spot, for example, to provide a substantially rectangular spot having a more or less uniform intensity distribution. As an alternative, scanning means (such as a scanning mirror associated with drive means) can be used to repetitively move the spot over the track, so that the heat source can be considered a rectangular source moving along the track.

In spite of its advantages, laser hardening is often not used because it is believed that the production rate will not be high enough for many practical applications of this technique, and because it difficult to achieve that all the parts that are to be heated will be heated to the desired extent. Correct heating is essential to make sure that hardening and tempering is achieved, with the necessary depths, but without causing damage by overheating.

For example, a crankshaft (the part of the engine that translates reciprocating linear piston motion into rotation) is a complex product that has often been conceived as difficult to harden by laser light. An example of a crankshaft is shown in FIG. 1. The crankshaft 1000 is a forged or casted steel product, having two or more centrally-located coaxial cylindrical journals 1001 (also known as the "main journals") and one or more offset cylindrical crankpin journals 1002 (also known as "rod journals"), separated by counterweights and webs that establish walls 1005 extending substantially perpendicularly to the surfaces of the journals. The complex shape of the product can make it difficult to correctly "scan" the surface with the laser beam; the tracks or areas to harden can have different widths and/or be asymmetric and/or be arranged in different planes (which is the case with the walls 1005 and the surfaces of the journals 1001 and 1002). Thus, today, high-frequency induction heating followed by a polymer-based water quench process is frequently used for the hardening of crankshafts. However, this process, although proven to be useful for achieving the desired hardening, involves certain drawbacks. For example, the inductors for creating heating by induction have to be designed in accordance with the specific design of the crankshaft, which reduces flexibility: to adapt an induction machine to a new kind of crankshaft can be time-consuming and costly. Further, heating by induction is costly in terms of the energy required to heat the crankshaft to the desired extent. Additionally, the cooling process is complex, costly and challenging from an environmental point of view, due to the use of large amounts of cooling fluid that are needed. Besides, parameters such as cooling fluid temperature and flow have to be carefully controlled to ensure a correct hardening process.

Thus, hardening using laser light as the heat source can be an attractive alternative in terms of flexibility, environmental-friendliness, energy consumption, and costs.

DE-10 2005 005 141-B3 discloses a method for laser hardening of the surfaces of the journals of a crankshaft. According to this method, a six-axis industrial robot is used to hold the crankshaft and to subsequently rotate it around the axis of the main journals and around the axes of the rod journals, during heating of the respective journals with laser light. Thus, by using the capacities of movement of the industrial robot, the distance between the laser source and the surface onto which the laser beam is projected can be kept constant.

Also US-2004/0244529-A1 teaches the use of laser to harden a small region of a crankshaft. In this case, laser light is used to harden a plurality of spaced portions, wherein the extent of the portions varies over the region to be hardened. As only a minor portion of the crankshaft is hardened with these spaced portions, there is no need to concern about overheating of other, more heat sensitive portions.

DE-3905551-A1 teaches a system for hardening of a surface of a crankshaft, where a laser beam is projected onto a crankshaft and wherein there is a relative movement between the beam and the crankshaft such that the beam will subsequently be projected onto different portions of the crankshaft. The power or power distribution in the beam is adapted depending on the geometry of the respective portion of the crankshaft and depending on the desired depth of penetration of the laser beam. A problem with the approach taught by DE-3905551-A1 is that it may not allow for a high production rate. To achieve a sufficient depth of the hardened layer (in the motor industry, typically hardening depths of at least 800, 1000, 1500, 2000 or even 3000 μm are required in terms of effective case depth, and it is often desired to have 100% transformed martensite until depths of 200 μm or more), it is not enough to raise the temperature of a certain portion of the surface, but energy has to applied for a sufficiently long time to heat not only the surface, but also the material under the surface, to a sufficient depth. As an excessive heating of the surface is not desired, to achieve the desired penetration the best solution is not to simply increase the amount of power of the laser beam, but rather the time during which the laser heating is applied to the relevant area. In the system disclosed in DE-3905551-A1, where the laser beam is kept stationary and applied to a specific area, obtaining an adequate heating and penetration over the major portions of the main journals or rod journals would appear to require substantial amounts of time. Thus, DE-3905551-A1 may describe a method appropriate for hardening very specific portions of the surface of a crankshaft, but not for hardening the general surfaces of the journals.

Also EP-1972694-A2 focuses on the hardening of specific portions of a crankshaft, namely, of the fillet portions, using one or more lasers. The laser light is directed onto the portion to be hardened and the crankshaft is rotated. The disclosed method can include a pre-heating step, a main heating step, and a post-heating step. It appears that the laser irradiation is maintained constant while rotation of the crankshaft takes place. EP-1972694-A2 is silent on the risk of overheating of more heat sensitive portions of the surface of the crankshaft.

US-2004/0108306-A1 acknowledges that automakers use the induction heating process to harden the bearings of a crankshaft, that is, the surfaces of the main journals and the rod journals, while a mechanical rolling process is utilized to roll the fillets to improve compressive stresses. However, according to US-2004/0108306-A1, these processes are said to be capital-intensive, time-intensive, lead to nonuniformities, and have a crack propensity in the oil lubrication holes that require a tempering process. US-2004/0108306-A1 teaches a fillet heat treatment by laser which aims at eliminating the need for the mechanical rolling process. Closed-loop temperature control by using an optical pyrometer is proposed. The use of a controllable x,y mechanism for maintaining a fixed heating distance between laser and fillet is proposed.

S. M. Shariff, et al., "*Laser Surface Hardening of a Crankshaft*", SAE 2009-28-0053 (SAE International), discusses the laser surface hardening of a crankshaft aiming at a hardened case-depth of above 200 μm with a hardness of 500-600 HV at different locations mentioned. The document mentions the problem of melting at the periphery of holes due to reduced heat-sink effect and accumulation of heat at the edge. It is stated that the problem can be dealt with by reducing the pre-heating effect at the hole-edge by choosing an appropriate start-up location and varying process parameters within the permissible range.

One reason for which laser hardening has not become more frequently used in the context of complex products such as crankshafts is that it is believed that it can be difficult to achieve a correct heating of the parts, that is, a sufficient heating to assure correct hardening (generally the hardened layer has to have an effective case depth of at least 800 μm or more, such as at least 1000, 1500, 2000 μm or more, and/or featuring 100% transformed martensite until a depth such as 200 μm or more) while avoiding overheating of sensitive portions. For example, in the case of a crankshaft such as the one of FIG. 1, care must be taken in what regards the heating of the journals in correspondence with the oil lubrication holes 1003 and optionally also in what regards the fillets 1004. For example, if a large laser spot is simply projected onto the surface of the journal during rotation of the journal to heat the entire surface, and if the rotation speed and the power of the laser beam are kept constant so that each portion of the surface receives the same amount of energy, and if this energy is sufficient to achieve an adequate heating of the major part of the surface to produce the desired hardening, the heating may become excessive at the edges of the oil lubrication holes, thus damaging said edges. The same can occur at the fillets, which are commonly undercut; thus, there are edges that can suffer damage if overheated.

DESCRIPTION OF THE INVENTION

A first aspect of the invention relates to a method of laser hardening of a surface of a journal of a crankshaft, said journal comprising a surface area to be hardened, said surface area extending in a first direction parallel with an axis of rotation (X) of the crankshaft and in a second direction corresponding to a circumferential direction (W) of the journal, said surface area comprising at least one more heat sensitive subarea and at least one less heat sensitive subarea, said at least one more heat sensitive subarea including an area adjacent to an oil lubrication hole of the crankshaft, the method comprising:

projecting a laser beam from a laser source onto said surface area, so as to produce an effective laser spot on said surface area, said effective laser spot extending, in said first direction, across the major part of said surface area to be hardened (such as across more than 50%, more than 75%, more than 85% or more than 90% or 95%, such as more than 99% or even 100%, and especially over the major part, if not over 100%, of the surface area to be hardened, for example, the surface area where an effective case hardening depth of, for example, at least 800 μm or more is desired);

generating a relative movement between the surface of the crankshaft and the laser source in said circumferential direction, so as to subsequently or progressively project the effective laser spot onto different portions of said surface area in the circumferential direction;

said effective laser spot featuring a two-dimensional energy distribution (in terms of how the energy or power of the laser beam is distributed within the effective laser spot).

The method further comprises adapting said energy distribution so that said energy distribution is different when heating said less heat sensitive subarea than when heating said more heat sensitive subarea including the area adjacent to an oil lubrication hole, so as to avoid overheating of said area adjacent to an oil lubrication hole. Thereby, by carrying out said adaptation, it is possible to achieve efficient and adequate heating of the surface area to be hardened, without overheating and damaging, for example, the edges of the oil lubrication holes.

In some embodiments of the invention, during at a substantial part (such as at least 50%, 75%, 90%, 95% or more) of the time of application of the effective laser spot onto the surface area, the effective laser spot has a width (or linear extension, along the curvature of the surface of the journal) in the circumferential direction of at least 5 mm, preferably at least 7 mm, more preferably at least 10 mm, and even more preferably at least 15 mm, 20 mm, 30 mm or more, such as at least 50 mm. Using a sufficient extension in the circumferential direction, that is, in the direction of the relative movement produced between the laser source and the surface of the journal, makes it possible to heat each portion of the surface area to be hardened for a sufficient time, while completing the hardening process within a reasonably short time. That is, a sufficient extension of the effective laser spot in the circumferential direction makes it possible to carry out the relative movement at a relatively high speed while achieving a sufficient penetration or hardening depth, without using excessively high temperatures. For this reason, a substantial width of the effective laser spot in the circumferential direction can be preferred. Of course, a balance has to be struck between the capacity in terms of power of the laser used, and the surface area covered by the effective laser spot, as the available power must be sufficient to provide sufficient heating of the area. It has been found that when working with automobile crankshafts having journals with widths in the order of one or a few cm in the first direction, and using lasers having an output power in the range of a couple of kW such as 3-4 kW, the effective spot can, for example, have a width in the circumferential direction in the order of 1 cm while the linear relative velocity between the laser and the surface of the journal can be in the order of 60 cm/minute. For many industrial purposes, it is considered that the laser beam should have a power of at least 3 kW, preferably more, such as 6 kW.

In some embodiments of the invention, said effective laser spot is an equivalent or virtual laser spot obtained by scanning the laser beam in the first direction and in the second direction, including directions in between these two directions, that is, directions that are oblique to the first and second directions, for example, along a straight or curved path or lines, repetitively following a scanning pattern along which the laser spot is displaced with a scanning speed, so that the two-dimensional energy distribution during a scanning cycle is determined by said scanning speed, said scanning pattern, size of the laser spot, power of the laser beam and power distribution within the laser beam. Thus, one or more of these parameters can be used to dynamically adapt the two-dimensional energy distribution. This makes it possible to easily adapt and modify the size and the shape of the effective laser spot, as well as the two-dimensional energy distribution within the effective laser spot, during the relative displacement between the laser source and the surface of the workpiece, that is, for example, during rotation of the crankshaft around its longitudinal axis, thereby adapting the two-dimensional energy distribution so as to avoid overheating of the more heat-sensitive subareas such as the areas adjacent to the oil lubrication holes. In some embodiments of the invention, adaptation of the energy distribution is carried out by adapting at least one of said scanning speed, scanning pattern, size of the laser spot, power of the laser beam and power distribution within the laser beam, so that said energy distribution is different when heating said less heat sensitive subarea than when heating said more heat sensitive subarea including the area adjacent to an oil lubrication hole, so as to avoid overheating of said area adjacent to an oil lubrication hole. In some embodiments of the invention, adaptation of the energy distribution is carried out by adapting the power of the laser beam, for example, by turning the laser beam on and off during scanning of the laser spot along the scanning pattern. For example, when using a laser such as a fiber laser, the laser beam can be switched on and off very rapidly, thus making it possible to obtain a desired energy distribution by turning the laser beam on and off while following the scanning pattern. Thus, heating can be achieved by turning the laser beam on during certain lines or parts of lines of the scanning pattern.

In some embodiments of the invention, the energy distribution is controlled, at least partly, by selectively adapting the power of the laser beam during scanning of the laser spot along the scanning pattern, so as to selectively set the laser beam into one of a plurality of available power states at least 300 times per second, more preferably at least 600 times per second, more preferably at least 1,000 times per second, more preferably at least 5,000 times per second, and even more preferably at least 10,000 times per second. The term "power state" refers to a state where the laser beam has a predetermined average power, so that different power states correspond to different power levels of the laser beam, such as, for example, 0 kW, 1 kW, 4 kW, 5 kW, 6 kW, 9 kW and 10 kW. For example, in some embodiments of the invention, there can be two power states, namely, an "on" state when the laser beam is on, and an "off" state when the laser beam is off, that is, with zero power (or close to zero power). However, any other available power state can be used, that is, also power states where the average power is higher than zero but less than the maximum power of the laser beam. For example, if the maximum power of the laser beam is 10 kW, there can be two power available states corresponding to 0 kW and 10 kW, and/or there can be available power states corresponding to intermediate values such as 2 kW, 4 kW, 5 kW, 6 kW and/or 8 kW. The expression "available" refers to the fact that the power states can be achieved with the laser equipment that is being used. The expression "set into" does not imply that there must be a real change in state so many times per second (for example, several adjacent segments may have the same power state assigned to them, so that there is no need to change the power of the laser when passing from one segment to the next one), but indicates that the laser is arranged to be able to change the power state so many times whenever appropriate, for example, following instructions provided by a control system. Thereby, a segmentation or "pixelization" of the energy distribution can be achieved with 300, 600, 1000, 5000 or 10000 segments or pixels per second, the laser beam having, during each segment or pixel or at least during a part of said segment or pixel, an average power as determined by the power state assigned to said segment or pixel. For example, when repetitively following a scanning pattern with a frequency of 50 Hz, the energy distribution along the scanning pattern can be determined by, for example, the power states assigned to 6, 12, 20, 100 or 200 segments or pixels distributed along the scanning pattern, corresponding to 300, 600, 1000, 5000 and 10000 segments or pixels per second, respectively. For the same pixels per second rates and for a scanning speed of 100 Hz, the energy distribution would be determined by 3, 6, 10, 50 and 100 segments or pixels of the scanning pattern, respectively. Generally, it is preferred to use at least 6 segments or pixels, that is, for example, the scanning pattern can comprise two rows each having three segments, each segment having a power state assigned to it. Obviously, when a change between different power states takes place, there can be transient periods during which the power of the laser beam differs from the power determined by the previous power state and the new power state, for example, the beam power can increase or decrease so that there is a slope in the power curve while transition from one segment to the next is taking place during scanning of the laser beam along the scanning pattern.

This approach, that is, the change of power of the beam at different segments or pixels of the scanning pattern, provides for high flexibility in the energy distribution and makes it easy to establish and dynamically modify the energy distribution, so as to avoid overheating of, for example, edges of oil lubrication holes. The segmented or pixelized approach also makes it easy to find appropriate energy distribution patterns by using trial-and-error tests, adapting the power states assigned to the different segments until an appropriate heating pattern is achieved. Switching between different power states can take place at high speed when adequate lasers are used, such as commercially available fiber lasers. Fiber lasers may be more costly than other available lasers, but can be advantageous due to the short time needed for controlled switching between, for example, an "on" and an "off" state, or between other power states/power levels. The on/off or off/on switching times of such lasers can be less than 1 ms, such as 0.1 ms or less.

In some of these embodiments of the invention, the scanning pattern can comprise a plurality of segments, each of said segments having, at a given moment, one of said available power states assigned to it. The power state assigned to at least one of said segments can be different during heating of said less heat sensitive subarea than during heating of said more heat sensitive subarea including the area adjacent to an oil lubrication hole, That is, the energy distribution can be dynamically adapted by modifying the power state assigned to certain segments or to all of the segments, for example, when the effective laser spot approaches an oil lubrication hole.

Alternatively or additionally, adaptation of the energy distribution can be (further) carried out by adapting the scanning speed during scanning of the laser spot along the scanning pattern. For a fixed laser beam power, a higher speed implies that less energy is applied, and vice-versa.

In some embodiments of the invention, scanning is carried out at a scanning speed sufficiently high so that the temperature oscillations at points within said effective laser spot have an amplitude of less than 200° C., preferably of less than 150° C., more preferably of less than 100° C., and even more preferably of less than 50° C., between a local maximum and the following local minimum of the temperature. In this context, the amplitude of the oscillations refers to the amplitude of the repetitive variations between local maxima and minima of the temperature curve, excluding the initial substantial heating to a maximum temperature at the leading edge of the effective laser spot and the subsequent cooling to a low temperature at the trailing edge of the effective laser spot. For an appropriate hardening, it is desirable that the metal rapidly reaches a sufficiently high temperature and that the metal subsequently stays at said sufficiently high temperature for a reasonable amount of time, without substantial fluctuations in said temperature, as such fluctuations may negatively affect the quality of the hardening. Scanning speeds of more than 10, 25, 50, 75, 100, 150, 200 or 300 Hz (i.e., repetitions of the scanning pattern per second) can be appropriate, to prevent the temperature of a heated spot to sink too much before the spot is re-heated by the laser beam during the next scanning cycle. Adequate hardening requires certain minimum temperatures and if a desired hardening depth is to be reached rapidly, high temperatures are preferred. However, excessive temperatures can negatively affect the quality due to, for example, grain size growth. Thus, a compromise temperature has to be found, and deviations from this temperature should be as small as possible. Thus, a high scanning speed in terms of cycles per second can be preferred to reduce the amplitude of the temperature fluctuations or oscillations.

In some embodiments of the invention, the energy distribution in said effective laser spot is such that more energy is applied towards the ends of the effective laser spot in said first direction, than towards the center of said effective laser spot in said first direction. It has been found that due to the way in which thermal energy is absorbed and distributed in the crankshaft, applying more energy towards the lateral ends of the effective laser spot is helpful to obtain a substantially uniform thickness of the hardened layer, that is, a substantially rectangular cross section rather than a cross section where the hardened layer is very thin towards said lateral ends and slowly increases, following a curve, towards its center. However, care should be taken to avoid overheating of undercuts or fillets at the ends of the journal.

In some embodiments of the invention, said energy distribution features a higher energy density at a leading portion or edge of said effective laser spot than at a trailing portion or edge of said effective laser spot, such that an area swept by the effective laser spot is first receiving laser irradiation with higher average power and is subsequently receiving laser irradiation with lower average power. This increases efficiency in that an appropriate temperature for hardening is reached rapidly, so as to reduce the time during which the effective laser spot has to be applied to a certain area in order to achieve a required hardening depth. Thus, it takes less time to complete the hardening of, for example, the surface of a journal.

In some embodiments of the invention, the method comprises the step of applying the effective laser spot to said surface area on both sides of an oil lubrication hole in said first direction, said oil lubrication hole extending inwards in an inclined manner so that it does not extend under a first one of said sides but under a second one of said sides, wherein the effective laser spot is adapted to apply more energy onto the first one of said sides than onto the second one of said sides. Due to the presence of the oil lubrication hole under the second one of said sides, the heat sink effect is lower at said side. Therefore, less energy should preferably be applied there than on the other side, where the absence of such oil lubrication hole allows for a better dissipation of heat. In this way, the use of heating energy is optimized and the risk for overheating minimized. That is, according to these embodiments of the invention, attention is not only paid to the surface to be hardened, but also to the sub-surface structure of the workpiece in correspondence with the oil lubrication holes.

In some embodiments of the invention, the effective laser spot has a first shape in said less heat sensitive subarea, and is adapted to have substantially a U shape when arriving at an oil lubrication hole, and to have substantially an inverted U shape when leaving said oil lubrication hole, or vice-versa, and wherein said first shape optionally is a substantially rectangular or triangular shape. The terms "U" and "inverted U" refer to the situation when the oil lubrication hole is approaching "from above". Basically, a substantially rectangular, trapezoidal or triangular effective laser spot, appropriate for providing a rather homogenous heating across the surface of the journal, may not be appropriate for heating around the oil lubrication hole. Therefore, the effective laser spot can be given a substantial "U" shape (including a "V" shape or similar) for receiving the oil lubrication hole without substantially heating it or its edges directly, and can then inverted, so as to allow the oil lubrication hole to exit without the oil lubrication hole or its edges being heated directly by the effective laser spot. The change in the shape of the effective laser spot can be achieved by modifying the shape of the scanning pattern and/or by changing the power state assigned to one or more parts or segments of the scanning pattern. For example, when using a scanning pattern comprising a plurality of lines each made up of a plurality of segments, a "U"-shaped effective laser spot can be achieved by changing the power state assigned to one or more of the segments in the center portion of one or more lines, for example, by assigning an off-state to said segments, or by assigning to said segments a power state corresponding to a low level of power of the laser beam.

A further aspect of the invention relates to a method of laser hardening of a surface of a journal of a crankshaft, said journal comprising a surface area to be hardened, said surface area extending in a first direction parallel with an axis of rotation of the crankshaft and in a second direction corresponding to a circumferential direction of the journal, said surface area comprising at least one more heat sensitive subarea and at least one less heat sensitive subarea, said at least one more heat sensitive subarea including an area adjacent to an oil lubrication hole, the method comprising:

projecting a laser beam from a laser source onto said surface area;

generating a relative movement between the surface of the crankshaft and the laser source in said circumferential direction, so as to subsequently project the laser beam onto different portions of said surface area in the circumferential direction, so as to harden a circumferential segment of the surface area to be hardened;

and displacing the laser beam in said first direction, so as to increase the extension of said circumferential segment in said first direction, until hardening of said surface area to be hardened has been completed.

The method comprises adapting the manner in which energy is applied onto said crankshaft by said laser beam in synchronization with the relative movement between the laser source and the surface of the crankshaft so as to apply less energy in correspondence with said more heat sensitive subarea including an area adjacent to an oil lubrication hole, than in said less heat sensitive subarea, so as to avoid overheating of said area adjacent to an oil lubrication hole.

According to this aspect of the invention, the hardening of the surface area is carried out so that hardening takes place first at one end of the surface area in said first direction, and subsequently extends towards the other end of the surface area to be hardened, until the entire surface area has been hardened. An advantage with this method is that at the end of the hardening, there is no overlap with an already hardened area. This reduces the risk for problems associated with re-heating and excessive tempering of an already hardened area.

In some embodiments of the invention, the step of generating a relative movement between the surface of the crankshaft and the laser source in said circumferential direction includes rotating the crankshaft at a high speed, such as at a speed of more than 3000 rpm or 6000 rpm. This can help to avoid substantial fluctuations of temperature within the area currently being subjected to heating.

In some embodiments of the invention, the method comprises the step of simultaneously applying more than one laser beam onto said surface area, so as to simultaneously heat, with respective effective laser spots, a plurality of sections or sectors, in the circumferential direction, of a circumferential segment of the journal. For example, two laser beams from opposite sides of the journal can simultaneously illuminate and thus heat two sections or sectors, each of up to 180 degrees of a circumferential or annular segment of the journal. Thereby, a lower rotational speed of the crankshaft is needed in order to prevent substantial temperature oscillations within the heated region, compared to the case in which only one laser beam is used to heat only one such section or sector.

In some embodiments of the invention, the method comprises the step of applying energy for heating said surface area on both sides of an oil lubrication hole in said first direction, said oil lubrication hole extending inwards in an inclined manner so that it does not extend under a first one of said sides but under a second one of said sides, wherein the method comprises applying more energy onto the first one of said sides than onto the second one of said sides. Thereby, the use of energy is optimized and the risk for overheating is minimized, as explained above.

In some embodiments of the invention, the method comprises the step of providing movement of the effective laser spot in the circumferential direction of the journal (by moving the laser beam and/or the crankshaft, for example, by rotating the crankshaft around its longitudinal axis) at a first speed so as to repetitively heat a circumferential portion of said journal, and moving the effective laser spot in said first direction at a second speed lower than said first speed, thereby heating new circumferential portions while allowing previously heated circumferential portions to cool down so as to provide for self-quenching, so as to progressively increase the size of a hardened circumferential segment of the journal. That is, by the rapid relative movement between the effective laser spot and the surface of the journal in the circumferential direction, an annular segment of the journal can be heated to a desired hardening temperature and kept at said temperature for a sufficiently long time without excessive oscillations in the temperature, so as to provide for hardening, and due to the movement in the first direction, the hardened segment is expanded in said first direction until completing the hardening of substantially the entire surface of the journal.

In some embodiments of the invention, the effective laser spot is projected onto the journal in an off-centered manner. This can help to make the laser spot larger, which is sometimes useful to better distribute the heat. Also, this approach can be useful as a leading edge of the laser spot can have a higher power density than a trailing edge, due to different angles of incidence of the laser beam onto the surface at the leading edge and at the trailing edge of the laser spot. As explained herein, this can shorten the heating time needed for the surface to reach a desired temperature. This approach can, for example, be used in combination with fixed optics providing a substantially square or rectangular laser spot. Off-centering the laser beam also involves the advantage of reducing the risk for damages or faults due to back reflections.

A further aspect of the invention relates to a method of laser hardening of a surface of a workpiece, the workpiece comprising at least one surface area to be hardened, said surface area comprising at least one more heat sensitive subarea and at least one less heat sensitive subarea, the method comprising:

projecting a laser beam from a laser source onto said surface area, so as to produce a laser spot on said area;

generating a relative movement between the surface of the workpiece and the laser source, thereby allowing the laser spot to subsequently be projected onto different portions of said surface area;

during said relative movement, repetitively scanning the laser beam across the respective portion of said surface area in two dimensions so as to produce a two-dimensional equivalent or virtual effective laser spot on said surface area, said effective laser spot having an energy distribution;

wherein said energy distribution is adapted so that it is different in a more heat sensitive subarea than in a less heat sensitive subarea, so as to prevent overheating of said more heat sensitive subarea.

In some embodiments of the invention, the method comprises scanning the laser beam along a scanning pattern within said effective laser spot and modifying the power of the laser beam along said scanning pattern so as to obtain said energy distribution, optionally by turning the laser beam on and off along said scanning pattern.

In some embodiments of the invention, the energy distribution is controlled by selectively adapting the power of the laser beam during scanning of the laser spot along the scanning pattern, so as to selectively set the laser beam into one of a plurality of available power states at least 300 times per second, more preferably at least 600 times per second, more preferably at least 1,000 times per second, more preferably at least 5,000 times per second, and even more preferably at least 10,000 times per second. For example, the scanning pattern can comprise a plurality of segments, each of said segments having one of said available power states assigned to it, and the power state assigned to at least one of said segments can be selected to be different in the less heat sensitive subarea than in the more heat sensitive subarea. That is, the power states assigned to one, some or more of the segments can be dynamically modified during the process in order to avoid overheating of, for example, edges of the oil lubrication holes, or excessive re-heating of an already hardened portion of a journal, etc.

As explained above, the term "power state" refers to a state where the laser beam has a predetermined average power, such as "on" or "off" or a power level between the maximum and zero (or close to zero). The expression "available" refers to the fact that the power states can be achieved with the laser equipment that is being used. The expression "set into" does not imply that there must be a real change in state so many times per second, but indicates that the laser is arranged to be able to change the power state whenever appropriate, for example, following instructions provided by a control system. Thereby, a segmentation or "pixelisation" of the energy distribution can be achieved with 300, 600, 1000, 5000 or 10000 segments or pixels per second. For example, 300 segments per second can accommodate a scanning pattern having six (6) segments at a scanning frequency of 50 Hz. As explained above, when a change between different power states takes place, there can be transient periods during which the power of the laser beam differs from the power determined by the previous power state and the new power state, for example, the beam power can increase or decrease so that there is a slope in the power curve while transition from one segment to the next is taking place during scanning of the laser beam along the scanning pattern.

The higher the capacity of the laser of switching between different power states, the larger the number of segments or pixels that can be used to create the scanning pattern, for a given scanning frequency. For example, in the case of a laser source that allows for a switching between power levels at a speed of 1000 times per second, a scanning frequency of 100 Hz can be used with a scanning pattern comprising 10 segments, to each of which a desired power state can be assigned and adapted during operation to prevent overheating of heat sensitive portions such as the edges of the oil lubrication holes of crankshafts.

In some embodiments of the invention, the method comprises the step of using a different scanning pattern for the laser beam within said effective laser spot, in said more heat sensitive subarea compared to in said less heat sensitive subarea.

In some embodiments of the invention, the method comprises the step of adapting said energy distribution by adapting the scanning speed so that it is different in at least part of said effective laser spot, in said more heat sensitive subarea compared to in said less heat sensitive subarea.

In some embodiments of the invention, said effective laser spot comprises a leading portion with an energy distribution and density selected for heating a surface portion of the workpiece to a hardening temperature, an intermediate portion with an energy distribution and density (such as a very low energy density, such as zero power or close to zero power) selected so as to allow for cooling down of a heated surface portion for quenching, and a trailing portion having an energy distribution and density selected for heating the quenched portion so as to produce tempering thereof. Generally, many workpieces such as crankshafts require, in addition to hardening thereof, tempering so as to reduce hardness, enhance ductility and reduce brittleness. For tempering, the workpiece is to be heated to a temperature that is generally lower than the temperature used for hardening. When a workpiece has been hardened using a laser treatment, tempering can take place in a furnace or oven, but it is also possible to temper it applying a laser treatment similar to the one used for hardening, but with a different energy density and/or distribution. For example, in the case of a crankshaft, tempering can take place by applying a tempering cycle after the hardening cycle. For example, after hardening 360 degrees of a journal, the effective laser spot can once again be moved around or along the journal, this time for tempering it. However, it is also possible to provide for hardening and tempering in the same cycle or process step, by using an effective laser spot including: a leading portion for heating the surface of the workpiece to a desired hardening temperature and for maintaining the surface at said temperature for a sufficient time so as to obtain the desired hardening depth; an intermediate portion with a low energy density, such as an energy or power density of substantially 0 W/cm$^2$, so as to allow the heated portion to cool down so as to produce quenching or self-quenching thereof; and a trailing portion having an energy distribution and density so as to re-heat the quenched portion to the extent necessary for tempering as desired. In this way, to produce both quenching and tempering it can be enough to let the effective laser spot sweep the surface to be treated once, for example, in the case of a surface of a journal of a crankshaft, by rotating the crankshaft once around its axis of rotation.

In some embodiments of the invention, the effective laser spot is established by repetitively scanning the laser beam over the workpiece following a pattern comprising a plurality of lines such as straight or curved lines, wherein said lines are preferably substantially parallel, and wherein the scanning is repeated with a scanning frequency, and wherein each of said plurality of lines comprises a plurality of segments or pixels, the method comprising assigning a predetermined laser beam power value to each of said segments so as to selectively set the output power of the laser beam to a different level within some of said segments compared to other of said segments. Assigning laser beam power to the segments can include specifying that the laser beam should be "on" for selected ones of said segments and "off" for other ones of said segments, which can be achieved by switching the laser on and off during the scanning. Thus, a pixelized energy distribution is easily achieved. This approach can be useful to provide a desired energy distribution that can easily be varied while the effective laser spot is swept along the surface to be heated, for example, by rotating the workpiece around an axis. In some embodiments of the invention, this scanning frequency is at least 50 Hz (so that the laser beam is scanned to complete the virtual laser spot at least 50 times per second) and preferably at least 100 Hz, and said plurality of lines comprise at least two lines, preferably at least 3 lines, more preferably at least 4 lines, such as 5-10 lines, and each line comprises at least 3 segments, preferably at least 5 segments, and more preferably at least 10 segments, such as 10-20 segments. This kind of arrangement can be appropriate for establishing a desired energy distribution, with sufficient detail and with a sufficient frequency so as to avoid substantial temperature fluctuations of a spot within the scanning pattern during a scanning cycle. The use of lasers such as fiber lasers allowing for rapid on-off switching makes it possible to achieve a large number of segments or pixels also at relatively high scanning frequencies, such as at scanning frequencies above 50 Hz. Each segment can have a beam power state assigned to it, indicative of the intended power of the laser beam during said segment or part of it, and the power states assigned to the segments can be dynamically modified during the hardening process so as to, for example, avoid overheating of more heat sensitive subareas. That is, by adapting the power states assigned to the segments, the energy distribution of the effective laser spot can be adapted.

In the different aspects of the invention described above that include scanning of the laser beam or laser spot along and/or across a portion of the workpiece, this scanning can be carried out so that the laser spot repetitively follows a scanning pattern comprising a plurality of segments, and wherein at least one parameter value influencing said two-dimensional energy distribution is associated with each of said segments, for example, stored in a memory of a control system so as to be used to adapt the operation in correspondence with the respective segment each time the laser spot is moved along said segment. Said at least one parameter value can be dynamically adapted during operation so that said at least one parameter value is different for at least one of said segments when the effective laser spot is heating said more heat sensitive subarea than when heating said less heat sensitive subarea. For example, for a given segment different parameter values (or combinations of parameter values) can be stored in different memory locations, and depending on the subarea that is being heated, the parameter value can be withdrawn from one memory location or from another memory location. However, this is just an example, and also other implementations are within the scope of the invention. The use of a segmented scanning pattern has been found to make it easy to find and implement an energy distribution that is adapted to the specific design of a crankshaft. By adapting one or more parameters that influence the two-dimensional energy distribution, it is easy to modify the energy distribution in order to, for example, apply less power/energy in correspondence with more heat sensitive portions of the workpiece, such as the area around the edges of an oil lubrication hole of a crankshaft. Thus, an operator can, by assigning different values to certain parameters in correspondence to each segment, define different energy distributions, and by switching between different energy distributions during the hardening of a portion of a workpiece, such as the surface of a journal of a crankshaft, an adequate hardening can be achieved while avoiding local overheating of heat sensitive portions. The use of a segmented scanning pattern and the assignment of the parameter values on a per segment basis, makes it easy to find appropriate values, for example, with a few trial-and-error tests. For example, to accommodate for an oil lubrication hole, the values assigned to certain segments can be selected to reduce the energy applied adjacent to said oil lubrication holes, when the effective laser spot arrives at the corresponding subareas of the workpiece.

The parameter values can be indicative of at least one of scanning speed, size of the laser spot, power of the laser beam, power distribution within the laser beam, length of the corresponding segment and orientation of the corresponding segment. In many embodiments of the invention, the power of the laser beam and/or the scanning speed can be preferred parameters. The choice of parameter can depend on factors such as the speed with which the laser beam can be switched between different power levels, such as on/off or between different intermediate power levels, and on the extent to which the scanning system allows for rapid and controlled changes in the scanning speed on a segment by segment basis. When lasers are used that allow for rapid and controlled change of the output power, the power of the laser beam can advantageously be used as at least one of the parameters that determines the energy distribution.

The method can comprise the step of storing, for each segment, the corresponding at least one parameter value in a memory, wherein for at least one segment at least two different values are stored in said memory, a first one to be used when heating said less heat sensitive subarea and a second one to be applied when heating said more heat sensitive subarea. Thus, the parameter values corresponding to different two-dimensional energy distributions can be stored in different memory locations, and depending on whether a more heat sensitive or a less heat sensitive subarea is being heated, the control systems uses the parameter values of one memory location or the other. Thus, when adapting the system and method to a new kind of crankshaft, the operator can design a set of different energy distributions by designing the scanning pattern and the parameter values, for example, designing a first energy distribution to be used during the major part of the heating of a journal of a crankshaft, a second energy distribution to be used when the effective laser spot approaches the subarea with an oil lubrication hole, and a third energy distribution to be used when the effective laser spot leaves the subarea with the oil lubrication hole. The two-dimensional energy distribution patterns can thus easily be adapted to take into account, for example, the width of the journal and the size and/or location of an oil lubrication hole.

Scanning can, for example, be carried out at an average speed of at least least 300 segments per second, preferably at least 600 segments per second, more preferably at least 1,000 segments per second, more preferably at least 5,000 segments per second, and even more preferably at least 10,000 segments per second. A high scanning speed can be preferred to repeat the scanning pattern at a high frequency so as to avoid, on the one hand, substantial temperature fluctuations between each scanning cycle in the area being heated, while allowing for a sufficiently high number of segments so as to provide for flexibility in the two-dimensional energy distribution. For example, with a scanning speed of 300 segments per second, a scanning pattern having six segments or pixels can be repeated with a frequency of 50 Hz. A high number of segments or pixels can be useful to increase the possibilities of adapting the energy distribution as much as possible to the characteristics of the surface being hardened, whereas a high frequency of repetition of the scanning pattern reduces the risk for undesired temperature fluctuations within the area being heated, between each scanning cycle.

In some embodiments of the aspects of the invention described above, the method comprises the step of reducing the energy density at a leading portion of the effective laser spot when the effective laser spot is arriving at a previously hardened portion of said surface area, such as at a previously harden portion of a journal of a crankshaft hardened by displacing the effective laser spot around the journal in a circumferential direction. Thereby, undue heating of an already heated and hardened portion of the journal can be prevented. In some embodiments of the invention, power/energy density at the leading edge of the effective laser spot is merely reduced but the effective laser spot continues traveling, for example, around the journal in the circumferential direction, so as to reheat the hardened portion to a certain extent, for the purpose of tempering it. In other embodiments of the invention the method comprises the step of, when the effective laser spot is arriving at a previously hardened portion of said surface area, such as at a previously hardened portion of a journal of a crankshaft hardened by displacing the effective laser spot around the journal in a circumferential direction, interrupting the movement of said effective laser spot at a leading portion of said effective laser spot, whereas a trailing portion of said effective laser spot continues to move in said circumferential direction, thereby progressively reducing the size of said effective laser spot in said circumferential direction, until said effective laser spot vanishes. That is, the effective laser spot substantially stops when arriving at the previously hardened portion, that is, for example, the leading edge stops and the trailing edge catches up with the leading edge, completing the hardening cycle.

In both cases, the implementation of the method can be substantially facilitated if the effective laser spot is composed of segments, such as segments of a scanning pattern. The reduction or cancellation of the effective laser spot starting at its leading edge can be achieved by adapting the energy density at said segments, such as by reducing the power of the beam and/or increasing the scanning speed, and/or by simply cancelling or re-arranging segments. Thus, the segmented approach in combination with the use of bi-dimensional scanning of the laser beam to create the effective laser spot, provides for flexibility and makes it easy for the skilled person to handle, for example, in the case of laser hardening of journals of crankshafts in the circumferential direction, the arrival of the effective laser spot at the previously hardened portion of the track.

A further aspect of the invention relates to a method of laser hardening of a surface of a workpiece, such as a workpiece of medium carbon steel, for example, a crankshaft; the reference to "a surface" does not mean that the entire surface has to be hardened; for example, in the case of a crankshaft, it can be enough that parts of the surface, for example, the surfaces of one or more journals, and/or of walls adjacent to the journals, be hardened.

The workpiece comprises at least one surface area to be hardened (for example, the surface of one or more main journals and/or one or more rod journals of the crankshaft, and/or wall surfaces of the crankshaft), said surface area comprising at least one more heat sensitive subarea (for example, in the case of a crankshaft, the area immediately around an oil lubrication hole, and/or the area close to the edge of an undercut fillet; here, the absence of material reduces the heat sink capacity and implies an increased risk for overheating; also, the sharp edges are more likely to be damaged by overheating than the smooth and regular surface of the rest of the journal) and at least one less heat sensitive subarea (for example, in the case of a crankshaft, the part of the surface of the journal that is more remote from said oil lubrication hole and/or from said undercut fillet, where the absence of edges and voids implies a reduced risk of overheating).

The method comprises:

projecting a laser beam from a laser source onto said surface area, so as to produce a laser spot on said area;

generating a relative movement between the surface of the workpiece and the laser source (for example, by rotating the workpiece around an X axis and/or displacing the workpiece and/or the laser source along a Y and/or Z axis, perpendicular to said X axis), thereby allowing the laser spot to subsequently be projected onto different portions of said surface area (that is, depending on the relative position between workpiece and laser source in accordance with, for example, said X, Y and Z axes, at each moment the laser source, in combination with scanning means, can direct the laser spot onto a certain portion or section of said surface area, for example, and depending on whether the scanning means provide for one dimensional or two dimensional movement, onto a line of said area having a thickness corresponding to the diameter, length or width of the laser spot, or onto a, for example, substantially rectangular section of the area);

during said relative movement, scanning the laser beam across the respective portion of said area. The scanning can be performed in one dimension only, for example, in parallel with an axis of rotation of the workpiece and/or perpendicularly to the direction of movement of the surface of the workpiece in relation to the position of the laser source, or in two dimensions, thus, following a path or pattern such as a rectangular pattern, an oval pattern, a triangular pattern, a trapezoidal pattern, an hexagonal pattern, an octagonal pattern, etc., or filling an area outlined by such a pattern, for example, by carrying out a meandering or triangular scanning back and forth along and/or across said portion, or by scanning the laser beam along a plurality of lines, such as substantially parallel lines. The term "scanning the laser beam" should be interpreted to mean that the laser beam itself is displaced, using some kind of optical scanning means or similar, such as one or more scanning mirrors.

The scanning is performed so that the laser spot follows a scanning pattern or path on the surface area.

According to this aspect of the invention, at least one of
(i) a scanning speed; and/or
(ii) a laser beam power; and/or
(iii) a laser spot size;
is different in one part of the scanning pattern than in another part of the scanning pattern, so as to avoid (or reduce the risk for) overheating of the workpiece in the more heat sensitive subarea.

Thus, in the more heat sensitive subarea, the scanning speed can be higher, and/or the laser beam power can be reduced, and/or the laser spot area can be larger—something that can be achieved by, for example, moving a focusing lens-, than in the less heat sensitive subarea, so as to reduce the amount of energy per unit of surface area that is transferred to the workpiece in said more heat sensitive area, compared to in said less heat sensitive area.

In some embodiments of the invention, said scanning pattern comprises a plurality of segments, and to each of said segments, there is assigned
  (i) a scanning speed; and/or
  (ii) a laser beam power; and/or
  (iii) a laser spot size;
at least one of said scanning speed, laser beam power, and laser spot size being selected differently in relation to at least one of said segments compared to at least another of said segments.

The segments can be straight or curved, and can form a polygon or any other geometrical figure. They can form a closed curve repeatedly followed by the laser spot during scanning, or an open curve that can repeatedly be followed in both directions by the laser spot. The segments can be short and can even include points at which the laser beam can be chosen to stand still for a certain amount of time. Thus, by assigning, to each segment, at least one value of a parameter that has an influence of the energy transfer to the surface during scanning, an adequate distribution of the heat transfer and heating can be achieved. For example, in a scanning system controlled by a computer, this approach makes it easy for an operator to try different energy transfer profiles along the scanning pattern, and by trial and error arrive at an appropriate one for a specific product, such as for a specific crankshaft. Also, this approach can easily be implemented in a computerized simulation system, so that one can experiment with different energy transfer profiles, modifying the scanning speed, laser beam power and/or laser spot size for one or more segments, and even modifying the geometrical layout of the scanning pattern, until arriving at something that provides adequate heating of the workpiece. Computer input means can be provided that allow for the variation of the scanning pattern (for example, by adjusting the length of the segments), and/or the scanning speed, and/or the laser beam power and/or the laser spot size. Of course, also additional parameters can be incorporated.

For example, the scanning speed can be selected to be higher in a segment that is closer to a more heat sensitive subarea than in two adjacent segments that are further away from said heat sensitive subarea. For example, in the case of a crankshaft, the scanning speed can be selected higher for one or two segments that will actually cross the oil lubrication hole(s) at some stage of the process, than for the adjacent segments. Using different scanning speeds for different segments along the path followed by the laser spot has the advantage of being easily implemented with commercially available scanning means.

In some embodiments of the invention, the laser beam power is selected to be lower in a segment that is closer to a more heat sensitive subarea than in two adjacent segments that are further away from said heat sensitive subarea. For example, in the case of a crankshaft, the scanning speed can be selected higher and/or the laser beam power can be selected lower at one or two segments that will actually cross the oil lubrication holes—or be crossed by the oil lubrication holes—at some stage of the process, than at the adjacent segments.

In some embodiments of the invention, the laser spot is selected to have a larger area in a segment that is closer to a more heat sensitive subarea, than in two adjacent segments that are further away from said heat sensitive subarea. Thus, by "defocusing" during a certain part of the path followed by the laser beam, the power concentration per unit of surface area will become less, which can be useful to avoid overheating of small heat sensitive areas, such as those corresponding to the oil lubrication holes of crankshafts.

In some embodiments of this aspect of the invention,
  (i) scanning speed; and/or
  (ii) laser beam power; and/or
  (iii) laser spot size;
assigned to one or more of the segments is/are modified at least once while the surface of the workpiece is moving in relation to the laser source, for example, each time the pattern or segment arrives at or leaves a more heat sensitive subarea. Thus, for example, the scanning speed, and/or the laser beam power, and/or the laser spot size, corresponding to one or more segments of the pattern, can be modified during the process, for example, when one or more of the segments are arriving at a more heat sensitive subarea, such as at or close to the oil lubrication holes of a crankshaft, and also when said segment or segments are leaving said more heat sensitive subarea. In this way, the heat treatment can easily be reasonably optimized for all areas of the workpiece, in accordance with their heat sensitivity.

This aspect of the invention can additionally comprise the step of programming an electronic control means, such as a personal computer, a PLC, or similar, for controlling the laser beam by assigning, to each of said segments:
  (i) at least one scanning speed; and/or
  (ii) at least one laser beam power; and/or
  (iii) at least one laser spot size.

In some embodiments of the invention, the scanning pattern has a geometrical shape (for example, defined by the segments), wherein said geometrical shape of the scanning pattern is modified at least once while the surface of the workpiece is moving in relation to the laser source. For example, at one stage of the process, such as during one rotation of the workpiece, for example, when an oil lubrication hole is approaching the scanned portion of the surface area, one or more segments can simply be omitted to avoid overheating of a more heat sensitive subarea, or the scanning pattern can be modified to reduce the power density in one or more areas.

A further aspect of the invention relates to a method of laser hardening of a surface of a workpiece (such as a workpiece of medium carbon steel, for example, a crankshaft; the reference to "a surface" does not mean that the entire surface has to be hardened; for example, in the case of a crankshaft, it can be enough that parts of the surface, for example, the surfaces of one or more journals, and/or of walls adjacent to the journals, be hardened), the workpiece comprising at least one surface area to be hardened (for example, the surface of one or more main journals and/or one or more rod journals of the crankshaft, and/or wall surfaces of the crankshaft). The surface area comprises at least one more heat sensitive subarea (for example, in the case of a crankshaft, the area immediately around an oil lubrication hole, and/or the area close to the edge of an undercut fillet; here, the absence of material reduces the heat sink capacity and implies an increased risk for overheating; also, the sharp edges are more likely to be damaged by overheating than the smooth and regular surface of the rest of the journal) and at least one less heat sensitive subarea (for example, in the case of a crankshaft, the part of the surface of the journal that is more remote from said oil lubrication hole and/or from said undercut fillet, where the absence of edges and voids implies a reduced risk of overheating). The method comprises:

projecting a laser beam from a laser source onto said surface area, so as to produce a laser spot on said surface area;

generating a relative movement between the surface of the workpiece and the laser source (for example, by rotating the workpiece around an X axis and/or displacing the workpiece and/or the laser source along Y and/or Z axes, perpendicular to said X axis), thereby allowing the laser spot to subsequently be projected onto different portions of said surface area (that is, depending on the relative position between workpiece and laser source in accordance with, for example, said X, Y and Z axes, at each moment the laser source, in combination with scanning means, can direct the laser spot onto a certain portion or section of said area, for example, and depending on whether the scanning means provide for one dimensional or two dimensional movement, onto a line of said area having a thickness corresponding to the diameter, length or width of the laser spot, or onto a, for example, substantially rectangular section of the area);

during said relative movement, scanning the laser beam across the respective portion of said surface area (the scanning can be performed in one dimension only, for example, in parallel with an axis of rotation of the workpiece and/or perpendicularly to the direction of movement of the surface of the workpiece in relation to the position of the laser source, or in two dimensions, thus, following a pattern such as a rectangular pattern, an oval pattern, a triangular pattern, a trapezoidal pattern, an hexagonal pattern, an octagonal pattern, etc., or filling an area outlined by such a pattern, for example, by carrying out a meandering or triangular scanning back and forth along and/or across said area or by tracking a plurality of lines, such as a plurality of parallel lines; the term "scanning the laser beam" should be interpreted to mean that the laser beam itself is displaced, using some kind of optical scanning means, such as one or more scanning mirrors);

wherein the scanning is performed so that the laser spot follows a scanning pattern or path on the area, the scanning pattern having a geometrical configuration.

In accordance with this aspect of the invention, the geometrical configuration of the scanning pattern is modified at least once during the relative movement between the surface area and the laser source. For example, the scanning pattern can comprise a plurality of segments, and one or more segments can simply be omitted to avoid overheating of a more heat sensitive subarea, or the pattern can be modified to reduce the power density in one or more areas. Thus, for example, in the case of a crankshaft, when during the relative movement between the laser source and the surface of the workpiece one or more oil lubrication holes approach the area being scanned, the scanning pattern can be adapted, for example, by reducing the energy density of the path, that is, by separating segments, and/or by omitting one or more segments. For example, one segment can be omitted changing an originally closed curve scanning pattern into an open curve scanning pattern, whereby the laser spot can track said open curve back and forth; if the omitted segment corresponds to the position of the oil lubrication hole, it will not contribute to the heating of the edges of the oil lubrication hole.

A further aspect of the invention relates to a method of laser hardening of a surface of a workpiece (such as a workpiece of a ferrous material such as medium carbon steel, for example, as a crankshaft), the workpiece comprising at least one surface area to be hardened (for example, in the case of a crankshaft, the surface of one or more main journals and/or one or more rod journals of the crankshaft, and/or wall surfaces of the crankshaft), said surface area comprising at least one more heat sensitive subarea (for example, in the case of a crankshaft, the area immediately around an oil lubrication hole, and/or the area close to the edge of an undercut fillet; here, the absence of material reduces the heat sink capacity and implies an increased risk for overheating; also, the sharp edges are more likely to be damaged by overheating than the smooth and regular surface of the rest of the journal) and at least one less heat sensitive subarea (for example, the part of the surface of the journal that is more remote from said oil lubrication hole and/or from said undercut fillet, where the absence of edges and voids implies a reduced risk of overheating).

The method comprises:

projecting a laser beam from a laser source onto said surface area, thus producing a laser spot on said surface area;

generating a relative movement between the surface of the workpiece and the laser source (for example, by rotating the workpiece around an X axis and/or displacing the workpiece and/or the laser source along Y and/or Z axes, perpendicular to said X axis), thereby allowing the laser spot to subsequently be projected onto different portions of said surface area (that is, depending on the relative position between workpiece and laser source in accordance with, for example, said X, Y and Z axes, at each moment the laser source, in combination with scanning means, can direct the laser spot onto a certain portion or section of said area, for example, and depending on whether the scanning means provide for one dimensional or two dimensional movement, onto a line of said area having a thickness corresponding to the diameter, length or width of the laser spot, or onto a, for example, substantially rectangular section of the area);

during said relative movement, scanning the laser beam across the respective portion of said area (the scanning can be performed in one dimension only, for example, in parallel with an axis of rotation of the workpiece, or in two dimensions, thus following a pattern such as a rectangular pattern, an oval pattern, a triangular pattern, a trapezoidal pattern, etc., or filling an area outlined by such a pattern, for example, by carrying out a meandering or triangular scanning back and forth along and/or across said area, or by letting the laser beam follow a pattern comprising a plurality of lines, such as parallel lines; the term "scanning the laser beam" should be interpreted to mean that the laser beam itself is displaced, using some kind of optical scanning means, such as one or more scanning mirrors; in the case of an XYZ-scanner, in addition to the possibility of movement of the spot in the X and Y directions, a focusing lens is provided which can be displaced in the Z direction by some kind of drive means, thereby allowing for dynamic adaptation of the size of the laser spot; thereby, both the position of the spot and its size can be controlled and adapted to optimize the hardening process);

and modulating the laser beam.

In accordance with this aspect of the invention, the laser beam is modulated differently when the laser spot is in said more heat sensitive subarea than when it is in said less heat sensitive subarea, so as to prevent overheating of a respective portion of the workpiece. More specifically:

A—the laser beam is modulated in power (for example, so that its power is lower when the laser spot is in said more heat sensitive subarea than when the laser spot is in said less heat sensitive subarea; modulating power can even include temporarily reducing the power to zero or close to zero);

and/or

B—the laser beam is modulated in scanning speed (for example, so that the laser spot moves more rapidly over the surface of the workpiece when the laser spot is in said more heat sensitive subarea than when the laser spot is in said less heat sensitive subarea; modulating the scanning speed can even include temporarily stopping the movement of the laser beam);

and/or

C—the laser beam is modulated in its scanning pattern so that the laser spot follows a different scanning pattern in correspondence with said more heat sensitive subarea than in correspondence with said less heat sensitive subarea (thus, for the more heat sensitive subarea, a scanning pattern can be chosen that reduces the risk for overheating at, for example, the edges of, for example, the oil lubrication holes or the undercut fillets of a crankshaft);

and/or

D—the laser beam is modulated in its laser spot size so that the laser spot size is different (for example, larger) in correspondence with said more heat sensitive subarea than in correspondence with said less heat sensitive subarea (thus, for the more heat sensitive subarea, a spot size can be used that reduces the heating at, for example, the edges of the oil lubrication holes or the undercut fillets of a crankshaft. Increasing the spot size by, for example, defocusing the laser beam, reduces the amount of power per unit of surface area of the laser spot).

Thus, for example, in all of these aspects of the invention, and in the case of hardening of the bearing surfaces of a crankshaft, that is, of the surfaces of the main journal and of the rod journals, the laser beam can be focused onto one of said journals, and the beam can then be scanned across said journal and/or across a portion of said journal. On the other hand, by the relative movement between the laser light source and the surface of the crankshaft, the entire circumference of the crankshaft can be scanned. Now, instead of using optical means to produce a, for example, square or rectangular laser spot of substantial size, such as a laser spot having a width in the order of the width of the journal, a smaller spot can be used which is then scanned across the journal. In this way, modulation of the beam in terms of scanning speed, power, scanning pattern and/or laser spot size allows the heat treatment to be adapted to the particularities of different portions of the surface, for example, to the heat sensitivity of regions such as, in the case of a crankshaft, the oil lubrication holes and the fillets. Thus, instead of just treating all portions of the surface in the same way by simply applying a large laser spot to the surface and moving the surface in relation to the laser source, for example, by rotating the workpiece (which appears to be what is suggested by DE-10 2005 005 141-B3), a smaller spot can be used and scanning and modulation can be carried out so that different parts of the surface receive different amounts of energy, in order to obtain sufficient heating of all parts while avoiding overheating of certain parts. By modulating the beam, different parts of the surface can be treated differently. For example, the scanning pattern can be modified in the area close to the oil lubrication holes to prevent the edges of the oil lubrication holes from suffering overheating. Also, or as an alternative, the intensity of the beam can be reduced, and/or the speed increased, and/or the size of the laser spot can be increased by defocusing or by adapting the angle of incidence of the laser beam onto the surface, so as to prevent overheating from occurring. Thus, instead of heating the entire surface area to be hardened homogenously, care can be taken to reduce the risk for overheating in areas such as the areas around the oil lubrication holes, and/or the areas close to the undercut fillets. In these areas, the absence of material reduces the flux of heat away from the heated surface, and this implies a substantially increased risk for overheating; also, the sharp edges in these areas are more likely to suffer damage by overheating than the smooth surface of other parts of the journal.

Thus, by modifying one or more of these parameters, the risk for overheating can be reduced.

When using any of the aspects of the invention discussed above and especially when creating an equivalent or virtual effective laser spot by scanning a laser beam in one or two dimensions, the skilled person can use computer simulations and/or practical trial and error tests, to determine modulation techniques that are appropriate for each specific crankshaft design. Adapting the system to a new kind of crankshaft thus only requires a change in the software, for example, by introducing new scanning speed profiles, laser light intensity profiles, scanning patterns and/or spot sizes, for example, assigning different values of these parameters to different segments of a scanning pattern. This makes it easy to carry out trial and error simulations and to dynamically modify the scanning pattern and the related parameters during said trial and error simulations and also during real-life operation (for example, using a pyrometer and associated software and appropriate feed-back based control), to achieve an adequate performance. Actually, the beam modulation technique or energy distribution approach chosen for one kind of crankshaft can often be easily adapted to another kind of crankshaft, by taken into account changes in dimensions and changes in the positions of, for example, the oil lubrication holes. Thus, this technique is far more flexible than the one based on heating by induction. By using embodiments of the present invention, the adaptation can basically reside in adaptation of software, rather than hardware.

For example, any of the modulation alternatives A, B, C and D can be used on their own, or A can be used together with B or C, or B can be used with C, or A and B and C can be used together, and D can optionally be used with any of the above combinations. Thus, the different aspects of the invention described above provide for an extremely flexible platform for adapting the laser heating of the workpiece to different workpiece designs, substantially reducing the need to adapt hardware; this implies a further important advantage over inductive heating of workpieces such as crankshafts. For example, the choice of option(s) among A, B, C and D can be made on the basis of practical considerations, for example, the costs involved with different kinds of lasers and scanning systems, the capacity of varying scanning speed and/or laser beam power intensity, the capacity of varying scanning patterns—for example, depending on whether an uniaxial or biaxial scanning system is used—, etc.

This modulation approach is not only useful for preventing overheating at the oil lubrication holes and at the fillets and undercuts, but can also be useful in the case of workpieces in relation to which an entire circumference is to be hardened, such as the circumference of the journals of a crankshaft: once almost the entire 360 degrees of the circumference have been subjected to the heat treatment, the laser beam once again approaches an area that has already been hardened, and that should not be substantially heated again; by modulating the laser beam appropriately (in terms of speed, scanning pattern, power and/or spot size, and/or by adapting the energy distribution within an effective laser spot such as a virtual or equivalent laser spot), an adequate heating can be achieved also in this border region between the firstly heated portion of the circumference and the latest heated portion.

A further aspect of the invention relates to a method of laser hardening of a surface a workpiece (such as a workpiece of a ferrous material such as medium carbon steel, for example, a crankshaft), the workpiece comprising at least one surface area to be hardened (for example, the surface of one or more main journals and/or one or more rod journals of the crankshaft). The method comprises:

projecting a laser beam from a laser source onto said surface area, thus producing a laser spot on said surface area;

generating a relative movement between the surface of the workpiece and the laser source (for example, by rotating the workpiece around an X axis and/or displacing the workpiece and/or the laser source along Y and/or Z axis, perpendicular to said X axis), thereby allowing the laser spot to subsequently be projected onto different portions of said surface area (that is, depending on the relative position between workpiece and laser source in accordance with, for example, said X, Y and Z axes, at each moment the laser source, in combination with scanning means, can direct the laser spot onto a portion or section of said area, for example, and depending on whether the scanning means provide for one dimensional or two dimensional movement, onto a line of said area having the thickness of the laser spot, or onto a, for example, substantially rectangular section of the area);

during said relative movement, scanning the laser beam across the respective portion of said area (the scanning can performed in one dimension only, for example, in parallel with an axis of rotation of the workpiece, or in two dimensions, thus, following a pattern such as a rectangular pattern, an oval pattern, a triangular pattern, a trapezoidal pattern, etc., or filling in such a pattern by moving the laser beam within the boundaries of such a pattern, for example, in a meandering manner; the term "scanning the light beam" should be interpreted to mean that the laser beam itself is displaced, using some kind of optical scanning means or similar, such as one or more scanning mirrors);

wherein heating is performed so that a portion of the surface of the workpiece that enters an area swept by the laser beam is first receiving laser irradiation with higher average power and is subsequently receiving laser irradiation with lower average power. This can be achieved by providing a scanning pattern with a leading portion having a higher scanning density, and a trailing portion having a lower scanning density, so that the laser spot remains more time per unit of area in said leading portion than in said trailing portion, whereby the surface portion to be treated first enters the leading portion and subsequently enters the trailing portion. The term average power is to be understood as the average amount of power per surface area during an entire scanning cycle. Another way of achieving this goal is by projecting the laser beam in an at least partly off-centered manner, so that the laser beam impinges on the surface at an angle of less than 90 degrees. Off-centering the laser beam also involves the advantage of reducing the risk for damages or faults due to back reflections.

A further aspect of the invention relates to a method of laser hardening of a surface of a portion of a workpiece (such as a workpiece of a ferrous material such as medium carbon steel, for example, a crankshaft) having a substantially circular cross section (such as the surface of a main journal or a rod journal of a crankshaft). The method comprises:

projecting a laser beam from a laser source onto said surface, thus producing a laser spot on said surface;

producing a relative movement between the surface of the workpiece and the laser source (for example, by rotating the workpiece around an X axis and/or displacing the workpiece and/or the laser source along Y and/or Z axis, perpendicular to said X axis), thereby allowing the laser spot to subsequently be projected onto different portions of said surface along the circumference of said surface.

In accordance with this aspect of the invention, the laser beam is projected onto the surface in an off-centered manner, that is, the center of the laser beam is not aligned with a line passing through the center of said circular cross section. This can help to make the laser spot larger, which is sometimes useful to better distribute the heat. Also, this approach can be useful as a leading edge of the laser spot can have a higher power density than a trailing spot, due to different angles of incidence of the laser beam onto the surface at the leading edge and at the trailing edge of the laser spot. As explained above, this can shorten the heating time needed for the surface to reach a desired temperature. This approach can, for example, be used in combination with fixed optics providing a substantially square or rectangular laser spot. Also, off-centering the laser beam also involves the advantage of reducing the risk for damages or faults due to back reflections.

A further aspect of the invention relates to a method of laser hardening of a surface of a portion of a workpiece, the method comprising:

projecting a laser beam from a laser source onto said surface, thus producing a laser spot on said surface;

producing a relative movement between the surface of the workpiece and the laser source, thereby allowing the laser spot to subsequently be projected onto different portions of said surface. The laser beam is projected onto the surface in a direction that is not perpendicular to said surface, preferably forming an angle of less than 70° with said surface, such as less than 60° or even less than 45°. This can help to increase the size of the laser spot and thus reduce the amount of power per surface area and, for a given relative speed between the surface and the laser source, increase the time of interaction between the laser spot and a given point on the surface. This can contribute to an increased depth of the hardened layer.

A further aspect of the invention relates to a method of laser hardening of a surface of a workpiece (such as a workpiece of medium carbon steel, for example, a crankshaft). The method comprises:

projecting laser light from a laser source onto surface areas to be heated.

In accordance with this aspect of the invention, the laser light is projected (simultaneously or subsequently or sequentially) onto a first surface area and onto a second surface area extending substantially perpendicularly to said first surface area. The method comprises splitting a laser beam into a first laser beam component having s-polarization, and into a second laser beam component having p-polarization, and using said first laser beam component for heating said first surface area and using said second laser beam component for heating said second surface area. In this way, the relation between power absorption and angle of incidence, and the way in which this relation depends on the polarization, can be used to enhance heating efficiency.

In all of the above described aspects of the invention, the step of producing a relative movement between the workpiece and the laser source can include rotating the workpiece around an axis of rotation (which can be parallel with a so-called X axis of the system), so that the laser light spot can access the entire circumference of the surface area to be hardened. For example, a crankshaft can be rotated around a longitudinal axis passing through the center of the main journals.

Further, the step of producing a relative movement between the workpiece and the laser source can include producing a relative movement in a first direction perpendicular to said axis of rotation (for example, parallel to a Y axis) and in a second direction perpendicular to said axis of rotation (for example, parallel to a Z axis). In this way, the distance between the laser light source and the surface to be treated can be kept constant, also in the case of eccentrically placed items, such as the rod journals of a crankshaft rotating around the center axis of the main journals: if this main axis corresponds to the X axis of the system, producing a relative movement between the laser light source in two other directions, such as the Y and Z axis, can help to make sure that the distance between the laser light source and the surface to be treated is kept constant. For example, the movement in said first direction can be produced by displacing the workpiece (for example, horizontally), and the movement in the second direction can be produced by displacing the laser source (for example, vertically). Also, optionally, the laser source can be movable in parallel with said axis of rotation. Thus, the laser light source can, for example, subsequently be used to act on different journals of a crankshaft.

In many embodiments of the invention, the workpiece can be a crankshaft with a plurality of oil lubrication holes.

A further aspect of the invention relates to a method of laser hardening of a surface of a crankshaft, the crankshaft comprising main journals, rod journals and oil lubrication holes. The method comprises:

projecting a laser beam from a laser source onto a surface of a journal to be hardened, to produce a laser spot on said surface, and moving the surface with regard to the laser source by rotating said crankshaft (for example, around an axis that can correspond to a central axis of the main journals).

In accordance with this aspect of the invention, during rotation of said crankshaft, the laser beam is scanned across at least a portion of the surface of the journal, in accordance with a predetermined scanning pattern, so as to heat the surface. The scanning is performed so as to apply less energy to more heat sensitive subareas than to less heat sensitive subareas of said surface. The term pre-determined does not exclude the possibility of a dynamic adaptation of the scanning pattern during operation, in a pre-determined manner and/or in accordance with a control system based on feed-back from some kind of temperature sensor or temperature camera.

For example, the scanning can performed maintaining the power of the laser beam substantially constant, and adapting the scanning speed and/or the scanning pattern, that is, the pattern or path that the laser beam follows on the surface) so as to apply less energy to more heat sensitive subareas than to less heat sensitive subareas of said surface. In other aspects of the invention, the scanning is performed maintaining the scanning pattern substantially constant, and adapting the scanning speed and/or the beam power so as to apply less energy to more heat sensitive subareas than to less heat sensitive subareas of said surface, for example, by dynamically adapting the on-off state of the laser beam in correspondence to segments of the scanning pattern. In some embodiments of the invention, the more heat sensitive areas include areas adjacent to the oil lubrication holes and/or areas adjacent to fillets at the axial ends of journals of the crankshaft.

In some embodiments of the invention, the scanning pattern comprises a plurality of segments, and a beam power state is assigned to each of said segments in order to set the power of the laser beam, in correspondence with each segment, to a power level corresponding to said power state. The laser is arranged to change the power of the laser beam as required by said beam power states, so that the beam power will be different at some of the segments compared to at other segments, as determined by said power states. The scanning of the laser spot along the scanning pattern preferably takes place at a rate of at least 300 segments per second, preferably at least 600 segments per second, more preferably at least 1,000 segments per second, more preferably at least 5,000 segments per second, and even more preferably at least 10,000 segments per second, and the scanning pattern is repeated with a frequency of at least 10 Hz, more preferably at least 50 Hz, even more preferably at least 100 Hz. Thus, a segmentation or pixelization of the scanning pattern can be achieved that allows the power or energy distribution over the area being heated to be adapted in accordance with, for example, the heat sensitivity of the area being scanned, while at the same time repeating the scanning pattern with a high frequency, thereby reducing the temperature fluctuations within the area currently being heated.

In many embodiments of the invention, the laser source comprises a fiber laser, such as a fiber laser requiring approximately 100 us or less for switching from an "on" state to an "off" state or vice-versa. Fibre lasers are typically more expensive than other kinds of laser that produce beams with sufficient power for hardening purposes, such as diode lasers, and the skilled person might thus be reluctant to use fiber lasers for hardening workpieces such as crankshafts. However, fiber lasers allow for rapid on and off switching, and can thus be especially useful for obtaining an adequate energy distribution by switching the laser on and off while the beam follows a predetermined scanning pattern over an effective laser spot, so as to distribute the energy along lines and/or within subareas or pixels of the equivalent laser spot. Also, fiber lasers produce beams of high quality and relatively small diameter, so that the focal distance between the focused laser spot and the outlet of the beam can be large, which can be an advantage in the case of scanning as the movements of the scanning mirrors or similar can be smaller, and also in the case of scanning the laser beam over the surface of complex objects such as crankshafts, where the counterweights and walls can represent obstacles for laser beams having a short focal distances.

A further aspect of the invention relates to a system for hardening at least part of the surface of a workpiece, the system comprising a laser source and means for generating relative movement between a surface of the workpiece and the laser source. In some embodiments of the invention, the laser source is provided or associated with scanning means for scanning of the laser beam across a portion of the surface of the workpiece, in one or two dimensions. The system further comprises electronic control means, such as a computer, computer system, PLC, etc., for controlling operation of the system.

In accordance with this aspect of the invention, the electronic control means are arranged for operating the system so as to carry out a method according to any of the aspects described above.

By modifying parameters such as the geometrical configuration of the scanning pattern, that is, of the path of the pattern, and/or the scanning speed, and/or the laser beam power, and/or the laser spot size, and/or even parameters such as wavelength or angle of incidence of the laser beam on the surface to be hardened, the system provides flexibility for optimizing the heating along and across the surface to be hardened. Trial and error experiments can be carried out on trial workpieces or by using computer simulations, and the operator can dynamically modify the values of parameters such as length and position/orientation of segments, scanning speed for each segment, power of the laser beam at each segment, etc., until arriving at a combination of parameters than provide acceptable hardening characteristics without excessive degradation of the more heat sensitive areas or items.

Another aspect of the invention relates to a computer program comprising program instructions for carrying out the method of any of the above aspects of the invention when executed in a system as described above, and to an information carrier (such as any suitable kind of memory device or an electric signal) storing the computer program.

Another aspect of the invention relates to an apparatus for laser hardening of surfaces of journals of a crankshaft, said journals including at least two centrally-located main journals and at least one offset rod journal, wherein the apparatus comprises:

a crankshaft support arranged to support the crankshaft and, optionally, to rotate the crankshaft around a longitudinal axis of the crankshaft;

at least one laser source arranged to project a laser beam onto a journal of the crankshaft so as to produce a laser spot on said journal;

wherein said laser source includes bi-directional scanning means for scanning the laser beam in two dimensions so as to establish a two-dimensional scanning pattern on said surface of said journal. The use of a bi-dimensional scanning pattern makes it possible to establish an effective laser spot by repetitively scanning a laser spot over the surface to be hardened, said effective laser spot having a sufficient extension in a direction parallel with the longitudinal axis of the crankshaft so as to allow for the heating of an entire journal of the crankshaft during one single turn of the crankshaft around its longitudinal axis or one single 360 degree sweep of the effective laser spot around the journal, and in another direction, corresponding to a circumferential direction of the crankshaft, so as to allow heating to take place during sufficient time to achieve the desired hardening depth, while at the same time being able to rotate the crankshaft at a sufficient speed to obtain an adequate production rate in terms of crankshafts per hour. This scanning in two directions can, for example, be combined with the division of the scanning pattern into a plurality of segments to which different power levels are assigned, so as to obtain an energy distribution that can be dynamically adapted during operation of the apparatus to avoid overheating of heat sensitive subareas such as the areas adjacent to the oil lubrication holes.

In some embodiments of the invention, said crankshaft support and said laser source are displaceable in relation to each other in at least two different directions perpendicular to said longitudinal axis, so as to allow for a constant distance between a rod journal and the laser source during rotation of said crankshaft around the longitudinal axis, said rod journal being offset with regard to said longitudinal axis.

For example, said laser source can be displaceable in a first direction, preferably vertically, and said crankshaft support can be displaceable in a second direction, preferably horizontally, both of said first and second directions being perpendicular to said longitudinal axis. In some embodiments of the invention, the laser source can further be displaceable in parallel with said longitudinal axis of the crankshaft, so as to subsequently act on a plurality of the journals of the crankshaft. The laser source can comprise a laser such as a fiber laser or other laser suitable for rapid on/off switching, and/or for rapid switching between different beam power levels, for example, so as to accommodate for rapid switching between power levels when the laser spot follows a scanning pattern having segments to which different power states, that is, desired power levels, are assigned.

The apparatus can comprise a control unit including a memory storing parameter values associated to said scanning pattern including a plurality of sets of said parameter values, a first set of said parameter values determining a first two-dimensional energy distribution on a journal of said crankshaft and a second set of said parameter values determining a second two-dimensional energy distribution on said journal. The control system can be arranged to apply said first set of parameter values during hardening of a substantial portion of a journal of a crankshaft, and to apply the second set of parameter values when an area adjacent to an oil lubrication hole is being heated. Obviously, there can be further sets of parameter values. Thus, for example, during rotation of the crankshaft around a longitudinal axis of the crankshaft, the two-dimensional energy distribution can be adapted dynamically so as to avoid overheating of more heat sensitive subareas. Parameter values can include any of the parameter values discussed above, including beam power and scanning speed.

The control unit can be arranged to control the hardening process by, during rotation of the crankshaft around its longitudinal axis, selectively apply said first set of parameter values and said second set of parameter values and, optionally, further set of parameter values stored in said memory, in synchronism with the appearance of a more heat-sensitive subarea in correspondence with said two-dimensional scanning pattern, such as within or adjacent to the area covered by said two-dimensional scanning pattern. That is, the control unit can, for example, change the two-dimensional energy distribution when the area adjacent to an oil lubrication hole is to be heated, that is, when, for example, the oil lubrication hole, during rotation of the crankshaft, is arriving at the area currently being scanned by the laser beam.

In some embodiments of the invention, said scanning pattern can be a segmented scanning pattern comprising a plurality of segments, to each of which at least one of said parameter values has been assigned. Said at least one parameter value can be indicative of at least one of scanning speed, size of the laser spot, power of the laser beam, power distribution within the laser beam, length of the corresponding segment and orientation of the corresponding segment. For example, an appropriate selection of scanning speed, that is, speed of the laser spot along the segment, and/or power of the laser beam, can be used to determine the energy distribution over the area covered by the scanning pattern. Some of the advantages of the segmented approach for implementing a dynamically variable energy distribution and for adapting it to a crankshaft have been explained above.

In some embodiments of the invention, the apparatus can be arranged for carrying out the scanning at an average speed of at least least 300 segments per second, preferably at least 600 segments per second, more preferably at least 1,000 segments per second, more preferably at least 5,000 segments per second, and even more preferably at least 10,000 segments per second. As explained above, a high number of segments per second can be useful for combining a scanning pattern with a reasonable amount of segments, such as for example six or more, with a short cycle time, that is, a high repetition rate of the scanning, for example, 50 Hz or more.

A further aspect of the invention relates to a machine or apparatus for hardening a surface area of a workpiece. The term "surface area" is to be interpreted broadly: it can refer to part of the surface of the workpiece, or to the entire surface of the workpiece; it can, for example, refer to the surface of a journal of a crankshaft, or to part of said surface. Obviously, the machine can be useful for hardening more than one surface area of the workpiece, for example, in the case of a crankshaft, the machine can be arranged to harden the surfaces or most of the surfaces of several or all of the main journals and/or the rod journals. The surface area (or at least one of the surface areas) comprises at least one less heat sensitive subarea and at least one more heat sensitive subarea.

The apparatus comprises a laser source arranged to project an effective laser spot onto the surface area (for example, by simply directing a beam, configured to have a desired cross section, onto the surface area, or by creating a virtual or equivalent effective laser spot by scanning a "real" laser spot along a scanning pattern on the surface area), and means for generating relative movement between said surface area and the effective laser spot (in some embodiments of the invention, these means include or consist of means for rotating the workpiece around an axis so as to sweep the effective laser spot around a portion of the workpiece, such as around a journal of a crankshaft) so that said effective laser spot is moved along said surface area so as to subsequently and progressively heat different portions or parts of said surface area to a temperature suitable for hardening. That is, when the effective laser spot advances along said surface area, for example, in the circumferential direction of a journal of a crankshaft or along such a journal—from one end thereof towards the other end thereof, in the longitudinal direction of the crankshaft—, the effective laser spot progressively heats new portions while previously heated portions are allowed to cool down, thereby allowing for quenching to take place. The effective laser spot is arranged to feature a two-dimensional energy distribution, for example, the energy can be more or less evenly distributed across and along the effective laser spot, or more energy/power can be applied to the surface in some areas of said effective laser spot than in other areas of said effective laser spot.

The apparatus further comprises a control system, such as an electronic control system including one or more programmable devices, for controlling operation of the apparatus, wherein said control system is arranged to modify said two-dimensional energy distribution so that it is different in said more heat sensitive subarea than in said less heat sensitive subarea. Thereby, heating of the surface area can be optimized so as to achieve a desired hardening depth and quality throughout all or most of said surface area to be hardened, preventing overheating of more heat sensitive subareas while allowing for sufficient heating of the less heat sensitive subareas. The terms "more heat sensitive" and "less heat sensitive" are to be interpreted broadly, and generally refer to different surface areas that, due to their characteristics, should receive less energy or more energy by said effective laser spot. For example, a less heat sensitive subarea can be an area requiring more energy to reach a desired hardening, than the more heat sensitive area, which should receive less energy, for example, to avoid damage or simply because less heating is needed to reach the desired hardening, for example, due to the structure of the workpiece.

The reference to a laser source implies the presence of at least one laser source but does not exclude the presence of further laser sources, which can be used to jointly form an effective laser spot and/or to produce a plurality of different effective laser spots.

In some embodiments of the invention, said at least one more heat sensitive subarea includes an area adjacent to a hole in the surface area, such as an oil lubrication hole;
and/or
a fillet, such as an undercut fillet;
and/or
a previously hardened portion of the surface area, such as the portion at which the effective laser spot arrives at the end of a 360 degree trajectory along the circumference of an object, such as a cylindrical journal of a crankshaft.

The less heat sensitive subarea can, for example, correspond to the surface of a journal of a crankshaft, away from the oil lubrication holes and/or away from fillets and/or away from a portion that has previously been hardened.

In some embodiments of the invention, the apparatus is configured or programmed to operate so that said effective laser spot has a size and moves along said surface area with a velocity so that, during at least part of the movement of said effective laser spot along said surface area, preferably during at least 50% and more preferably during at least 90% and even more preferably during 100% of the movement of said effective laser spot along said surface area, portions within said surface area heated by said effective laser spot are heated for at least 0.5 second, preferably at least 1 second. It has been found that this can help to achieve a sufficient depth of the hardened layer for many applications. A sufficiently long heating time can be desired in order to allow the heat to penetrate enough into the material. Times of at least 0.5 or 1 second, optionally less than 5 seconds or even less than 3 seconds, can be appropriate for, for example, the hardening of journals of crankshafts, allowing for a sufficient heat penetration to reach hardening depths commonly required in, for example, the automobile industry, while not requiring temperatures so high that they may negatively affect the quality of the hardening, for example, temperatures close to or above the melting temperature of the material of the workpiece. In some of these embodiments of the invention, the size of the effective laser spot in the direction in which the effective laser spot moves along the surface area (such as in the circumferential direction of a journal of a crankshaft when the effective laser spot is displaced circumferentially around said journal, for example, by rotation of said crankshaft around a longitudinal axis thereof), is at least 5 mm, preferably at least 7 mm, more preferably at least 10 mm, and even more preferably at least 15 mm, 20 mm, 30 mm or more, such as at least 50 mm. The need to keep each portion to be hardened heated for a sufficient time, such as at least 0.5 second or at least 1 second, restricts the velocity with which the effective laser spot can travel along the surface area to be hardened. When an effective laser spot having the typical size of a laser spot with a diameter or width in the order of just a few mm, the required duration of the heating would imply that the laser spot has to travel along the surface area to be hardened at a rather low velocity, which negatively affects the productivity, for example, in terms of workpieces per hour. Thus, using an effective laser spot having a larger length or width in the direction in which the effective laser spot travels along the surface area to be hardened can enhance productivity, as the effective laser spot can travel at a higher velocity while still allowing for sufficient heating time.

In some embodiments of the invention, the apparatus is arranged to produce said effective laser spot by producing a plurality of segments of said effective laser spot, said plurality of segments comprising at least six segments, the control system being arranged to modify the two-dimensional energy distribution by selectively modifying the energy density and/or distribution of said segments (that is, the energy corresponding to each segment during a certain time interval such as, in the case of segments of a scanning pattern, a scanning cycle), in accordance with parameter values assigned to said segments, said parameter values being stored in a memory of said control system. As explained above, the segmented approach implies important advantages, for example, due to the flexibility and simplicity with which different energy distribution patterns can be created to adapt the heating of the surface area to the characteristics of the surface area. For example, if using a simple pattern with six segments arranged in two rows each comprising three segments, reducing the power of one or both of the central segments when the effective laser spot approaches an oil lubrication hole placed in the middle of a journal of a crankshaft that is being hardened, can reduce the energy applied adjacent to said oil lubrication hole compared to the energy being applied to surrounding parts of the surface of the journal, thereby reducing the risk for overheating of the area adjacent to the oil lubrication hole while maintaining an adequate hardening of the surface also further away from the oil lubrication hole, such as at the sides of the oil lubrication hole away from the edges of the oil lubrication hole. A large number of segments can allow for a very precise adjustment of the two-dimensional energy distribution to the heat sensitivity characteristics of the surface being hardened. The segments can, for example, by arranged in an array with rows and columns of segments.

In some embodiments of the invention, the laser source comprises scanning means arranged for two-dimensional scanning of a laser beam of said laser source, wherein the control system is arranged for scanning the laser beam in two dimensions so as to produce said effective laser spot, following a scanning pattern (in the case of a segmented effective laser spot, the scanning pattern can, in many embodiments of the invention, comprise said plurality of segments), wherein said scanning pattern is repeated with a repetition rate of at least 10 Hz, preferably at least 50 Hz, more preferably at least 100 Hz, and even more preferably at least 200 Hz. Scanning the laser beam so as to move a small laser spot along and across the surface area so as to produce said, larger, effective laser spot, is advantageous as it provides for a great flexibility in what regards the energy distribution over said effective laser spot. On the other hand, a high repetition rate of the scanning pattern allows for:

A relatively large size of the effective laser spot, such as one or more cm$^2$, thereby allowing for, on the one hand, a relatively large width of the laser spot in a direction perpendicular to the direction of the movement of the effective laser spot. For example, in the case of hardening of journals of a crankshaft where the effective laser spot travels in the circumferential direction, the effective laser spot can have said relatively large width in the direction across said journals (that is, in the longitudinal direction of the crankshaft), so that the effective laser spot can extend over most or all of the width of the journal so that the entire surface area of the journal to be heated by passing the effective laser spot around the journal once. On the other hand, at the same time, the size of the effective laser spot in the direction of the movement of the effective laser spot along the surface area to be hardened can also be large enough to allow for movement at a relatively high velocity in combination with a sufficient duration of the heating, as explained above.

At the same time, avoiding substantial temperature fluctuations within the area currently being heated, which is advantageous for the reasons explained above: a high repetition rate makes sure that a heated portion can be reheated before the temperature to which it has previously been heated has been allowed to fall too much.

The scanning pattern can be in the form of adjacent segments forming a loop, or in the form of a plurality of lines such as parallel lines, or it can have any other suitable configuration. Adapting the two-dimensional energy distribution can include adapting the lengths and/or positions of some or all of the segments.

In some embodiments of the invention, said parameter values are indicative of a beam power level and/or a scanning velocity of the beam in correspondence with the corresponding segment of the scanning pattern. Thus, the two-dimensional energy distribution to be applied at each specific moment of the movement of the effective laser spot along said surface area to be hardened by heating, can be determined by a beam power value and/or a scanning velocity assigned to each segment. The choice between one option, the other option or both can depend on, for example, the characteristics of the laser source and of the scanning system, as explained above. In other embodiments of the invention, the parameter values can be indicative of position or length of the corresponding segment. Also other options are possible, as explained above, and one or more of these options can be used in combination.

In some embodiments of the invention, the apparatus is programmed for hardening at least one journal of a crankshaft, wherein the apparatus is programmed to produce said effective laser spot to extend, in the longitudinal direction of the crankshaft, across more than 50% of said journal of the crankshaft, preferably over more than 75%, more than 85% or more than 90% or 95%, such as more than 99% or even 100%, and especially over the major part, if not over 100%, of the surface area to be hardened, for example, the surface area where an effective case hardening depth of, for example, at least 800 µm or more is desired. It is well known in the art to use a small laser spot to harden very specific portions of a surface of a crankshaft. However, the present invention allows for the hardening of major surfaces (such as the general surfaces of the journals of the crankshaft) in one single sweep or in a few sweeps, while, at the same time, adapting the heating according to the characteristics of the portions of the surface area being heated, taking the presence of, for example, oil lubrication holes and/or other more heat sensitive subareas into account.

In some embodiments of the invention, the control system comprises a memory arranged to store a plurality of data sets, each of said data sets being indicative of a two-dimensional energy distribution of said effective laser spot, whereby said apparatus is arranged for adapting the two-dimensional energy distribution of the effective laser spot while said effective laser spot is moved along said surface area, by using one of said plurality of data sets for operating the laser source when the effective laser spot is projected onto said less heat sensitive subarea, and by using at least another one of said plurality of data sets for operating the laser source when the effective laser spot is projected onto said more heat sensitive subarea. Thus, when adapting the apparatus to a specific product such as a specific crankshaft, the operator can design adequate energy distributions for different portions of the crankshaft, for example, a first two-dimensional energy distribution for a part of a journal remote from an oil lubrication hole and one or more different two-dimensional energy distributions for areas adjacent to an oil lubrication hole, store the corresponding sets of parameters in the memory of the control system, and program the control system so as to dynamically modify the energy distribution of the effective laser spot while said effective laser spot is travelling around or along the journal, in synchronization with the appearance of oil lubrication holes and other areas requiring an adjustment of the way in which the heating is carried out.

A further aspect of the invention relates to a method of laser hardening of at least one surface area of a workpiece, such as a crankshaft, comprising the step of heating said surface area of the workpiece to a temperature for hardening, using an apparatus as explained above, and the step of allowing heated portions of said surface area are to cool down so as to produce quenching.

Another aspect of the invention relates to a crankshaft comprising a plurality of journals, at least one of said journals having a surface that has been hardened by a method according to one of the aspects of the invention described above.

Another aspect of the invention relates to a method of programming an apparatus as the ones described above, for laser hardening of journals a crankshaft, comprising the steps of assigning energy distribution related parameter values, such as laser beam power and/or scanning speed and/or length of segment and/or orientation of segment, to a plurality of segments (such as segments of a scanning pattern to be followed by a laser beam spot to establish said effective laser spot), so as to establish a plurality of data sets, each data set corresponding to a specific two-dimensional energy distribution of an effective laser spot to be projected onto a surface area to be hardened and to be displaced along said surface area, storing said data sets, and programming the apparatus to adapt said energy distribution of the effective laser spot in synchronization with the movement of the effective laser spot along said surface area, by adapting said energy distribution in accordance with at least one of said data sets for heating a less heat sensitive subarea of said surface area, and by adapting said energy distribution in accordance with at least another one of said data set for heating a more heat sensitive subarea of said surface area. As explained above, the segmented approach makes it easy for the skilled person to establish, try out and select suitable two-dimensional energy distributions and assigning them to different subareas of an area to be hardened, for example, assigning specific data sets to the area around an oil lubrication hole and other specific data sets to an area of overlap with a previously hardened portion of a crankshaft.

In some embodiments of the invention, this method comprises the step of, after the step of establishing a data set, calculating and visualizing a corresponding two-dimensional energy distribution on a screen. In many cases, the visualization can help the person skilled in the art to determine if a selected two-dimensional data set, corresponding to a specific assignment of parameter values to the segments, such as segments of a scanning pattern, is likely to provide an adequate heating of the corresponding portion of a crankshaft. Whereas pure mathematical methods and computers can be used to calculate the optimal assignment of parameter values to the segments, visualization can be a useful tool in the hands of a skilled person.

It has been found that suitable lasers to be used can be those providing a high beam power, such as a beam having a power in the range of 2 kW-10 kW (the upper and lower limits being included in the range). Such lasers can, for example, be especially appropriate for the surface hardening of crankshafts.

Typically, with this kind of laser, and for the purpose of surface hardening, for example, of the surface of a crankshaft, the laser spot projected onto the surface to be hardened can preferably have a diameter in the range of from 2 mm to 5 mm, such as about 3 mm. This kind of spot is considered to be appropriate for the hardening of a surface of a crankshaft using a 2 kW-10 kW laser beam.

Hardening is often preferably performed to achieve an effective case depth of the hardened layer of at least 800 μm or more (such as at least 1200 μm or at least 1500 μm or even 2000 μm or more) in the hardened area, except for, optionally, in the vicinity of more heat sensitive subareas and/or at the edges or end sections of the hardened area. These hardening depths are appropriate for, for example, crankshafts. It is considered that using a laser having a power in the 2 kW-10 kW range, these hardening depths can be achieved applying the laser beam to the crankshaft for about 2-6 minutes (the exact time will depend on features such as beam power, surface area to be hardened, and the depth of the layer); by processing several crankshafts in parallel, the cycle time can be substantially reduced: for example, by processing two or three crankshafts in parallel, typically cycle times in the order of 1 minute can be achieved. The required depth may typically be in the range of from 800 μm up to 2000 μm or more.

The adaptations of scanning pattern and other parameters, such as the power of the beam, the size of the laser spot, the scanning velocity, and/or the angle of incidence of the laser beam, makes it possible to increase the time of interaction between the laser beam and a certain area, which can help to increase the depth of the hardened layer. For example, if a given pattern is expanded in the direction of the relative movement between the laser source and the surface to be hardened, and/or if the angle of incidence between the laser beam and the surface is reduced (for example, by off-centering the beam with respect to a surface of a portion having a circular cross-section, or inclining the beam with respect to a flat surface), the duration of the interaction between the beam and a given point on the surface can be increased, which can contribute to an increased depth of the hardened layer.

The scanning speed (that is, the speed with which the laser spot will be scanned by the scanning system over the surface to be hardened) can vary along the scanning pattern or path, as explained above, but the average scanning speed can typically be in the range of from 2000 mm/s up to 8000 mm/s; such scanning speeds can be appropriate for the surface hardening of crankshafts when using a laser beam having a power in the range of from 2 kW to 10 kW.

Obviously, the different aspects described above can be combined with each other, whenever compatible with each other.

BRIEF DESCRIPTION OF THE DRAWINGS

To complete the description and in order to provide for a better understanding of the invention, a set of drawings is provided. Said drawings form an integral part of the description and illustrate different ways of carrying out the invention, which should not be interpreted as restricting the scope of the invention, but just as examples of how the invention can be carried out. The drawings comprise the following figures:

FIGS. 14A and 14B schematically illustrate the amplitude of the oscillation of the surface temperature of an area being heated, depending on the frequency with which a laser beam scans the effective laser spot.

FIGS. 16A, 17A and 18A represent the energy or power distribution over an effective laser spot, calculated for a scanning pattern as per FIGS. 16B and 16C, 17B and 17C, and 18B and 18C, respectively.

FIGS. 16B, 17B and 18B schematically illustrate the arrangement of the segments of different scanning patterns, and FIGS. 16C, 17C and 18C schematically illustrate different scanning velocities assigned to different segments of the pattern.

DESCRIPTION OF WAYS OF CARRYING OUT THE INVENTION

Figure 1:
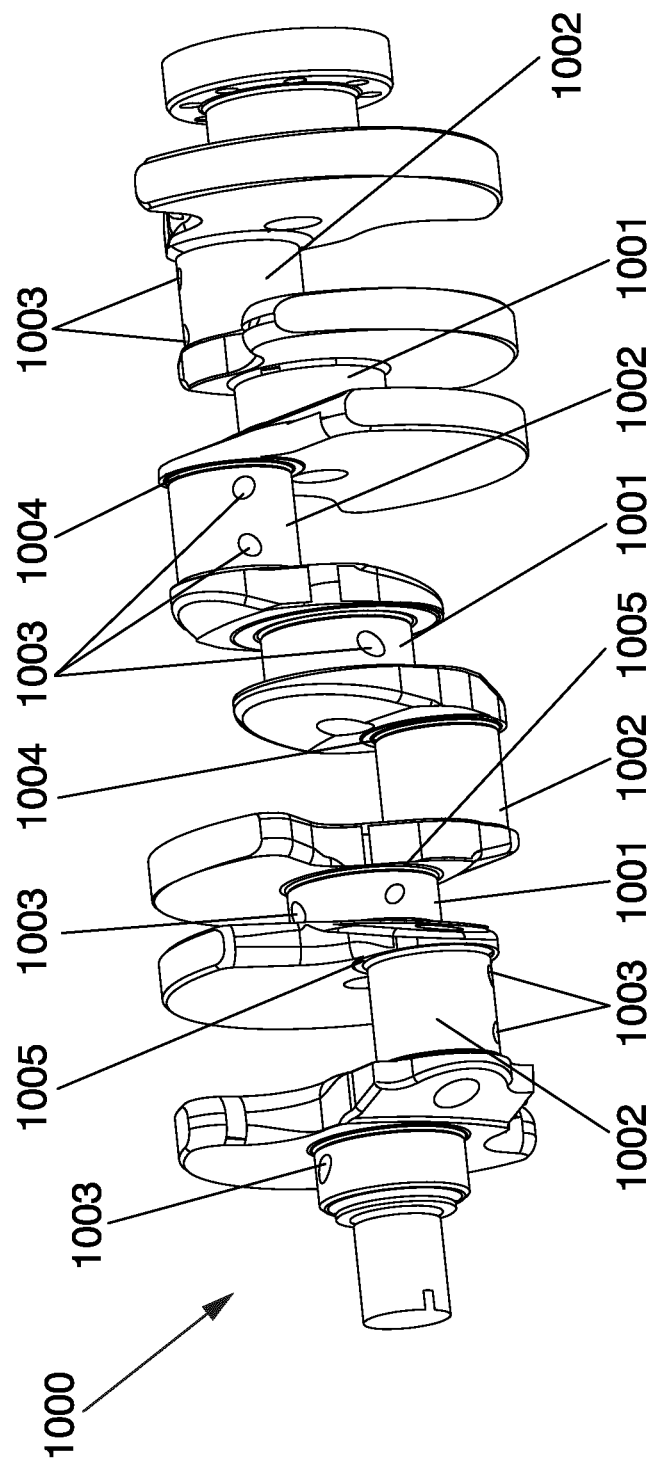
FIG. 1 is a schematic perspective view of a crankshaft, as known in the art.
Figure 2:
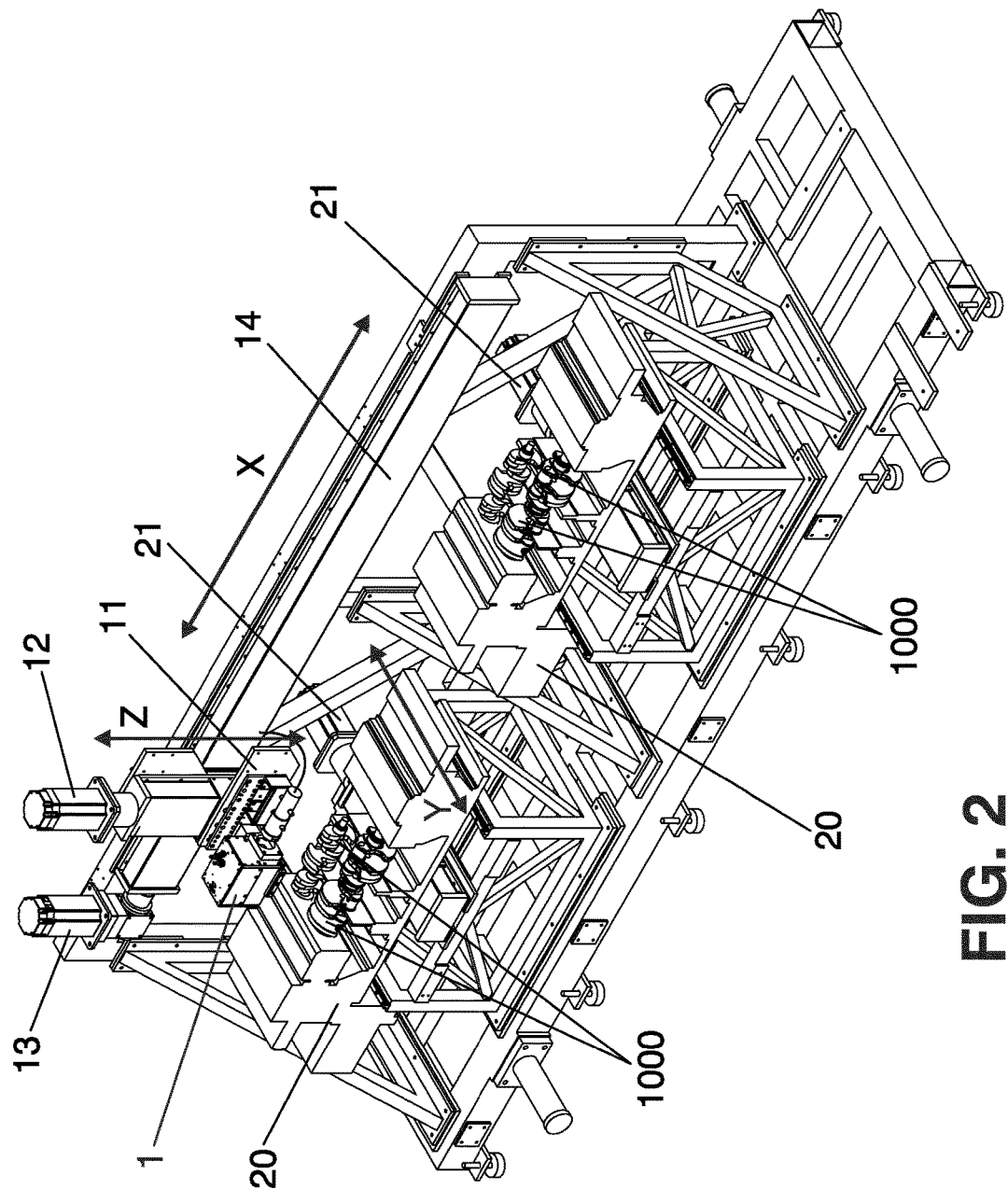
FIG. 2 is a schematic perspective view of a system in accordance with one possible embodiment of the invention.

FIG. 2 illustrates a system in accordance with one possible embodiment of the invention. The system comprises a frame structure accommodating a laser source 1 mounted on a laser carriage 11 which is displaceable in the vertical direction, in parallel with a vertical Z axis of the system, by first laser carriage drive means 12, for example, by a servomotor or any other suitable drive means. On the other hand, the laser source 1 can also be driven horizontally, in parallel with a horizontal X axis of the system, along a horizontal track 14, driven by second laser carriage drive means 13, such as another servomotor or other suitable drive means.

On the other hand, the system comprises two workpiece carriages 20, each workpiece carriage being able to accommodate two workpieces 1000 in parallel (in this embodiment, the workpieces are crankshafts), and including drive means (not shown) for rotating each workpiece along a central axis (in this embodiment, the central axis corresponds to the longitudinal axis passing through the centers of the main journals of the crankshaft), said axis being in parallel with the X axis of the system. On the other hand, each workpiece carriage 20 is associated with a workpiece carriage drive means 21 (such as a servomotor or any other suitable drive means) arranged to displace the workpiece carriage horizontally, in parallel with a Y axis of the system, perpendicular to the X axis.

The references to the horizontal and vertical directions are only used to simplify the explanation, and any other orientation of the axes is obviously possible and within the scope of the invention.

In the present case, the laser source 1 is first used to harden the relevant parts of the surface of one of the workpieces 1000 in a first one of the workpiece carriages 20, then it is used to harden the relevant parts of the surface of the other workpiece 1000 in said first one of the workpiece carriages 20, and then it is moved along the track 14 to face the second one of the work piece carriages 20, for hardening surfaces of the workpieces 1000 arranged therein. While the laser source 1 is operating on the workpieces in the second one of the workpiece carriages, the workpieces in the first one of the workpiece carriages can be unloaded and replaced by new workpieces to be treated by the laser source, and vice-versa.

Obviously, there are many alternative possibilities. For example, there may be only one workpiece per workpiece carriage, or there may be more than two workpieces per workpiece carriage. There may be one laser source per workpiece carriage (that is, a second laser source carriage with its corresponding laser source can be added to the track 14). Also, several arrangements as the one of FIG. 2, or variants thereof, can be placed in parallel. Also, each laser carriage 11 can be provided with more than one laser source 1, so that several workpieces in a workpiece carriage can be subjected to laser hardening treatment simultaneously. The relation between the number of laser sources, the number of workpiece carriages, and the number of workpieces, can be chosen so as to optimize the use of the more expensive parts of the system, and to optimize productivity, for example, by allowing for loading and unloading of workpieces without stopping the operation of the system. In some embodiments of the invention, a plurality of laser sources can be used to direct laser beams simultaneously to the same crankshaft, for example, to act simultaneously on different journals of the crankshaft or on the same journal of the crankshaft.

In some embodiments of the invention, when the workpiece is a crankshaft 1000 with main journals 1001 and rod journals 1002, during heat treatment of the main journals 1001 of the crankshaft, the laser source does not move in the Z axis direction and the workpiece carriage does not move in the Y axis direction, as the surface of the main journal is circular and symmetric around the axis of rotation of the crankshaft. In some embodiments of the invention, there may be a movement of the laser source and/or the workpieces along the X axis, if necessary to apply the laser heat treatment along the full extension of the main journal in the X axis direction. This depends on the power capacity of the laser source and on the capacity of the scanning means (not shown) to displace the laser beam in the X axis direction. If the laser beam can be scanned across the path of the main journal 1001 all along its extension in the X axis direction, there may be no need to displace the laser source 1 in the X axis direction during heat treatment of one of, for example, the main journals 1001 of a crankshaft, but only when switching from treatment of one journal to treatment of another one; the same applies to the heat treatment of, for example, the rod journals 1002 of a crankshaft.

However, during heat treatment of a rod journal 1002, the central axis of which is radially displaced from the central axis of the main journals, during rotation of the respective crankshaft work piece 1000 in the work piece carriage 20, the laser light source 1 is moved vertically in parallel with the Z axis and the workpiece carriage 2 is moved horizontally in parallel with the Y axis, so as to keep a constant distance between the laser source (such as the output of the scanning means of the laser source, or the surface of a lens) and the surface onto which the laser beam is projected. In other embodiments of the invention, the crankshafts can be moved in parallel with the Z and Y axes. Also, or alternatively, the laser source can be arranged to be moveable in parallel with the Z and Y axes.

The operation of the first 12 and second 13 laser carriage drive means, as well as the operation of the workpiece carriage drive means 21 and of the drive means for rotating the workpieces 1000 in the workpiece carriages 20, can be controlled by electronic control means such as a computer, computer system or PLC (not shown in FIG. 2).

In some embodiments of the invention, the laser source 1 includes a scanning system arranged for modifying the direction of the laser beam. Such scanning systems are well known in the art, and frequently include one or more scanning mirrors, the angles of which can be modified in accordance with scanning functions, such as sine functions, triangular functions, etc., under the control of a computer. A one-axis scanning system (for example, a scanning system with a scanning mirror pivotable about one axis, or similar) can be used to scan the laser beam in parallel with the X axis, that is, perpendicularly to the direction of movement of the surface of the workpiece 1000 relative to the laser source 1 due to the rotation of the workpiece 1000. A rapid scanning across the relevant portion of the surface can thus create a virtual spot having an extension in the X direction much larger than the extension of the spot without scanning: thus, the original spot is turned into a wider virtual spot (with a larger extension in the X direction), but with a smaller power density, as the power of the beam is distributed over a larger area.

With a two-axes scanning system (for example, with a scanning system having a bi-axial mirror, or two uni-axial mirrors), the laser beam can be moved in two directions, for example, on the one hand in parallel with the X axis, and on the other hand in parallel with the Y axis, and combinations thereof. Thus, apart from scanning the surface perpendicularly to the direction of movement of the surface relative to the laser source, that is, apart from scanning the surface "along" the surface of the journals in the X axis direction, the laser beam can also scan the surface in the direction of its movement, that is, in parallel with the Y axis; thereby, the surface of a journal of a crankshaft can be scanned also in the circumferential direction of the journal. Also, the laser beam can describe paths that combine movement in the X direction and the Y direction (that is, when projected onto the circular journal of a crankshaft, in the circumferential W direction, cf. for example FIGS. 12A-12B). Thereby, the beam can follow paths having complex shapes, such as rectangles, ovals, trapezoids, etc. The laser spot can be scanned over the surface to form a virtual filled rectangle having a substantial height in the Y (or W) direction (for example, by following a meander pattern within a rectangular boundary or by following a plurality of separated lines within said boundary), or to repetitively outline the edges of a rectangle, or any other geometric shape. Thus, using the capacity of the scanning system, a virtual or equivalent effective laser spot can be created, having a desired extension and shape, both in the X direction and in the Y or W direction. In the case of a so-called XYZ-scanner, in addition to the possibility of movement in the X and Y directions, a focusing lens is provided which can be displaced in the Z direction by some kind of drive means, thereby allowing for dynamic adaptation of the size of the laser spot. Thereby, both the position of the spot and its size can be controlled and adapted to optimize the hardening process. Also, as an alternative or in addition to the displacement of a focusing lens or similar, the size of the laser spot can be controlled and adapted by moving the laser source in parallel with the Z-axis, using the first laser carriage drive means. Also, the system can include means for varying the distribution of the power within the laser spot, as known from, for example, DE-3905551-A1 mentioned above.

Figure 3:
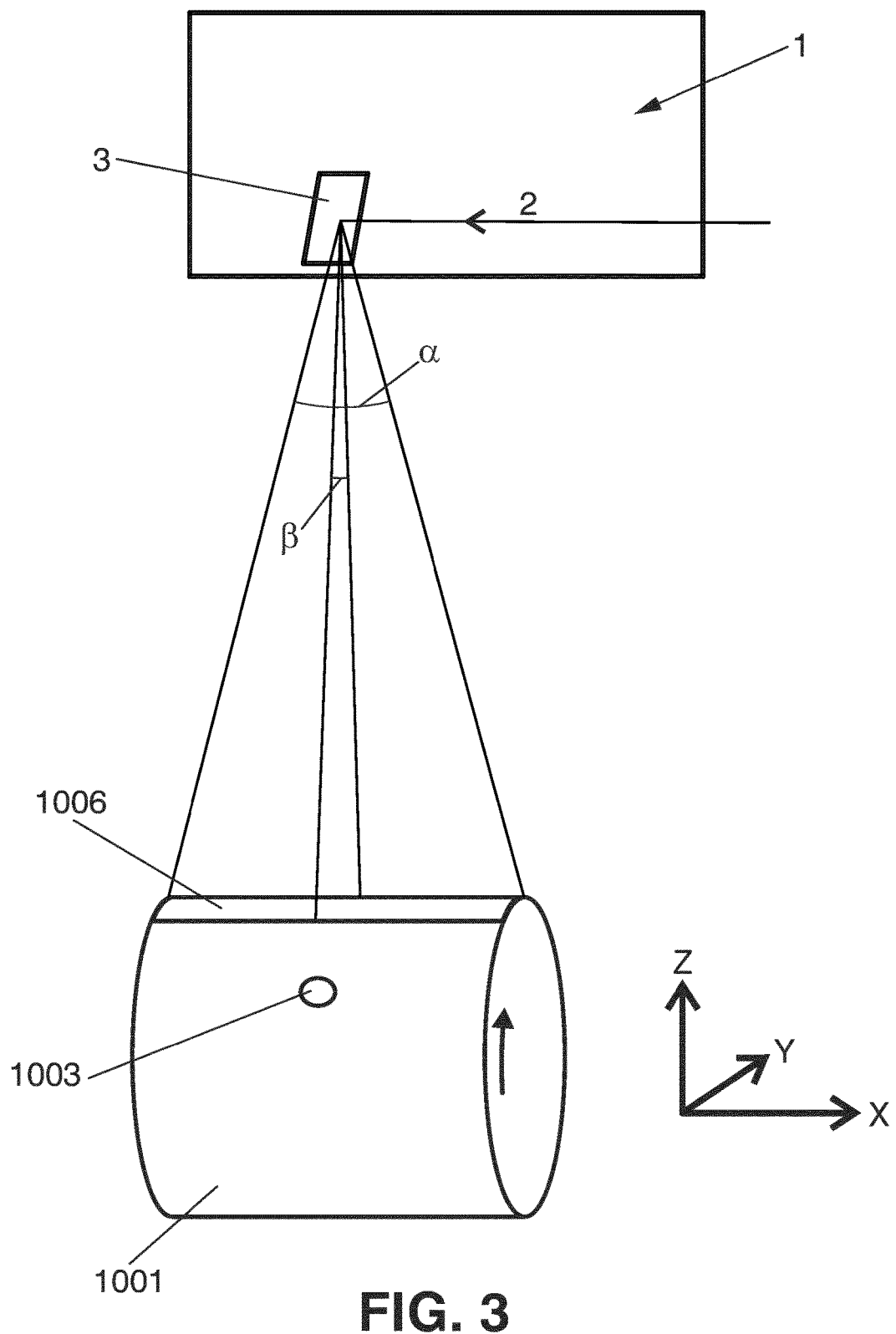
FIG. 3 is a schematic front elevation view of a portion of the laser source 1 and a portion of a workpiece, in accordance with one possible embodiment of the invention.

FIG. 3 schematically illustrates the laser source 1 including a schematically illustrated two-axes scanning system 3, based on a bi-axial mirror or two uni-axial mirrors and arranged to deflect an incoming laser beam 2 in the vertical plane parallel with the X axis and in the vertical plane parallel with the Y axis; the angle α represents the maximum sweep in the vertical plane parallel with the X axis, and the angle β represents the maximum sweep in the plane parallel with the Y axis. FIG. 3 schematically illustrates the laser source 1 placed above a workpiece and, more specifically, above the main journal 1001 of a crankshaft, which includes an oil lubrication hole 1003 and which is rotated in the workpiece carriage (not shown) in the direction suggested by the arrow. Schematically illustrated in FIG. 3 is a portion or section 1006 that can be swept by the laser spot due to the scanning of the laser beam. Thus, using this kind of laser source, a small laser spot projected onto the top of the workpiece can be replaced by a larger virtual or equivalent spot, obtained by repetitively scanning, at high speed, a pattern having any desired shape, within the section 1006 which is determined by the maximum sweep allowed by the scanning system, in accordance with angles α and β. Thus, instead of heating one single small spot with the laser beam, a larger area can be heated (but with less power per unit of area) during a time interval by scanning said area with the laser beam. Or, with other words: instead of providing a large spot (such as a large rectangular spot) by using, for example, appropriate fixed optics, a corresponding power distribution can be achieved by scanning a smaller and more power intensive spot over a larger area. This involves one important advantage: it provides for the possibility of dynamically applying different amounts of energy to different portions of the surface, by adapting the scanning pattern, the velocity of the scanning movement, the power of the beam, and/or the size of the spot, in accordance with different characteristics of different portions of the surface, for example, depending on the sensitivity to heat and the risk for damage by overheating. For example, scanning pattern, scanning velocity, beam power and/or laser spot size can be chosen (and dynamically adapted during the hardening process) so as to limit the amount of heating energy applied to the surface in the vicinity of the oil lubrication holes or in the vicinity of undercut fillets. To obtain an adequate hardening depth and quality, scanning is performed repetitively and preferably with a high frequency, such as more than 10 Hz or, more preferably, more than 50, 100, 150, 200 or 250 Hz, so as to avoid substantial fluctuations in temperature within the heated area.

Figure 4A:
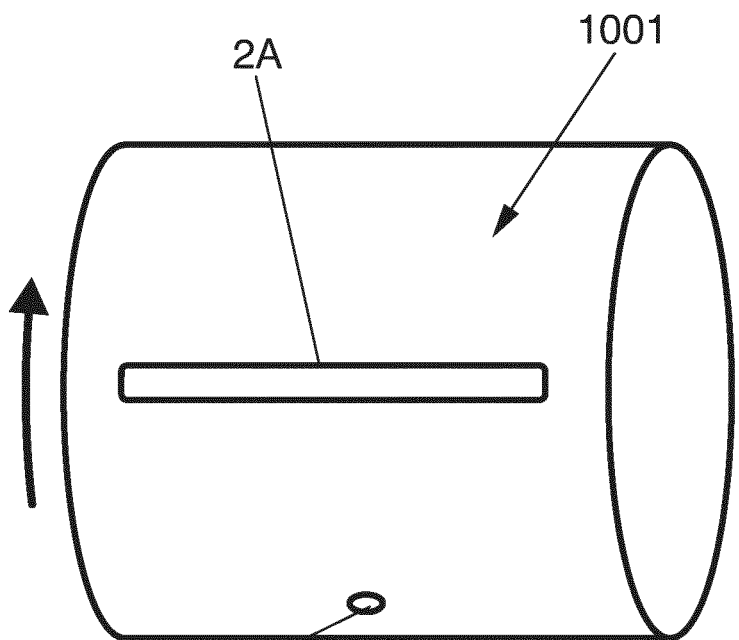
FIGS. 4A and 4B are schematic top views of a section of the workpiece in the embodiment of FIG. 3, at two different moments of the hardening process.
Figure 4B:
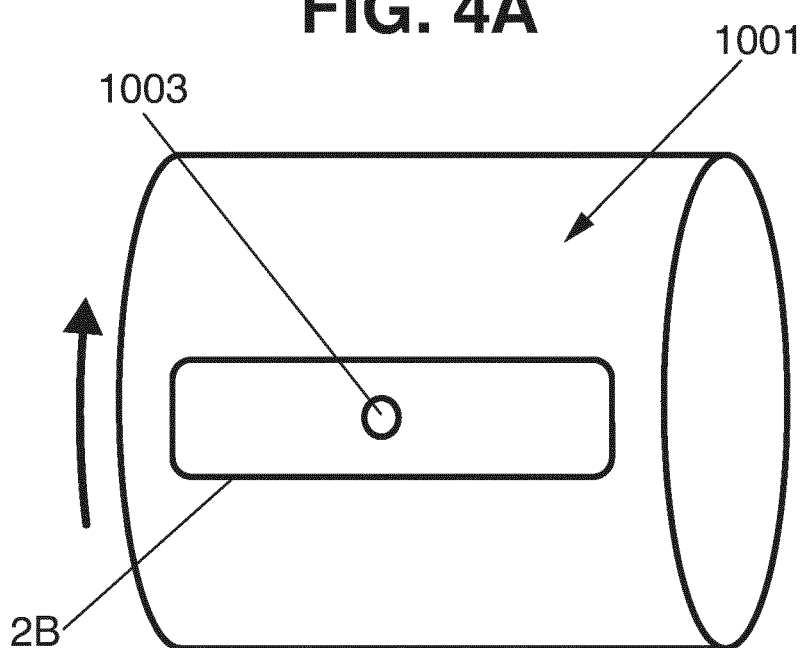

FIGS. 4A and 4B are top views of a portion of a crankshaft, namely, of a main journal 1001 of the crankshaft, during two different stages of a hardening process. The crankshaft is rotated in the workpiece carriage (not shown), in the direction illustrated by the arrow.

In FIG. 4A, reference numeral 2A denotes the scanning pattern: the laser spot is made to follow the substantially rectangular path 2A; in an alternative embodiment, the laser spot is scanned within the substantially rectangular area 2A, for example, following a meander pattern or other pattern within the rectangular area 2A, so as to fill the rectangle, that is, so as to impact on the entire surface of the rectangle. In both cases, scanning is performed at high speed, so that the result is that the projection of the laser beam on the surface of the workpiece 1001 is, from a heating perspective, substantially equivalent to the heating that would have been achieved if the laser beam would have been projected in the form of a hollow rectangle 2A or a filled rectangle 2A, respectively. In FIG. 4A, the area swept by the laser beam is a less heat sensitive subarea, as the workpiece is solid in said area.

Now, in FIG. 4B, the oil lubrication hole 1003 has reached the section or portion that can be swept by the laser beam. The area immediately adjacent the oil lubrication hole 1003 is a more heat sensitive area, as the edges of the oil lubrication hole can be damaged by overheating, and as the absence of metal in the hole reduces the heat sink capacity of the workpiece in that area. Thus, if the laser beam is projected onto the area immediately adjacent the oil lubrication hole 1003 in the same way as it is projected onto a less heat sensitive region such as in FIG. 4A, overheating may take place, with damage to the edges of the oil lubrication hole 1003.

Therefore, in this embodiment of the invention, a different scanning pattern 2B is used when the workpiece is in the situation illustrated in FIG. 4B: in this case, the laser beam follows a path in the shape of a larger rectangle 2B, or follows a meandering pattern or a plurality of parallel lines to fill the area outlined of said larger rectangle 2B, respectively. This implies that the power from the laser beam is spread over a larger area, thus reducing the risk for overheating. With other words: the modulation of the laser beam in terms of the scanning pattern is different in the situation shown in FIG. 4B than in the situation shown in FIG. 4A, in order to reduce the risk for overheating.

Obviously, there is no need to use a rectangular pattern or a meander pattern filling a rectangle: the person skilled in the art is free to use the pattern that she or he considers most convenient. For example, when a fiber laser or other laser allowing for rapid on/off switching of the laser beam is used, a pattern can be used comprising a plurality of parallel lines, and the distance between the lines can be smaller when a less heat sensitive area or subarea is scanned, than when a more heat sensitive area or subarea is scanned. Or, more preferably, the distance between the lines can be kept substantially constant but the power of the beam and/or the scanning speed along the lines can be adapted, so that scanning speed is higher and/or the power of the beam is lower in the more heat sensitive area than in the less heat sensitive area. Also, combinations of these approaches can be used. For the scanning along a plurality of parallel lines, in many embodiments of the invention, polygonal mirrors can be used. In addition or as an alternative to modifying the pattern or path followed by the laser spot, the skilled person can choose to modify the power of the laser beam, and/or the scanning speed of the laser beam, and/or the size of the laser spot, and/or the power distribution within the laser spot, so as to achieve an adequate hardening with an acceptable level of deterioration of sensitive areas, such as the edges of the oil lubrication holes 1003 of a crankshaft. This kind of measures can also be taken in relation to other sensitive areas, such as the undercut fillets or the area at the end of a hardening track, that is, basically, the area where once the workpiece has rotated almost 360 degrees, the laser beam approaches an area that has previously been heated by it and which should not be substantially reheated, so as to avoid an excessive tempering effect that would lead to an unacceptable hardness drop.

Figure 5A:
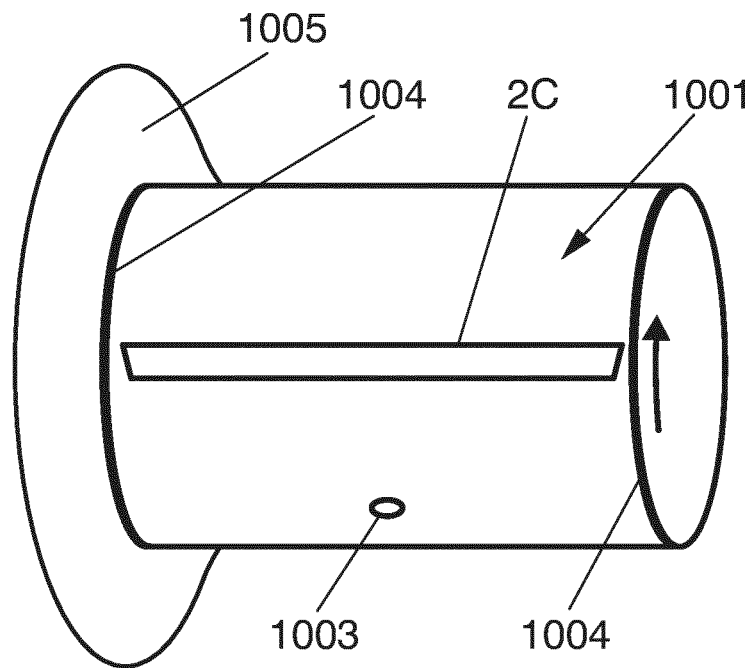
FIGS. 5A and 5B are schematic top views of a section of a workpiece at two different moments of the hardening process, in accordance with a variant of said embodiment of the invention.
Figure 5B:
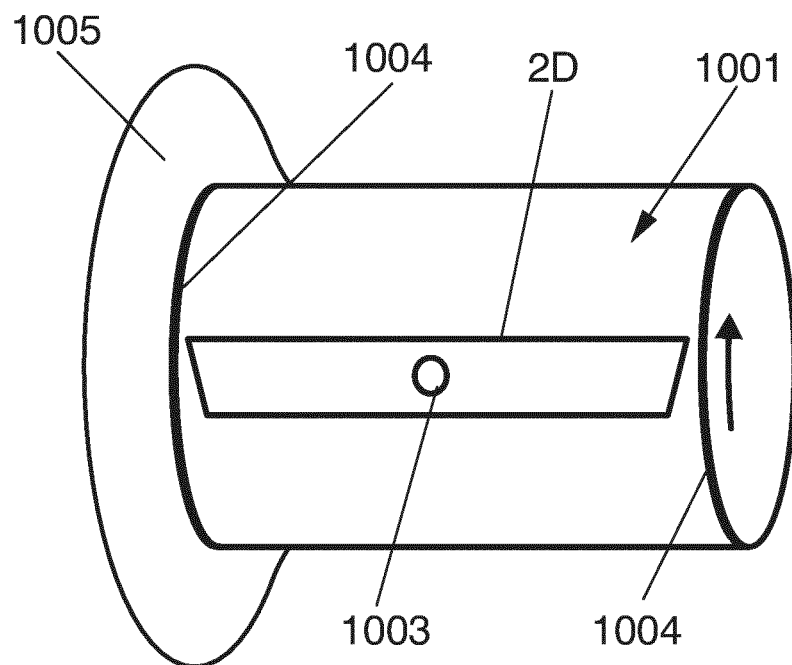

FIGS. 5A and 5B are top views of a portion of a crankshaft, namely, of a main journal 1001 of the crankshaft, during two different stages of the hardening process in accordance with an alternative embodiment of the invention. What has been indicated in relation to FIGS. 4A and 4B applies, mutatis mutandis. In FIGS. 5A and 5B, the scanning pattern extends almost over the entire width of the journal, substantially from one of the fillets 1004 to the other one. As in FIGS. 4A and 4B, the scanning pattern is designed to imply a lower power density in the more heat sensitive subarea around the oil lubrication hole 1003 (cf. FIG. 5B), than in the less heat sensitive subarea or region further away from the oil lubrication hole (cf. FIG. 5A); in this case, this is achieved by a larger height of the trapezoidal scanning pattern when the area around the oil lubrication hole 1003 is being scanned.

However, in this case, also the area adjacent to the fillets 1004 is considered to be a heat sensitive area, for example, due to the use of undercut fillets. Thus, the scanning pattern is arranged to provide for a lower power density also in that area; this is achieved by using a trapezoidal scanning pattern, whereby, with a substantially constant scanning speed, less energy will be received in the vicinity of the fillets, than if a rectangular scanning pattern is used.

Analogously to the case of the embodiment of FIGS. 4A and 4B, the laser beam can follow the outlines of the trapezoids 2C and 2D illustrated in FIG. 5A or 5B, or it can cover or fill the trapezoids, for example, following a meandering path within said trapezoids or a plurality of lines within the trapezoids.

It is evident for the skilled person that these patterns are just examples, and that the skilled person will be able to choose among an infinite number of possible patterns when adapting the method and system to a specific workpiece design.

Figure 6A:
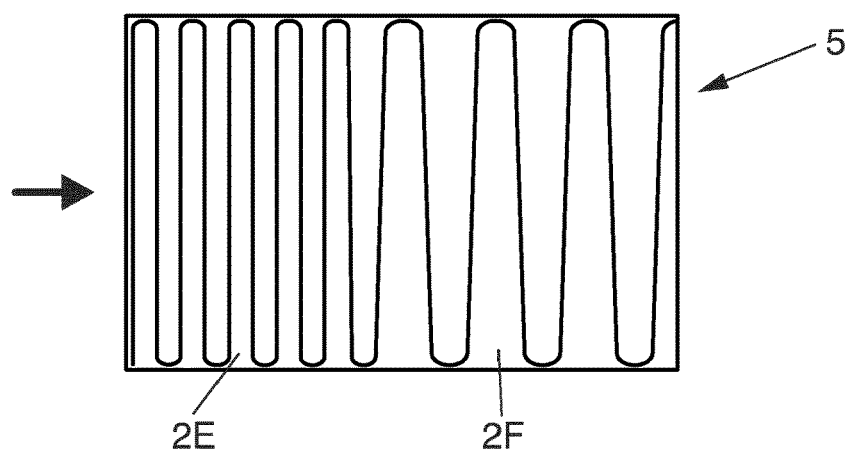
FIGS. 6A, 6B, 6C and 6D are schematic top views of a virtual laser spots having a leading portion with a higher power density and at least one trailing portion with a lower power density.

FIG. 6A is a top view of a virtual laser spot 5 having a rectangular cross section and having a leading portion 2E with a higher power density and a trailing portion 2F with a lower power density. The virtual laser spot is obtained by repetitively scanning a smaller, real, laser spot following a meandering pattern that covers the rectangular area. In this case, the higher power density is obtained by using a more compact meander pattern in a first portion of the rectangular area, and a less compact meander pattern in the second portion of the rectangular area. The arrow indicates the direction in which a surface of a workpiece moves in relation to the virtual laser spot. In this way, a portion of the workpiece to be heated will first be affected by the leading edge of the virtual laser spot, and will thus receive a comparatively large amount of power per unit of surface area. This favors a rapid heating, which in the case of laser hardening means that the portion of the workpiece will rapidly reach the austenitizing temperature range. This means that for a given laser beam power and a given speed of the movement of the surface to be heated, the heated area of the workpiece can be kept at or above the austenitizing temperature range for a longer time, than if the power would have been distributed evenly over the virtual laser spot: had the power been distributed evenly, it would have taken longer for the surface to reach the austenitizing temperature zone.

Figure 6B:
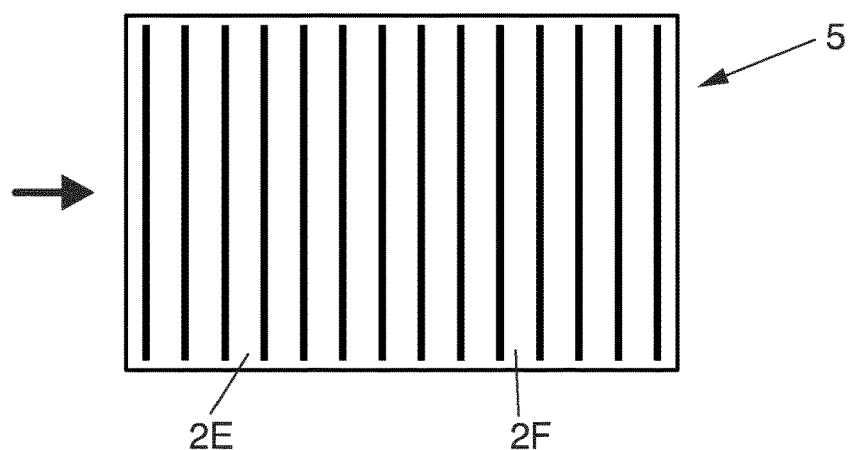

FIG. 6B illustrates an alternative embodiment in which instead of using a meandering pattern, the laser spot follows a plurality of parallel lines to form the (virtual or equivalent) effective laser spot 5. The power of the laser beam is higher and/or the scanning speed is lower along the lines at the leading portion 2E with a higher power density, compared to the trailing portion 2F with a lower power density, where the power of the laser beam is lower and/or the scanning speed higher. In this way, the desired energy distribution can be obtained throughout the effective laser spot 5. Instead of lines, any other kind of scanning pattern can be used to provide for a desired two-dimensional energy distribution. Using a laser allowing for rapid on/off switching of the laser beam and/or for rapid variation in power, very complex patterns can be used, allowing for a very exact energy distribution, that can be adapted in accordance with the characteristics of the surface to be hardened, for example, so as to apply less energy in the more heat sensitive regions or areas, such as close to the oil lubrication holes of a crankshaft. For example, a fiber laser can be useful to implement this kind of energy distribution, for example, by using a "pixel" approach by which very specific subareas are heated in accordance with a desired two-dimensional energy distribution. For rapid scanning along parallel lines, polygonal mirrors can be used, as known in the art.

Figure 6C:
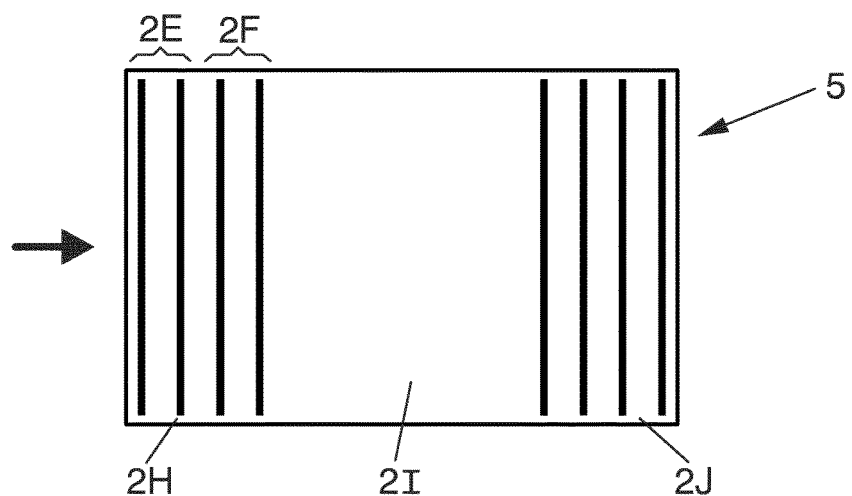

FIG. 6C illustrates an effective laser spot 5 comprising three different portions, namely, a first portion 2H comprising a plurality of lines of the scanning pattern, a second portion 2I without any such lines, and a third portion 2J comprising a plurality of lines of the scanning pattern. The first portion 2H can optionally comprise a leading subportion 2E with a higher energy density and a trailing subportion 2F with a lower energy density. On the other hand, the energy density in the first portion 2I can be higher than the energy density in the third portion 2J, which in turn can be higher than the energy density in the second portion 2I, where the energy density can be zero or close to zero. The effective laser spot 5 can be obtained by repetitively scanning the laser beam along all of the lines of the scanning pattern, adapting scanning speed and/or beam power and/or on/off switching of the laser beam in different segments of a line, so as to distribute the energy according to a desired power or energy distribution pattern. Due to the second portion where no heating takes place, the first portion 2H of the scanning pattern can be selected to bring the surface temperature of the workpiece to a high temperature such as in the order of 1400° C. as rapidly as possible (due to the high power density at the leading subportion 2E) and to keep it there for a sufficient time to achieve a desired hardening depth (by appropriately selecting the length of the first portion 2H in the direction of the relative movement between the effective laser spot and the surface of the workpiece, considering the speed of said relative movement), the second portion 2I can allow for quenching by cooling of the heated portion, such as self-quenching, and the third portion 2J can feature a scanning pattern, speed and beam power appropriate for heating the workpiece to a temperature, such as in the order of 400-500° C., so as to temper the hardened area. In this way, hardening and tempering can take place subsequently during one single step of displacement or sweep of the effective laser spot 5 over the surface to be hardened and tempered. This can serve to speed up the complete sequence of hardening and tempering. (The temperature to which the surface is to be heated depends on the material of the workpiece, for example, on the kind of steel that is used and on its composition. The value of 1400° C. is mentioned merely as an example.)

Figure 6D:
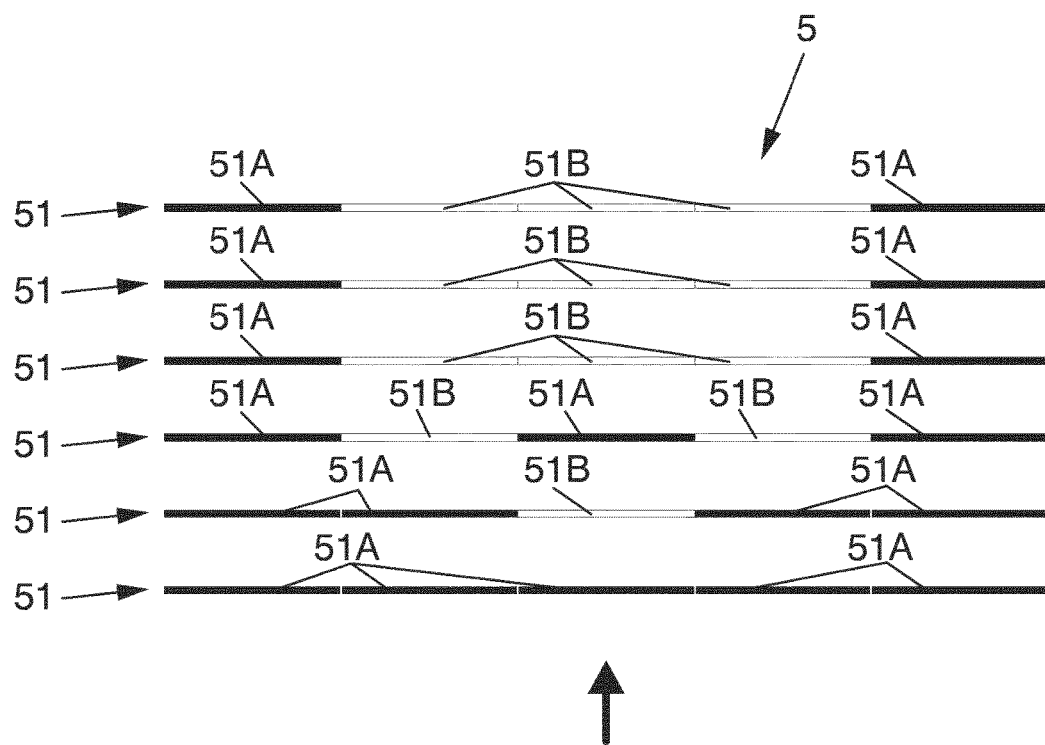

FIG. 6D schematically illustrates a scanning pattern with six lines 51 each line comprising five segments or pixels 51A, 51B. For each segment, the laser beam is on (segments or pixels 51A) or off (segments or pixels 51B), in accordance with a desired energy distribution which can be varied dynamically during the hardening process. Thus, the layout of FIG. 6D thus represents a 6×5 pixelization, and can easily be obtained with commercially available laser and scanning systems. The use of a laser allowing for rapid on/off switching, for example a fiber laser, can increase the number of pixels of the scanning pattern for a predetermined scanning frequency. The number of lines that can be achieved for a certain scanning frequency, such as 50 Hz or 100 Hz or more, will depend, inter alia, on the scanning means used.

Instead or in addition to simply turning the laser beam on and off, also other laser beam power states can be used, that is, different power levels between the maximum power and zero (or close to zero) power. The power states corresponding to different segments can be stored in a memory, and be dynamically modified during the hardening process so as, for example, reduce the energy density in an area adjacent to an oil lubrication hole by reducing the power level assigned to one or more of the segments whenever necessary. This segmented or pixelized approach is very practical and allows the user to find appropriate energy distributions across the effective laser spot by trying different combinations of power states, that is, the power that the beam should have at different segments, until finding a combination that provides a desired result. If the laser allows for rapid switching between different power states or levels, a high number of segments can be completed per second, allowing for a sufficiently high rate of repetition of the scanning pattern to avoid substantial temperature fluctuations, while at the same time accommodating a reasonable amount of segments. For example, when the laser allows for 1000 changes of power state per second, a scanning pattern repetition frequency of 100 Hz can be combined with a scanning pattern having 10 segments.

Figure 7A:
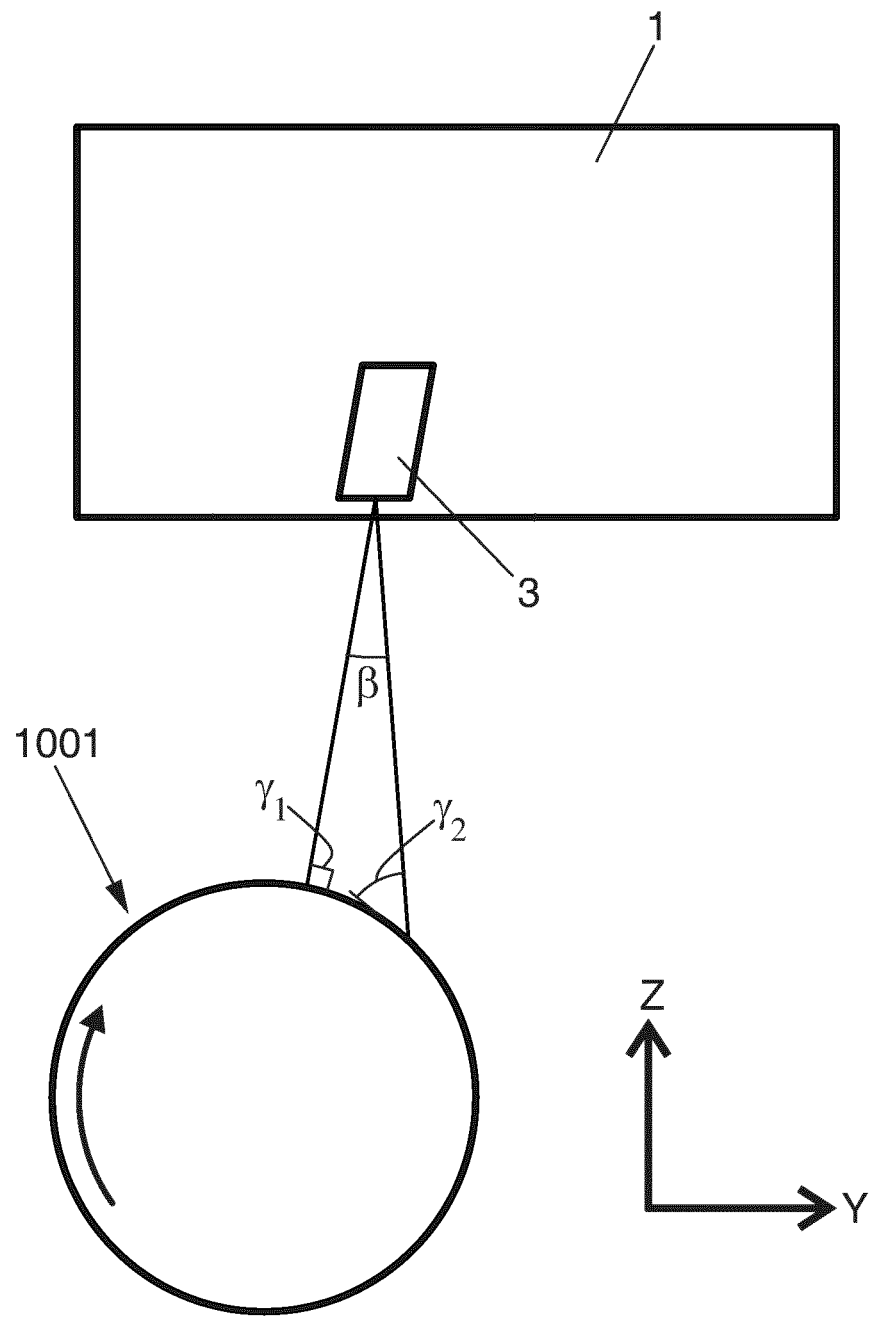
FIGS. 7A and 7B are two schematic cross sectional side elevation views in the Y-Z-plane, of a variant of the layout shown in FIG. 3.

FIG. 7A is a cross sectional view through a main journal 1001 in a variant of the system shown in FIG. 3. Here, the laser source is slightly offset with regard to the vertical plane of symmetry of the main journal 1001 along the X axis. This means that the laser beam, when sweeping the β angle, will reach the surface of the workpiece at different angles, between the angle $\gamma_1$ which in this case is approximately 90 degrees, and the angle $\gamma_2$ which in this case is substantially less than 90 degrees. If the scanning speed and pattern is constant throughout the scanning and if the power of the beam is likewise kept constant, this means that the power density per unit of surface area will be higher at the leading edge (that is, where the surface of the rotating body enters the area swept by the laser beam during scanning), due to the larger angle $\gamma_1$, and lower at the trailing edge, due to the smaller angle $\gamma_2$. As explained in relation to FIG. 6A, this arrangement can help the surface temperature to rapidly reach the austenitizing temperature zone.

Figure 7B:
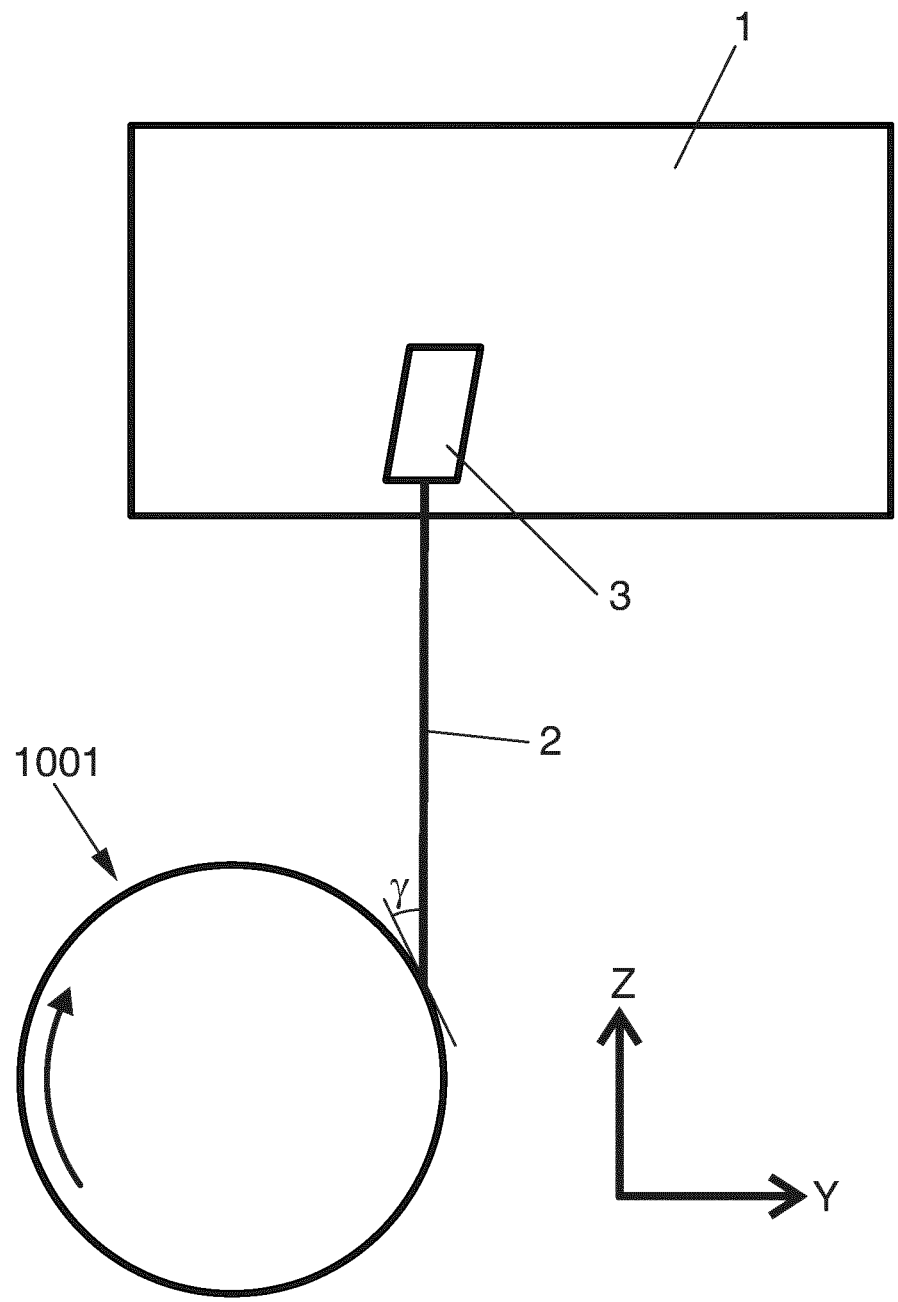

FIG. 7B shows an alternative arrangement in which the laser beam is kept steady or is scanned only in the vertical plane parallel with the X axis, that is, in accordance with angle α of FIG. 3. In this case, the offset position of the laser beam with regard to the plane of symmetry implies that the laser beam hits the surface under an angle γ substantially smaller than 90 degrees. This can have two effects: first of all, the area of the spot will become bigger, which can be an advantage as it spreads out the power of the laser beam over a larger area. Also, if the thickness of the laser beam (in the direction of the Y axis) is not so small that it can be disregarded, there will be a difference between the angle of incidence between the laser beam and the surface of the workpiece at the leading edge of the spot, and the corresponding angle at the trailing edge of the spot. This means that the above-mentioned effect of rapid heating of the surface when it enters the spot, due to a higher power density at the leading edge, can be achieved. This embodiment can, for example, be advantageously used with fixed optics providing for a substantially rectangular laser spot. Also or alternatively, this concept can be used in combination with a one-dimensional scanning in parallel with the X-axis, establishing a virtual rectangle having the width corresponding to the diameter or width of the laser spot, and a length corresponding to the sweep of the laser beam in parallel with the X axis.

In order to increase the size of the laser spot, similar approaches can be made when the surface area to be hardened is flat or non-circular: the laser beam can be projected onto a flat area so that it is not perpendicular to said flat area.

Sometimes, it is desirable to harden surfaces that are difficult to reach with the laser except for at very small angles. For example, in the case of crankshafts, the wall surfaces 1005 extending substantially perpendicularly from the surfaces of the main journals and the rod journals will often be almost parallel with the laser beams emitted from a laser source 1 in an arrangement such as the one of FIG. 2. This can tend to reduce the power absorption rate at those surfaces, and make hardening of them more difficult and/or energy consuming: laser light received at a small angle relative to the surface tend to be less well absorbed than laser light received at a large angle, such as 90 degrees, that is, perpendicularly with regard to the surface.

However, absorption also depends on the polarization. Thus, if for one polarization (s or p) the power is better absorbed when the laser beam is directed perpendicularly to the surface (that is, at 90 degrees with regard to the surface), with an opposite polarization absorption of power is higher when the laser beam is directed to the surface at a small angle, such as an angle close to zero, that is, with the direction of the beam almost aligned with the surface. In the case of workpieces such as crankshafts, where the walls are sometimes fairly large and separated by a fairly short journal, an arrangement such as the one of FIG. 2 will have to project the laser beam onto the walls 1005 at a relatively small angle, at least for the part of the walls that are close to the journals.

Figure 8:
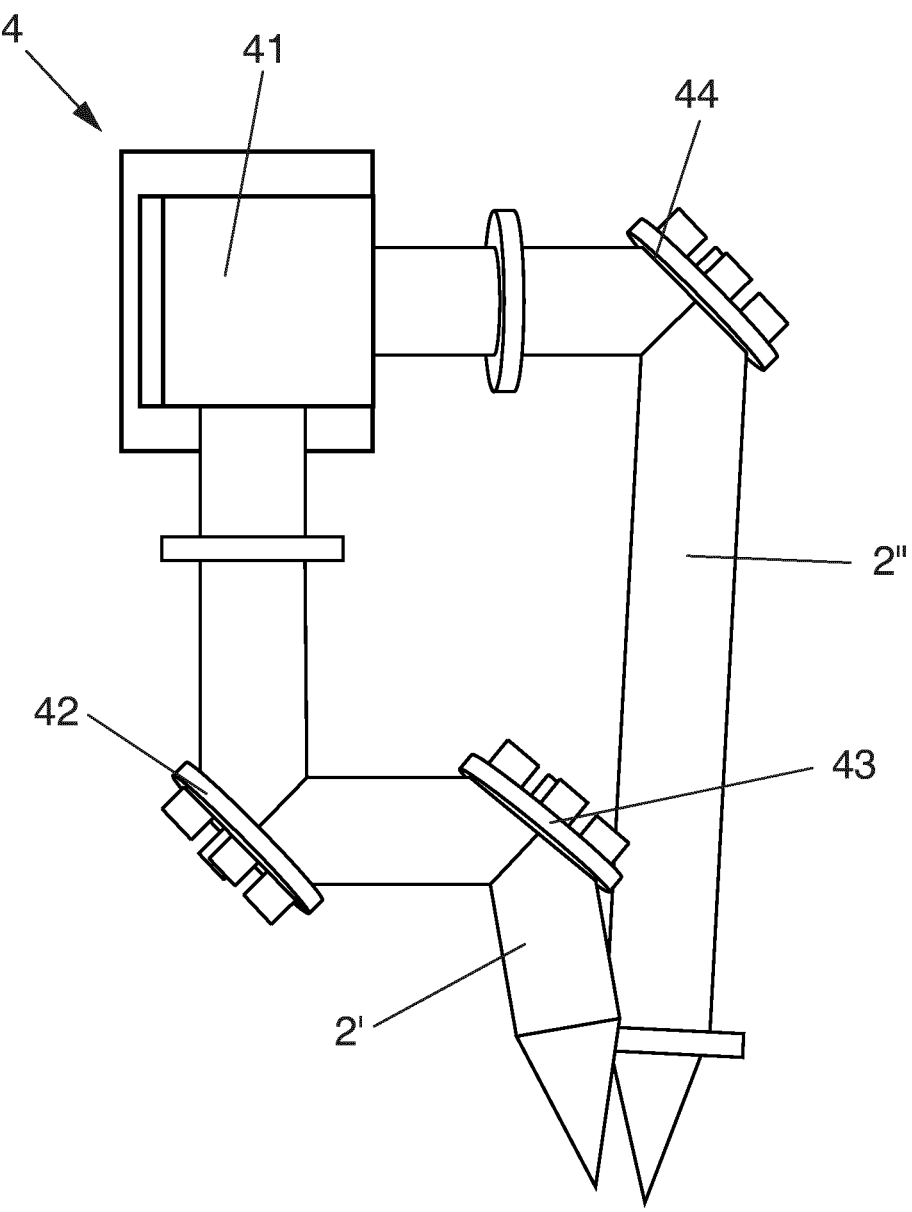
FIG. 8 schematically illustrates a polarizer that can be used as part of the laser source, in some embodiments of the invention.

FIG. 8 illustrates a polarization system 4 that can be used as part of the laser source 1: it includes a beam-splitting polarizer 41 such as a polarization cube which divides an incoming laser beam into an s-polarized beam 2' and a p-polarized beam 2", one of which can then be used for hardening the surface of, for example, the main journals 1001 and the rod journals 1002, and the other one of which can be used for hardening the surfaces of the walls 1005. Mirrors 42, 43 and 44 can be used to realign the s-polarized beam 2' and the p-polarized beam 2" to become substantially parallel.

Figure 9:
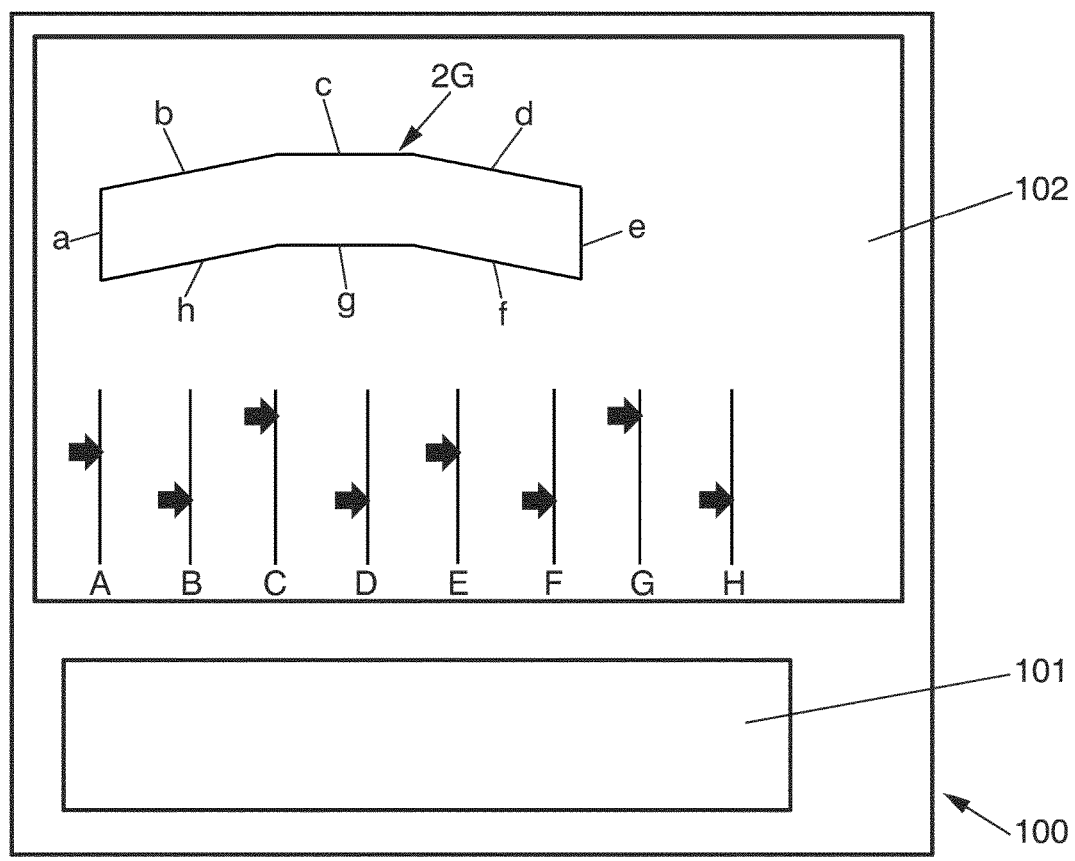
FIG. 9 schematically illustrates a computer system and a scanning pattern stored in and/or generated by said computer system.

FIG. 9 schematically illustrates a computer means or system 100, such as a personal computer or other programmable device or means, having computer input means 101 such as a keyboard and/or mouse, and a computer screen 102. A scanning pattern 2G is illustrated on the screen. In this case, the scanning pattern is a polygon comprising a plurality of segments a, b, c, d, e, f, g and h. In the illustrated embodiment, the segments form a polygon, namely, an octagon. However, a larger or smaller number of segments can be used, and some or all of the segments can be curved instead of straight, and the segments can be distributed in other ways, such as in a plurality of more or less parallel lines. The computer system can be arranged such that an operator can change the layout of the pattern, for example, by using a mouse or other input means, for example, by moving a cursor on the screen. As an alternative, a touch sensitive screen can be used, allowing the user to manipulate the shape of the pattern by touching the segments, thereby changing their position, orientation and/or length. The shape of the pattern represents the path that the laser spot will describe when scanning the surface to be hardened, for example, to create a virtual or equivalent effective laser spot having a two-dimensional energy distribution.

On the screen there is also a plurality of lines A-H, each of them corresponding to one of the segments a-h, respectively. Each of said lines A-H represents one characteristic of the laser spot in relation to the corresponding one of the segment a-h, for example, a scanning speed range. In the illustrated embodiment, the arrow next to each line indicates a specific scanning speed selected for said segment, that is, the speed at which the laser spot travels along the corresponding segment while following the scanning pattern. In the present case, the highest scanning speed has been assigned to segments c and g, a somewhat lower scanning speed has been assigned to segments a and e, and an even lower scanning speed has been assigned to segments b, d, h and f. In other embodiments of the invention, in addition or as an alternative to assigning different scanning speeds to different segments, different laser beam powers can be assigned to the different segments, such as by selecting the laser beam to be "on" or "off" or at another available power state (such as 10%, 25%, 50%, 75% or 90% of the maximum power), for the different segments in accordance with a desired energy distribution. The segments can indicate the route followed by the center of the scanning spot, and the scanning spot can, for example, have a diameter corresponding to half the length of the segments a and c. If so, every time the spot completes the route determined by segments a-h, the entire area within said segments is directly heated by the laser, as well as part of the area outside said segments, until a distance corresponding to half the diameter of the laser spot.

The octagon 2G can, for example, be used instead of the rectangles 2A/2B or the trapezoids 2C/2D in the embodiments of FIGS. 4 and 5. In this case, for example, the higher scanning speed in segments c and g can reduce the heating in the area of the oil lubrication holes 1003, and the increased speed in segments a and e can help to prevent overheating in the area of the undercut fillets 1004. Also, the computer system can be programmed so as to use one kind of pattern 2G when an area remote from the oil lubrication holes is being scanned, and another kind of pattern (for example, a pattern with different and/or differently oriented segments, and/or with different speeds or beam powers assigned to some or all of the segments), when the area adjacent to—or including—the oil lubrication holes is being scanned. For example, the same outline of the segments may be used but with different speed (and/or beam power) at segments c and g depending on whether the area around the oil lubrication holes is being scanned, or not.

This system can be used together with a pyrometer to allow for trial and error adaptation of the scanning pattern 2G, for example, by carrying out laser hardening of trial workpieces and modifying the scanning pattern (shape, scanning speed, laser beam intensity, laser spot size, etc.) for one or more segments, depending on the results. Also, or as an alternative, the computer system 100 can be provided with simulation software to simulate the heating that will result from a chosen pattern 2G and the from the scanning speeds (and/or other parameters, such as laser beam power, laser spot size, etc.) assigned to the different segments a-h, so that within a short time the user can find a pattern configuration that will appear to be useful. The result of the simulation can, for example, be shown on the screen 102. The user can then dynamically modify the pattern 2G and the parameters assigned to the different segments, and observe the resulting heating. This tool can be helpful to easily find pr design a suitable scanning pattern with appropriate parameter values assigned to the different segments, for a given workpiece design.

For example, this kind of system can advantageously be used to find a suitable scanning pattern or scanning patterns for a given crankshaft, for example, by dynamically adapting parameters of the pattern (its shape and dimensions, for example, by enlarging or shortening segments) and/or the parameters associated to each segment, such as, for example, laser spot speed (by modifying the scanning speed), power (for example, by modifying the power content of the laser beam) and/or power density (for example, by changing the size of the laser spot, for example, by defocusing, for example, by displacing a focusing lens, or by changing the angle of incidence between the laser beam and the surface). In some embodiments of the invention, also the power distribution within the laser beam can be adapted. In some embodiments of the invention, a specific scanning pattern such as one in line with the one of FIG. 6D can be selected, and adaptation of the energy distribution can be established by selecting the beam power and/or scanning speed to be assigned to each segment 51A, 51B.

It has been found that using this kind of segment-based definition of the scanning pattern, allowing on the one hand the creation of a pattern outline by increasing and/or reducing the number of segments and/or the length of the segments and/or modifying their orientation and/or position, and selecting and assigning different power or energy related parameter values such as scanning speed, beam power and/or spot size values to each segment, makes it easy to obtain an adequate heating of the different portions of the surface to be heated. More heat sensitive subareas such as the area adjacent to the oil lubrication holes 1003 of a crankshaft can be dealt with appropriately, for example:

By using the same scanning pattern (in terms of the path followed by the spot) both for the more heat sensitive areas and for the less heat sensitive areas, but adapting other parameters so as to avoid overheating of the more heat sensitive areas, for example, by choosing selected segment to have a higher scanning speed (and/or lower beam power, etc.); in the case of FIG. 9, increasing the speed at segments c and g will help to reduce overheating at the oil lubrication holes 1003 centrally placed in a journal across which the laser beam is scanned in accordance with pattern 2G; in the case of FIG. 6D, assigning a low (such as zero or close to zero) beam power to some of the central segments 51B of the lines 51 can also help to prevent overheating at an oil lubrication hole passing through the central portion of the pattern, in the direction suggested by the arrow in FIG. 6D.

By using different sets of scanning patterns and associated parameter values for different subareas; for example, during rotation of a crankshaft, a journal can be scanned as suggested by FIG. 5A, but with a scanning pattern having the layout of FIG. 9; when the oil lubrication hole 1003 reaches or approaches the portion of the surface that is being scanned, the speed value associated to segments c and g can be modified, so that the laser beam scans these segments at a higher speed, thus reducing the risk of overheating of the area adjacent to the oil lubrication hole.

By changing the shape of the pattern, for example, by modifying the length and orientation of segments, and even by leaving out segments. For example, segment g of scanning pattern 2G can be left out, during the entire rotation of the workpiece or when scanning an area of the workpiece adjacent to or including an oil lubrication hole; in that case, the laser spot can follow the path from segment h, over segments, a, b, c, d, e and until segment f, and then return in the opposite direction, that is, over segments f, e, d, c, b and a, until reaching the end of segment h.

Thus, a computer system providing for the control of the laser beam on the basis of a segmented scanning pattern, where different values of, for example, scanning speed (that is, the speed of the movement of the laser spot along its path), laser beam power, and/or laser spot size, can be assigned to different segments, can be useful for adapting the scanning pattern to provide for an optimized energy distribution and optimized heating of a surface, for the purpose of adequate hardening of the surface with reduced damage or risk for damage to sensitive portions. The above explanation has predominantly referred to the scanning speed, but, obviously, the heating can also be modified by modifying the power of the laser beam, or the power density, for example, by de-focusing, for example, by moving a lens. However, for many currently existing lasers and scanning means, modifying the speed may be a preferred option. When lasers are used that allow for rapid on/off switching or rapid change of the power of the beam (such as many fiber lasers that currently require approximately 100 µs for changing between "on" and "off"), modifying the power of the laser beam, for example, by switching it on and off, becomes an increasingly interesting option; the option is even more interesting in view of the trend towards shorter switching times.

In order to provide a virtual laser spot (such as an "octagonal" laser spot by rapidly scanning the area following the pattern 2G of FIG. 9, or a segmented effective laser spot such as the one of FIG. 6D), scanning must be performed at high frequency, that is, high speed. For example, in a practical embodiment, the laser beam can complete a scanning cycle along segments a-h in a period of, for example, 8 ms; often, such as when using diode lasers or other lasers where on/off switching is slow, it may be difficult or expensive to modify the power of the beam rapidly enough to place it at the right level at each and every segment; it will often be more practical to modify the scanning speed, something that is within the capacity of commercially available scanning systems. However, depending on the capacity of the laser for switching of power level, modulation of the beam power can be preferred.

The scanning pattern of FIG. 9 features a set of interconnected segments. However, depending on the kind of laser and/or scanning means that are used, also non-interconnected segments can be used. For example, the scanning pattern can comprise a plurality of lines or dots or pixels; this kind of scanning pattern can often be preferred when a laser is used that allows for rapid on/off switching, such as a fiber laser. Thereby, very complex and sophisticated patterns can be used, allowing for a very exact selection of the energy distribution in the area that is being scanned. Thus, the system can be tailored to provide exactly the energy distribution that is needed considering the presence of heat sensitive regions such as, for example, oil lubrication holes in a crankshaft.

Figure 10:
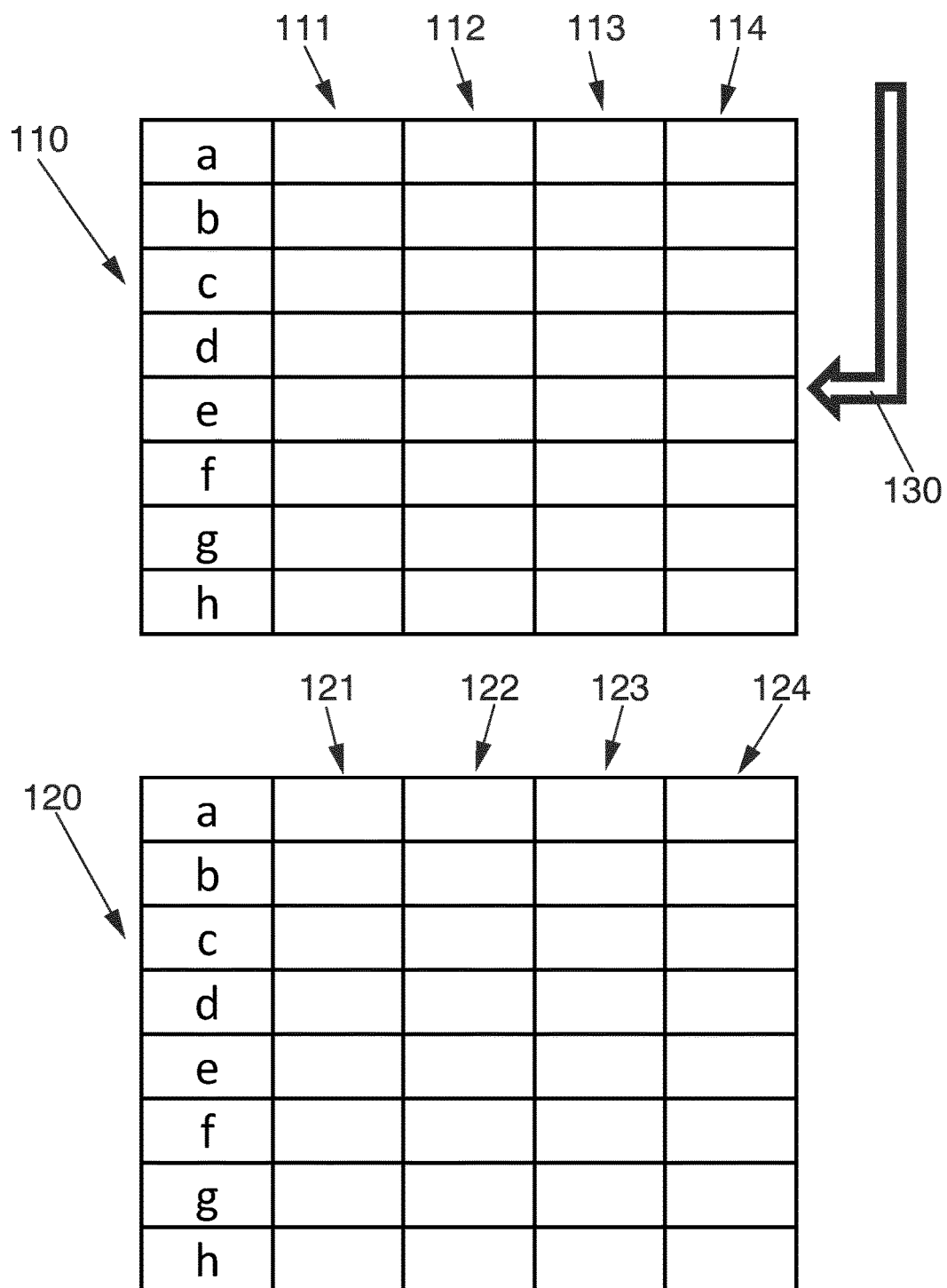
FIG. 10 schematically illustrates memory positions within said computer system.

FIG. 10 schematically illustrate a first 110 and a second 120 computer memory area associated to the computer system 100, each memory area comprising a memory matrix having a plurality of columns, each column including one memory location assigned to each of the segments a-h of the scanning pattern 2G. Said columns can contain the following data:

The data in the scanning pattern segment columns 111 and 121 can define the shape of the pattern, that is, the arrangement of the segments (such as start and end points of each segment).

The data in the scanning speed columns 112 and 122 can define, for each segment, the scanning speed associated to that segment, that is, the speed with which the laser spot will move along the corresponding segment of the scanning pattern or path.

The data in the beam power columns 123 and 133 can define, for each segment, the beam power, that is, the power of the laser beam as it moves along the corresponding segment.

The data in the spot size columns 114 and 124 can define, for each segment, the size of the laser spot as it moves along the corresponding segment. By focusing/defocusing the laser beam, for example, by moving a motorized focusing lens or by moving the laser source in parallel with the Z axis of the system, the size of the spot and, thus, the power density per unit of surface area, can be changed. This can also be achieved by modifying the angle of incidence of the laser beam onto the surface, for example, by off-setting the laser beam as suggested in, for example, FIGS. 7A and 7B.

In some embodiments of the invention, there is only one of these computer memory areas, that is, speed, beam power and spot size can be constant throughout the process. In other embodiments, there are two or more of these memory areas, and a pointer 130 can be used to dynamically modify the scanning during the relative movement between the surface of the workpiece 1000 and the laser source 2: for example, as an oil lubrication hole 1003 approaches the portion of the surface being scanned, a first scanning pattern (with its associated set of parameter values for, for example, scanning speed, laser beam power, laser spot size and/or angle of incidence) defined by the first memory area 110 can be replaced by a second scanning pattern (with its associated set of parameter values for scanning speed, laser beam power and/or laser spot size, etc.) defined by the second memory area 120, so as to prevent overheating at the edges of the oil lubrication hole. For example, the second scanning pattern can have a higher scanning speed, and/or a lower laser beam power, and/or a larger laser spot size, associated to the segments that will be crossed by the oil lubrication hole during scanning, compared to the first scanning pattern.

In some embodiments of the invention, there will be only one or some of the columns 111-114, or there may be more columns specifying data relating to further aspects of the process. In some embodiments of the invention, only one or two of scanning speed, laser spot size and laser beam power will vary between different segments and patterns. In some embodiment, there may be only one memory area 110 as the path followed by the laser spot, as well as its associated parameter values, will remain constant throughout the process.

Figure 11:
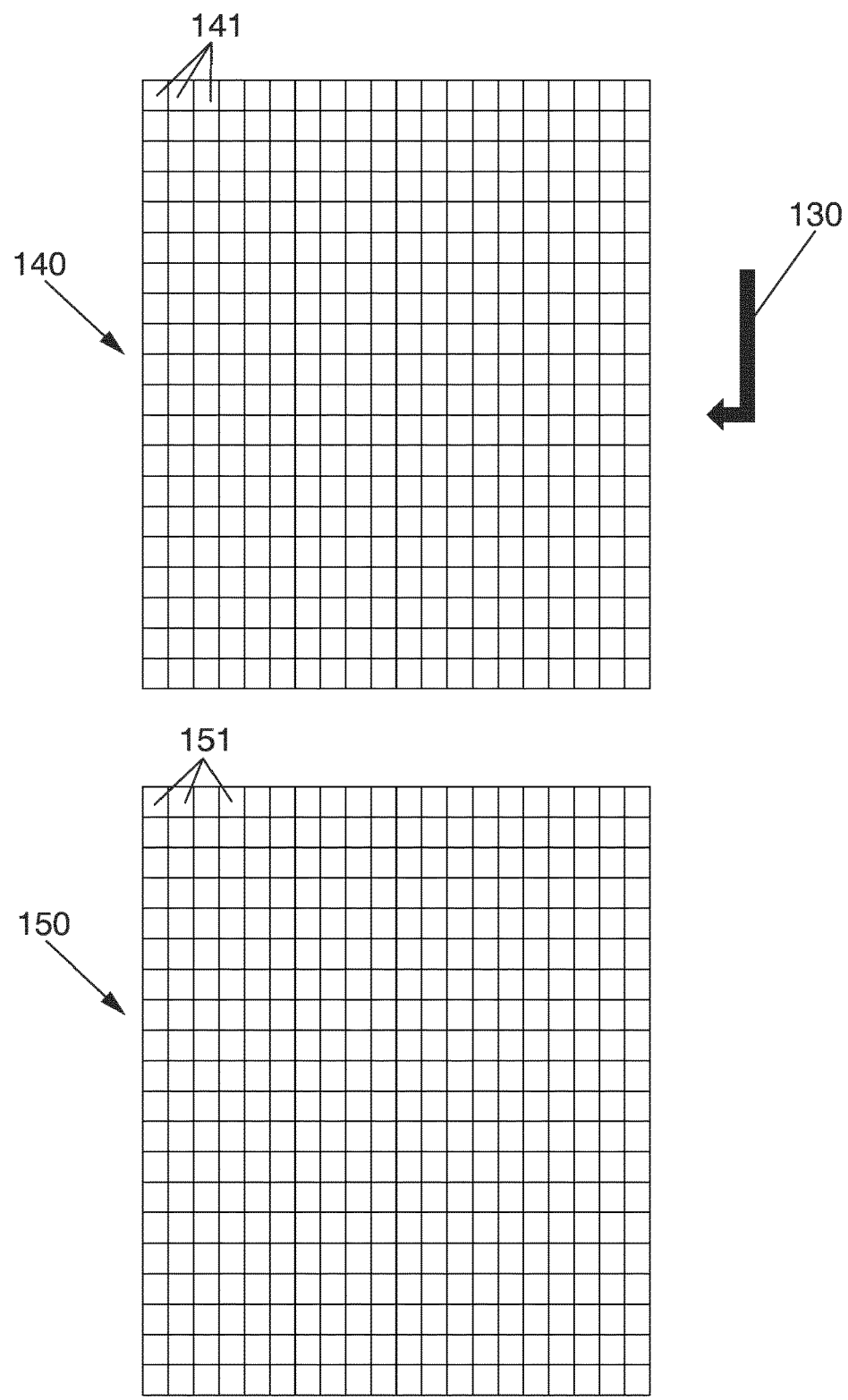
FIG. 11 schematically illustrates memory positions within a computer system in accordance with an alternative embodiment of the invention.

FIG. 11 schematically illustrates two computer memory areas in accordance with an alternative embodiment of the invention, where each computer memory area 140, 150 comprises a plurality of memory locations 141 each corresponding to a pixel or segment of an area to be scanned. Each memory location can comprise a power state value indicative of laser power, such as a value indicative of an on or off state of the laser, or a value that indicates a certain power level. Thus, when scanning the laser beam over an area to be scanned (for example, by letting the laser beam follow a plurality of parallel lines that extend over said area), the laser beam can be turned on and off according to the value of the corresponding memory location. In some embodiments of the invention, each memory location can correspond to a "line" of the scanning pattern, and in other embodiments of the invention each memory location can correspond to a portion or segment of a line, so that a pixelized energy distribution can be achieved (an example of a scanning pattern with such a segmented or pixelized energy distribution is given in FIG. 6D). The level of detail of the pixelization or subdivision of the area to be scanned into subsegments having different laser power levels (such as on/off and/or intermediate power levels) assigned to them can depend on features such as the scanning speed and the capacity for on/off switching of the laser. Just as in the case of the embodiment illustrated in FIG. 10, a pointer 130 can be used to switch between one kind of scanning pattern and another, thus adapting the energy distribution depending on the characteristics of the area that is being scanned, for example, so as to take the presence of an oil lubrication hole into account.

The 20×20 pixelization suggested by FIG. 11 is just by way of example, and any other suitable number of rows and pixels per row can be used. For example, the number of lines can be limited by the speed of the scanning means and the scanning frequency (that is, the frequency with which the scanning pattern is repeated), and the number of pixels or pixels per line can, for a given scanning frequency and number of lines, be limited by the capacity of on/off switching of the laser. For example, in the case of a laser requiring 100 µs for switching on and 100 µs for switching off, that is, 200 µs for one on/off cycle, and using a scanning frequency of 100 Hz and a scanning pattern of 5 lines to complete the effective virtual laser spot, the number of pixels per line can be approximately 10.

Figure 12C:
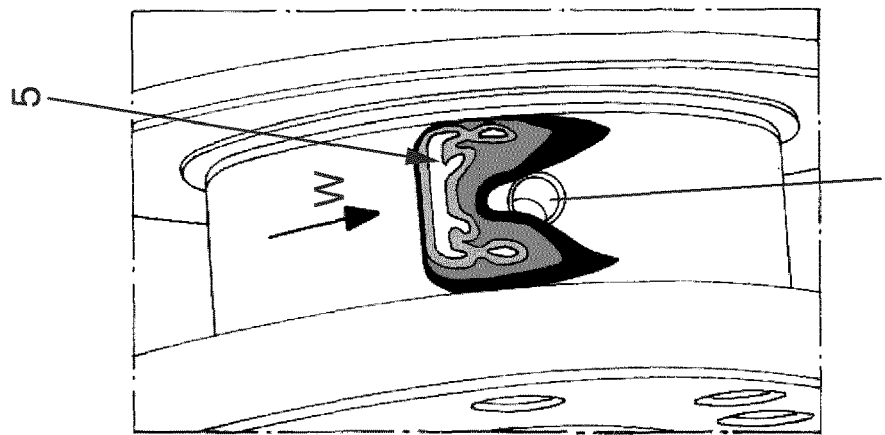
FIGS. 12A-12C schematically illustrate how the energy distribution of an effective laser spot is adapted when hardening the area around an oil lubrication hole.
Figure 12B:
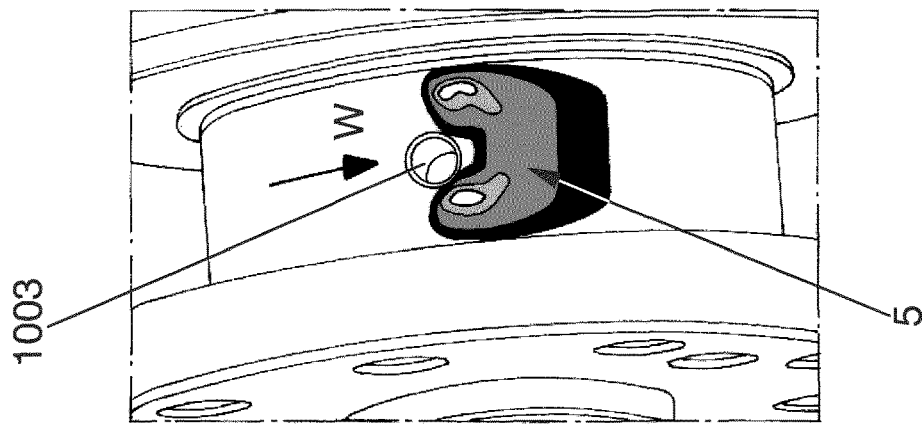
Figure 12A:
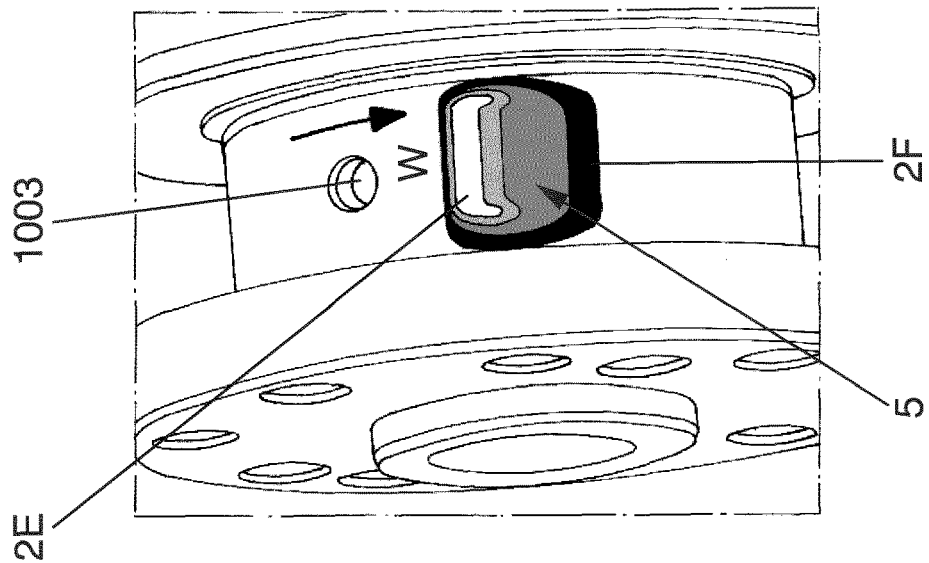

FIGS. 12A-12C show how the energy distribution of an effective laser spot can be adapted to accommodate for an oil lubrication hole. The oil lubrication hole 1003 is positioned in a surface of a journal of a crankshaft, and said surface extends in a first direction parallel with the axis of rotation of the crankshaft, and in a second, circumferential direction W. In FIG. 12A, a substantially rectangular equivalent effective laser spot 5 is used, having a leading portion 2E with higher power density and a trailing portion 2F with lower power density. However, as shown in FIG. 12B, when the oil lubrication hole 1003 approaches the effective laser spot due to the relative movement between the surface of the crankshaft and the laser source due to, for example, rotation of the crankshaft around its longitudinal axis, the energy distribution is substantially adapted by reducing the power or energy density towards the center of the leading portion 2E, so as to avoid overheating of the area adjacent to the oil lubrication hole 1003. Here, the effective laser spot is substantially U-shaped. Subsequently, once the oil lubrication hole 1003 has passed the leading portion 2E, the original energy distribution at the leading portion is restored, whereas the energy distribution at the trailing portion 2F is adapted to accommodate for the oil lubrication hole 1003, by reducing the energy or power density towards the center of the trailing portion. Here, the effective laser spot 5 substantially adopts an inverted-U-shape (which in some embodiments of the invention can be obtained using a segmentation or pixelization in line with the one of FIG. 6D, and adapting the power states assigned to the different segments so as to provide the corresponding shapes of the effective laser spot). That is, while the oil lubrication hole is passing through the effective laser spot, the energy distribution is adapted so as to apply less energy to the more heat sensitive area adjacent to the oil lubrication hole, than what is applied to the surface to be hardened away from said oil lubrication hole. The area around the oil lubrication hole can be hardened without harming the more heat sensitive subarea adjacent to the oil lubrication hole; the lateral portions of the U-shaped effective laser spot serve to harden the areas at the sides of the oil lubrication hole. The change in energy distribution illustrated in FIGS. 12A-12C can, for example, be obtained by adapting the scanning pattern, and/or by adapting the way in which the beam power is distributed along the scanning pattern (for example, by adapting the way in which the laser beam is switched on and off during different segments of the scanning pattern), and/or by adapting the scanning speed in correspondence with different segments of the scanning pattern, etc.

Figure 13:
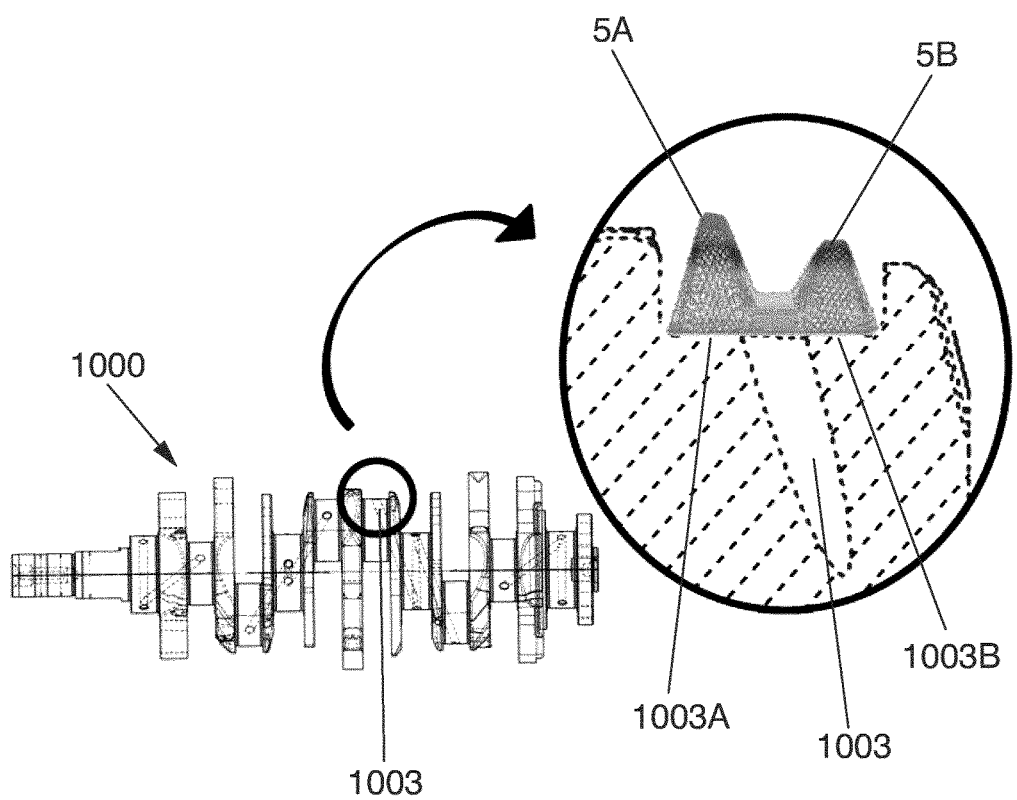
FIG. 13 schematically illustrates how the extension of the oil lubrication hole can be taken into account in accordance with some embodiments of the invention.

FIG. 13 schematically illustrates how the energy distribution is adapted to take into account the inclination of an oil lubrication hole 1003, by applying more energy 5A to the side 1003A of the oil lubrication hole that is not placed over the oil lubrication hole 1003, and less energy to the side 1003B of the oil lubrication hole that is placed over the oil lubrication hole, that is, to the side towards which the oil lubrication hole extends into the body of the crankshaft. This can, for example, be obtained by correctly choosing the power states assigned to different segments of a scanning pattern. This difference in the application of energy takes into account the fact that the absence of conductive material due to the existence of the oil lubrication hole extending downwards towards the right in FIG. 13 reduces the capacity of the heat applied to the right of the oil lubrication hole 1003 to be conducted away from the heated area. Applying the same amount of energy to both sides would basically amount to a waste of energy, as it would provide for a thicker hardened layer at the right side 1003B of the oil lubrication hole of FIG. 13, than at the left side 1003A; however, when it comes to the need for compliance with the requirement of a minimum thickness of the hardened layer, the thinnest portion of the hardened layer has to meet the requirement. Thus, making the hardened layer extra thick at the right of the oil lubrication hole 1003 does not make any sense in what regards meeting the requirements set by a costumer, and merely represents a waste of energy. Also, applying the same amount of energy on both sides could imply an increased risk for overheating at one of the sides. This risk is increased due to the fact that the angle between the inner wall of the oil lubrication hole and the surface of the track to be hardened is sharper at the side to which the oil lubrication hole extends, that is, the angle is sharper at the right of the oil lubrication hole of FIG. 13 than at the left, which means that the edge is sharper at the right, increasing the risk for damage in the case of overheating.

As indicated above, scanning preferable takes place rapidly so as to avoid substantial fluctuations in the temperature. When the laser beam is repetitively scanned along a two-dimensional scanning pattern—such as along a plurality of parallel lines—to form an equivalent or virtual effective laser spot, portions of the workpiece are repeatedly heated while the portions remain within said scanning pattern. The actual laser spot, when repetitively scanned throughout the virtual laser spot, repetitively heats different spots of the surface, and these spots are thus repetitively heated to a maximum temperature, and after each time they have been heated they tend to cool down until heated again during the next sweep of the laser beam along the scanning pattern, that is, during the next cycle of the scanning. It is desirable to keep these fluctuations between local temperature maxima and minima as small as possible. For this purpose, a high scanning speed and frequency are preferred. FIGS. 14A and 14B schematically illustrate the result of tests performed on a crankshaft using a fixed scanning pattern and power. In the case of FIG. 14A, a scanning frequency of 50 Hz (that is, the laser beam followed the complete scanning pattern 50 times per second) was used. It can be seen that after reaching the maximum temperature, fluctuations between local maxima and minima took place with an amplitude of more than 100° C., actually, close to 200° C. This could be problematic, as it could imply a risk for overheating and/or a risk for inadequate hardening or hardening depth.

FIG. 14B schematically illustrates the result of a test carried out in the same conditions as the one of FIG. 14A, but with a scanning frequency of 250 Hz. Here, it can be observed how the temperature oscillations between the local maxima and minima, corresponding to the thickness of the graph, have an amplitude of substantially less than 100° C.

Figure 15A:
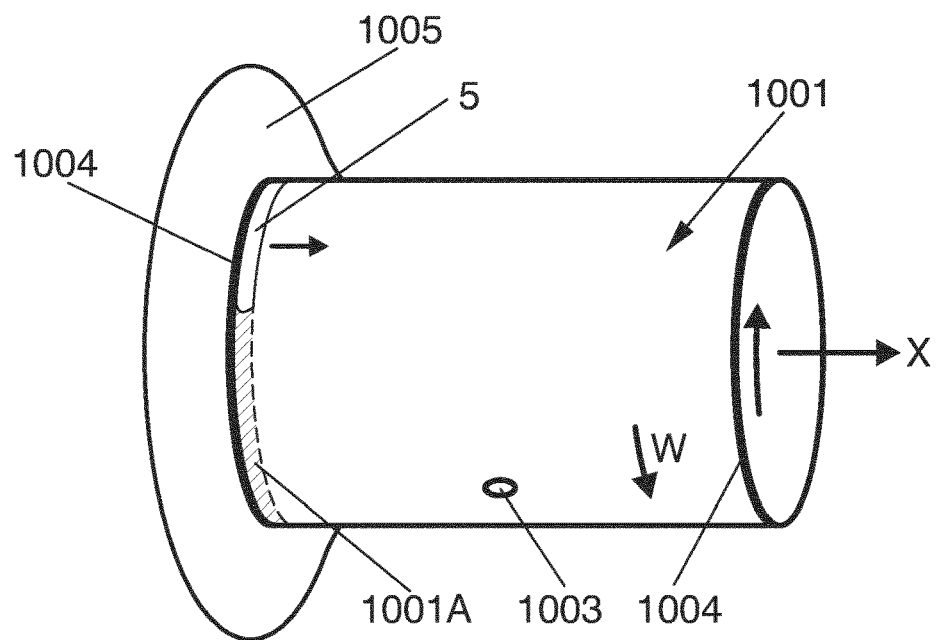
FIGS. 15A and 15B schematically illustrate how an effective laser spot can be applied to produce hardening of a journal of a crankshaft by hardening an annular segment thereof.
Figure 15B:
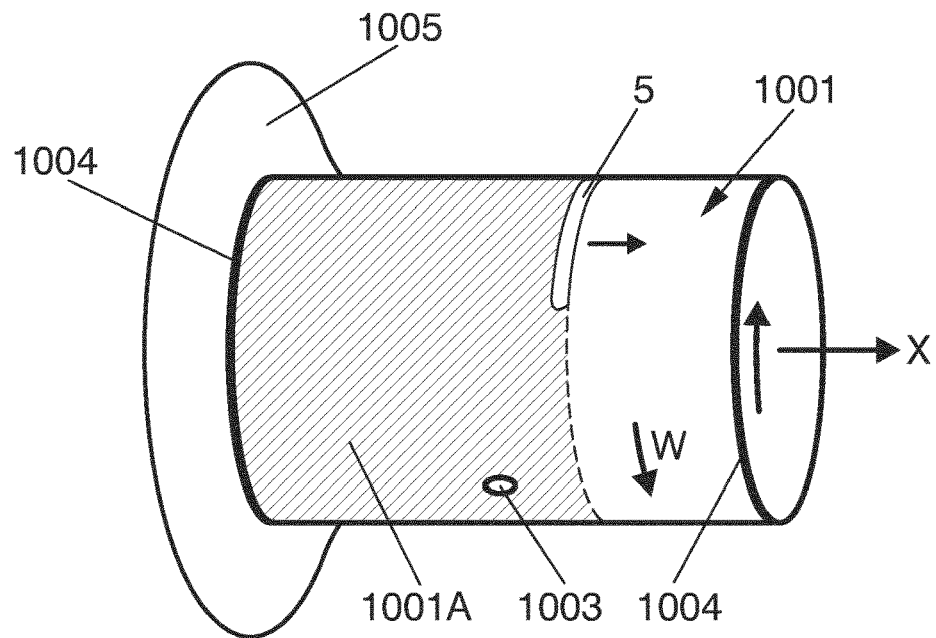

FIGS. 15A and 15B schematically illustrate how an effective laser spot 5 can be applied to a journal 1001 of a crankshaft, with an oil lubrication hole 1003 and undercut fillets 1004, so as to heat a section, such as 30-180 degrees, of an annular segment 1001A thereof. As the effective laser spot 5 extends not more than 180 degrees in the circumferential direction W of the journal, to heat the entire annular segment, the journal can be made to rotate around its axis of rotation X, and/or the laser source can be displaced in relation to the crankshaft. The heating can begin at one lateral end of the journal 1001 as shown in FIG. 15A, proximate to the undercut fillet 1004, and, for example, the journal can be rotated so as to heat the entire circumference, so as to heat the annular segment 1001A to a sufficient temperature and during sufficient time to assure a required hardening depth. In order to harden the entire surface of the journal, the effective laser spot 5 is progressively displaced along the journal, in the direction parallel with the axis of rotation X, for example, by displacing the laser source in parallel with the X axis or by displacing the beam in parallel with the X axis using a scanning mirror. Thus, the heated annular segment 1001A is extended in said direction, and the previously heated portion can start to cool off whereby quenching is achieved. In FIG. 15B, it can be observed how the effective laser spot has been displaced over the major portion of the journal, heating it and, when moving on, allowing it to quench. The effective laser spot is displaced until it reaches the fillet at the right end of FIG. 15B. The two-dimensional energy distribution is adapted in the vicinity of the fillets 1004, and also in correspondence with the oil lubrication hole 1003, to prevent overheating of these parts. An advantage of this way of carrying out the hardening is that there is no re-heating of an already hardened portion, as the growth of the hardened area takes place in the direction from one end of the journal to the other, that is, in the first direction parallel with the axis X of rotation of the journal, and not in the circumferential direction W. That is, hardening takes place from the left to the right, and not in the circumferential direction. Thus, there is basically no risk for undesired re-heating and excessive tempering of an already hardened surface area.

Figures 19A, 19B, 19C:
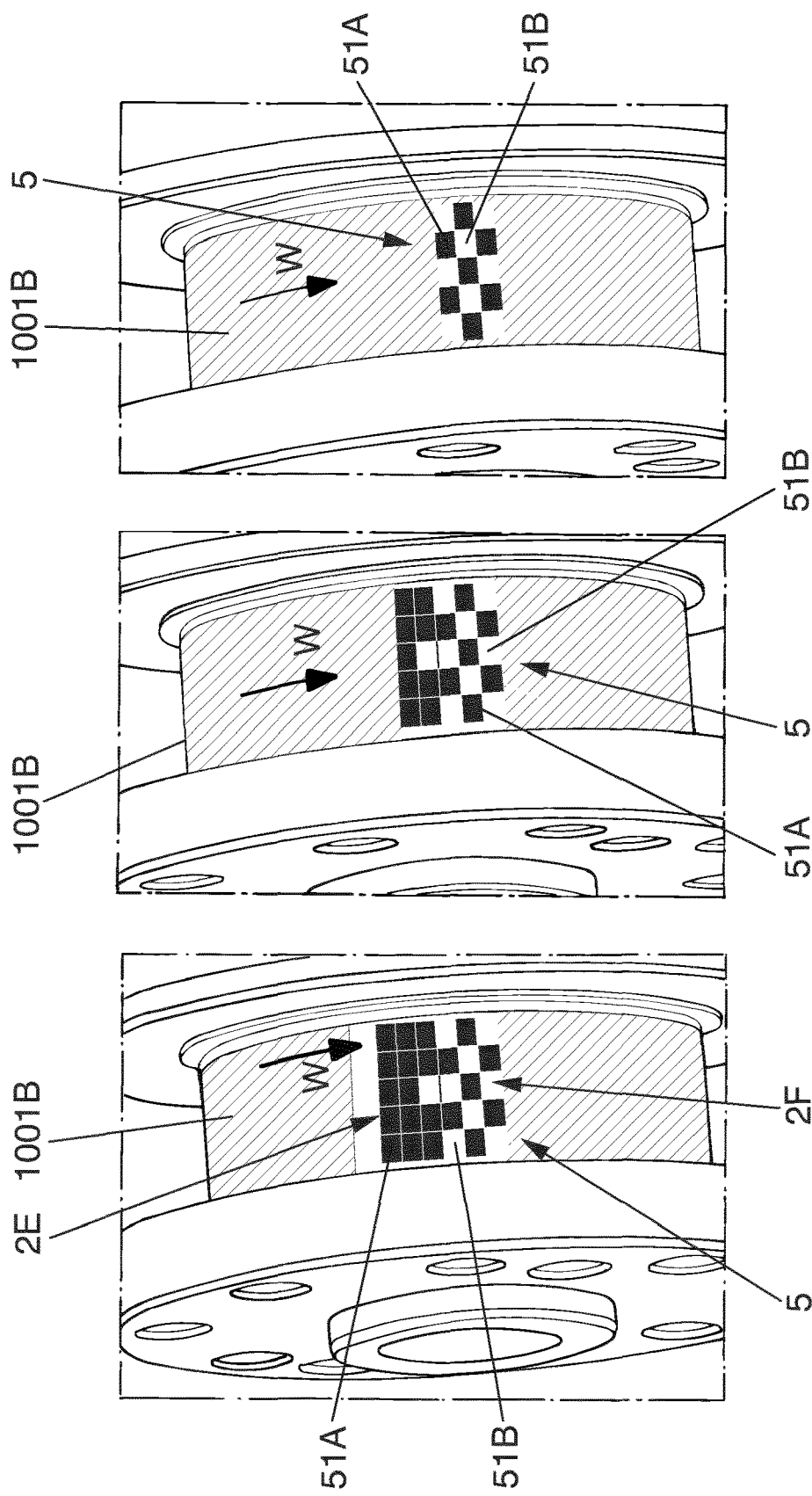
FIGS. 19A-19C schematically illustrate the arrival of the effective laser spot at a previously hardened portion of the track.

When hardening the surface of the journal in the circumferential direction, special attention must generally be paid to the area of overlap, that is, the area where the effective laser spot, close to completing its movement along the track in the circumferential direction, arrives at a previously hardened portion. Re-heating of a previously hardened portion to a high temperature, such as the temperature used for hardening, should generally be avoided. FIGS. 19A-19C show an arrangement similar to the one of FIGS. 12A-12C, but instead of the oil lubrication holes, the more heat sensitive subarea that the laser spot is approaching corresponds to a previously hardened portion 1001B of the journal. In this embodiment, as schematically shown in FIG. 19A, the effective laser spot is composed of an array of segments (similar to the one of FIG. 6D), and when the leading edge of the effective laser spot arrives at the previously heated portion 1001B, the segments in the first row are cancelled (cf. FIG. 19B), for example, by setting the laser to an "off" state in correspondence with said segments. In FIG. 19C, further rows of segments have been cancelled, whereby the effective laser spot has shrunk in the circumferential direction. That is, the effective laser spot is progressively cancelled at its leading edge or portion, when meeting the previously hardened portion 1001B, whereas the trailing edge or portion catches up with said leading portion, until the effective laser spot vanishes.

In other embodiments of the invention, the effective laser spot is not cancelled but the overall power/energy thereof is reduced. Thus, the effective laser spot can travel around the journal one more time, heating the surface to a temperature suitable for tempering.

In other embodiments of this invention, a plurality of laser sources can be used to simultaneously heat several sections of the annular segment, for example, so as to simultaneously heat the entire 360 degrees of the annular segment 1001A. This reduces the need for rapidly rotating the crankshaft in order to avoid fluctuations in the temperature that could negatively affect the quality of the hardening, as explained above. A very high speed of rotation of the crankshaft can be costly to implement, and can make it more difficult to adapt the energy distribution of the effective laser spot or spots so as to avoid overheating of the area adjacent to a rapidly moving oil lubrication hole.

The present invention thus provides for an extremely flexible approach to laser surface hardening, and can therefore be very useful for, for example, laser hardening of workpieces having surface portions having substantially different characteristics in terms of heat transfer sensitivity, and/or substantially different requirements in what regards, for example, aspects such as the depth of the hardened layer.

The system can be operated with feedback from a pyrometer and, for example, PID control.

The following is an example of how the invention can be implemented in accordance with one practical embodiment thereof:

FIGS. 16A, 17A and 18A represent the power or energy distribution over an effective laser spot, calculated for a scanning pattern as per FIGS. 16B and 16C, 17B and 17C, and 18B and 18C, respectively. The scanning pattern is of the type illustrated in FIG. 9 discussed above, namely, a scanning pattern comprising eight segments, which the user can rearrange in what regards their position, orientation and lengths, and for which the user can select and adapt one or more power/energy related parameter values, for example, power of the laser beam and/or velocity of the projected laser spot along the scanning pattern. In this example, constant power was used, and the velocity was adapted on a segment by segment basis. As explained above, the computer system 100 can be provided with calculation/simulation software to calculate/simulate the heating or energy distribution that will result from a chosen pattern 2G and from the scanning speeds (and/or other parameters, such as laser beam power, laser spot size, etc.) assigned to the different segments a-h, so that within a short time the user can find a pattern configuration that will appear to be useful. The calculated energy distributions, such as those of FIGS. 16A, 17A and 18A, can be visualized on a screen 102 to help the user estimate whether the energy distributions are likely to be appropriate.

FIGS. 16A, 17A and 18A show the calculated energy/power distribution over the effective laser spot, calculated on the basis of the specific patterns and velocities of FIGS. 16B, 17B, 18B and 16C, 17C and 18C, for the following values:

d1-d12 indicate the dimensions of the pattern in accordance with the illustrated example; the values in mm according to this example are as follows:

d1=16; d2=2.8; d3=3.1; d4=3.9; d5=7; d6=1.4; d7=0.4; d8=13; d9=5.1; d10=6; d11=2.8; d12=0.2.

v1-v10 indicate the scanning velocities assigned to different parts of the scanning pattern; the values in mm/s according to this example are as follows:

v1=3600; v2=8000; v3=4600; v4=3500; v5=6000; v6=5500; v7=3600; v8=8000; v9=5430; v10=8000; v11=5500

In FIGS. 16A, 17A and 18A the corresponding power or energy distribution patterns are shown. FIGS. 16A-16C relate to a pattern that can be appropriate for heating the surface of a journal of a crankshaft, across the journal in the direction parallel with the longitudinal axis of the crankshaft, in a less heat sensitive subarea, remote from an oil lubrication hole. Thus, the pattern and velocities of FIGS. 16A-16C can be used in a situation as the one illustrated in FIG. 12A. FIGS. 17A-17C illustrate a pattern and the corresponding energy distribution over the effective laser spot when the effective laser spot approaches an oil lubrication hole, such as when the effective laser spot is at the position as illustrated in FIG. 12B, adopting a "U-shape" or similar. Here, considering the scanning pattern illustrated in FIG. 9, one of the central segments, such as segment "c" according to FIG. 9, has been eliminated, to avoid overheating of the heat sensitive subarea adjacent to the oil lubrication hole. In a corresponding manner, FIGS. 18A-18C illustrate the energy distribution and the scanning pattern when the effective laser spot is about to leave the area adjacent to the oil lubrication hole, that is, at a position such as the one illustrated in FIG. 12C.

With this configuration and applying a laser beam providing a laser spot with a diameter of 3.4 mm on journals of low carbon (0.40%) steel (type 1538MV), an effective case depth (hardness>HRC45) of 2.5 mm was achieved, with a 1 mm layer of pure martensite. The power of the laser beam was 2700 W, and the journal was a main journal with a width of 21 mm. Very similar results were also obtained when hardening a surface of a rod journal having a width of 19 mm, using substantially the same set-up and values, except that the power of the laser beam was set to 2400 W and the width of the scanning pattern was reduced to 14 mm. In both cases, the effective laser spot moved along the surface, in the circumferential direction, with a velocity of 168 mm/minute.

The scanning pattern was applied with its center offset with regard to the center of the journal being hardened, in line with what is suggested in FIG. 7A: the offset (in a direction perpendicular to the plane including the laser source and the longitudinal center axis of the journal) was 31 mm for the main journal having a radius of 34.45 mm, and 25.2 mm for the rod journal having a radius of 28.45 mm. Due to the offset, the total area of the effective laser spot as projected onto the journal was larger than what it would have been if projected without offset.

Reference numbers used in the present description:
1 laser source
2 laser beam
2' s-polarized laser beam
2" p-polarized laser beam
2A path scanned by the laser beam, or area scanned by the laser beam
2B path scanned by the laser beam, or area scanned by the laser beam
2C path scanned by the laser beam, or area scanned by the laser beam
2D path scanned by the laser beam, or area scanned by the laser beam
2E portion of a virtual rectangular laser spot with higher power density
2F portion of a virtual rectangular laser spot with lower power density
2G scanning pattern; path scanned by the laser beam
2H portion of an effective laser spot with power density adapted for hardening
2I portion of an effective laser spot with power density adapted for quenching
2J portion of an effective laser spot with power density adapted for tempering
3 scanning system
4 polarization system
5 effective laser spot
5A, 5B energy distribution around an inclined oil lubrication hole
11 laser carriage
12 first laser carriage drive means for vertical movement of the laser source
13 second laser carriage drive means for horizontal movement of the laser source
14 horizontal track for movement of laser source
20 workpiece carriage
21 workpiece carriage drive means
41 polarizer
42 mirror
43 mirror
44 mirror
51 lines of a scanning pattern
51A "on" segments or pixels
51B "off" segments or pixels
100 computer system
101 computer input means
102 computer screen
110 first computer memory area
111 scanning pattern segment column
112 scanning speed column
113 beam power column
114 spot size column
120 second computer memory area
121 scanning pattern segment column
122 scanning speed column
123 beam power column
124 spot size column
130 pointer
140 first computer memory area
141 memory location for storing pixel value (on/off)
150 second computer memory area
151 memory location for storing pixel value (on/off)
1000 crankshaft
1001 main journal
1001A heated/hardened annular segment of the surface of a main journal
1001B previously hardened portion of a journal
1002 rod journal
1003 oil lubrication holes
1003A, 1003B portions of the journal at the sides of the opening of an oil lubrication hole
1004 fillets
1005 surface perpendicular to the journals
1006 area or section that can be scanned by the laser beam
a, b, c, d, e, f, g, h segments of scanning pattern
A, B, C, D, E, F, G, H speed indicators
$\alpha, \beta, \gamma, \gamma_1, \gamma_2$ angles referred to in the description
X, Y, Z directions in space
W the circumferential direction
d1-d12: indicators of different dimensions of a scanning pattern, in mm
v1-v11: indicators of scanning speed in correspondence with different segments of a scanning pattern, in mm/s In the present document, the term "effective laser spot" refers to an area onto which a laser beam is effectively projected so as to illuminate and heat the area. The effective laser spot can be a laser spot obtained by transforming an original laser beam using optics so as to shape the laser spot and so as to distribute the power over the effective laser spot in a desired manner, or a virtual or equivalent laser spot obtained by rapidly and repetitively scanning the laser beam following a scanning pattern so as to repetitively apply the laser beam to the same area or to substantially the same area, so that the heating effect of the laser beam is substantially the same as it would have been if a stationary laser beam had been used having a power distribution corresponding to the power distribution across the virtual or equivalent laser spot during one scanning cycle. Here, the term "rapidly" means that the scanning speed is much larger than the speed of the relative movement between laser source and the surface of the crankshaft, for example, in the circumferential direction, so that portions of the surface area to be hardened are repetitively heated by the laser spot. For example, typically, the scanning speed can be selected so that, for example, at least 10, 50 or 100 scanning cycles per second are achieved. Preferably, when the effective laser spot is a virtual or equivalent laser spot obtained by repetitive scanning an actual or real laser spot over the surface area to be hardened, this scanning preferably takes place in two dimensions, and the size of the virtual laser spot in any of said dimensions is preferably at least 2, 3, 4, 5, 10, 20 or more times the size of the actual or real laser spot in said dimension, for example, in the direction parallel with an axis or rotation of a crankshaft and in the circumferential direction of a journal of the crankshaft. The term scanning is preferably intended to imply movement of the laser beam, and the scanning pattern is preferably intended to refer to the pattern that the beam would follow on a stationary surface, that is, without taking into account the relative movement between the laser source and the surface of the workpiece.

Generally, the growth of the treated area or segment is achieved by a relative movement between the effective laser spot and the surface to be hardened, by moving the effective laser spot and said surface in relation to each other, for example, in the case of a crankshaft, by rotating the crankshaft. In order to achieve a sufficient hardening depth, for example, a case hardening depth of 1000 μm or more, it is preferred that substantially each portion of the surface area to be hardened remain within the area of the effective laser spot for a sufficient amount of time, such as typically, for example in the case of crankshaft journals, 0.5-5 seconds, such as 1-3 seconds, so that not only the surface temperature will be high enough, but so that the workpiece is heated sufficiently up to the required depth. Increasing the power density of the laser beam is not a substitute for sufficient heating time, as the surface area should not be overheated, as this could cause damage to the workpiece. Thus, the surface temperature should be within an adequate range for a sufficient time. Therefore, a substantial size of the effective laser spot is desired, in one dimension so as to provide for a sufficient width of the hardening track (for example, so as to cover substantially the entire width of a journal of a crankshaft), and in another dimension so as to allow for a high relative speed between the effective laser spot and the surface to be treated (thus providing for a high production rate), while allowing the portions to be hardened to remain for sufficient time within the effective laser spot so as to achieve the desired or required hardening depth.

In the present document, the term "crankshaft" preferably refers to the part of an engine that translates reciprocating linear piston motion into rotation, for example, to the kind of crankshaft that is used in internal combustion engines, such as those used in many types of motor vehicles, such as trucks, automobiles and motorcycles.

In the present document, hardening depth preferably refers to the effective case depth, which preferably refers to the distance perpendicularly from the surface of the hardened case to the furthest point where a specified level of hardness is maintained. Said level can be in the range of, for example, 40-55 HRC, preferably 45 HRC. In the field of crankshafts, desired levels of hardness are generally decided taking into account the carbon content of the steel, but a typical level is 45 HRC. In the context of the present document and in what regards the hardening of journals of a crankshaft, a hardening depth of at least 1000, 2000 or 3000 μm is preferred.

Another aspect of interest can be the level or depth until which 100% transformed martensite can be observed. In the context of the present document and in what regards the hardening of journals of a crankshaft, this depth can preferably be at least 200, 300, 500, 800, 1000 μm or more.

When a segmented scanning pattern is used, a scanning speed of at least 300 segments per second can be preferred, whereas speeds of, for example, at least 600, 1000, 5000 and 10000 segments per second can be more preferred, preferably in combination with scanning pattern repetition frequencies of at least 10 Hz, more preferably at least 50 Hz, even more preferably at least 100 Hz or 200 Hz.

While the present invention has been described with several references to the surface hardening of crankshafts, the scope of the invention is by no means limited to the surface treatment of crankshafts.

In this text, the term "comprises" and its derivations (such as "comprising", etc.) should not be understood in an excluding sense, that is, these terms should not be interpreted as excluding the possibility that what is described and defined may include further elements, steps, etc.

On the other hand, the invention is obviously not limited to the specific embodiment(s) described herein, but also encompasses any variations that may be considered by any person skilled in the art (for example, as regards the choice of materials, dimensions, components, configuration, etc.), within the general scope of the invention as defined in the claims.

The invention claimed is:

1. Method of laser hardening of a surface of a journal of a crankshaft, said journal comprising a surface area to be hardened, said surface area extending in a first direction parallel with an axis of rotation of the crankshaft and in a second direction corresponding to a circumferential direction of the journal, said surface area comprising at least one more heat sensitive subarea and at least one less heat sensitive subarea, said at least one more heat sensitive subarea including an area adjacent to an oil lubrication hole of the crankshaft, the method comprising:
projecting a laser beam from a laser source onto said surface area, so as to produce an effective laser spot on said surface area, the effective laser spot being formed by scanning the laser beam on said surface area such that the effective laser spot defines a region having a shape larger than the laser beam on said surface area, said effective laser spot extending, in said first direction, across the major part of said surface area to be hardened, wherein the effective laser spot extends, in said first direction across more than 50% of the surface of the journal;
moving the surface of the crankshaft in said circumferential direction relative to the laser source, so as to subsequently project the effective laser spot onto different portions of said surface area in the circumferential direction;
said effective laser spot featuring a two-dimensional energy distribution operative to induce hardening of the surface;
wherein the method comprises dynamically adapting while moving the surface of the crankshaft in said circumferential direction said energy distribution so that said energy distribution is different in said less heat sensitive subarea than in said more heat sensitive subarea including the area adjacent to an oil lubrication hole, so as to avoid overheating of said area adjacent to an oil lubrication hole.

2. Method according to claim 1, wherein during at least 50% of the time of application of the effective laser spot onto the surface area, the effective laser spot has a width in the circumferential direction of at least 5 mm.

3. Method according to claim 1, wherein said effective laser spot is an equivalent laser spot obtained by scanning the laser beam in the first direction and in the second direction, repetitively following a scanning pattern along which a laser spot induced by the laser beam is moved with a scanning speed, so that the two-dimensional energy distribution during a scanning cycle is determined by said scanning speed, said scanning pattern, size of the laser spot, power of the laser beam and power distribution within the laser beam.

4. Method according to claim 3, wherein adaptation of the energy distribution is carried out by adapting at least one of said
- scanning speed,
- scanning pattern,
- size of the laser spot,
- power of the laser beam and
- power distribution within the laser beam,
- so that said energy distribution is different when heating said less heat sensitive subarea than when heating said more heat sensitive subarea including the area adjacent to an oil lubrication hole, so as to avoid overheating of said area adjacent to an oil lubrication hole.

5. Method according to claim 4, wherein adaptation of the energy distribution is carried out by adapting the power of the laser beam, for example, by turning the laser beam on and off during scanning of the laser spot along the scanning pattern.

6. Method according to claim 3, wherein the energy distribution is controlled by selectively adapting the power of the laser beam during scanning of the laser spot along the scanning pattern, so as to selectively set the laser beam into one of a plurality of available power states at least 300 times per second.

7. Method according to claim 6, wherein said scanning pattern comprises a plurality of segments, each segment of said plurality of segments having one of said available power states assigned to it, and wherein the power state assigned to at least one of said segments is different during heating of said less heat sensitive subarea than during heating of said more heat sensitive subarea including the area adjacent to an oil lubrication hole.

8. Method according to claim 4, wherein adaptation of the energy distribution is carried out by changing the scanning speed during scanning of the laser spot along the scanning pattern.

9. Method according to claim 3, wherein the scanning is carried out at a scanning speed sufficiently high so that the temperature oscillations at points within said effective laser spot have an amplitude of less than 200° C.

10. Method according to claim 1, wherein the energy distribution in said effective laser spot is such that more energy is applied towards the ends of the effective laser spot in said first direction, than towards the center of said effective laser spot in said first direction.

11. Method according to claim 1, wherein said energy distribution features a higher energy density at a leading portion of said effective laser spot than at a trailing portion of said effective laser spot, such that an area swept by the effective laser spot is first receiving laser irradiation with higher average power and is subsequently receiving laser irradiation with lower average power.

12. Method according to claim 1, comprising the step of applying the effective laser spot to said surface area on both sides of an oil lubrication hole in said first direction, said oil lubrication hole extending inwards in an inclined manner so that it does not extend under a first one of said sides but under a second one of said sides, wherein the effective laser spot is adapted to apply more energy onto the first one of said sides than onto the second one of said sides.

13. Method according to claim 1, wherein the effective laser spot has a first shape in said less heat sensitive subarea, and is adapted to have substantially a U shape when arriving at an oil lubrication hole, and to have substantially an inverted U shape when leaving said oil lubrication hole, or vice-versa, and wherein said first shape optionally is a substantially rectangular or triangular shape.

14. Method according to claim 1, wherein the effective laser spot is projected onto said journal in an off-centered manner so that the laser beam impinges on the surface at an angle of less than 90 degrees relative to the surface.

15. Method of laser hardening of a surface of a workpiece, the workpiece comprising at least one surface area to be hardened, said surface area comprising at least one more heat sensitive subarea and at least one less heat sensitive subarea, the method comprising:
- projecting a laser beam from a laser source onto said surface area, so as to produce a laser spot on said area;
- generating a relative movement between the surface of the workpiece and the laser source, thereby subsequently projecting the laser spot onto different portions of said surface area;
- during said relative movement, repetitively scanning the laser beam across the respective portion of said surface area in two dimensions so as to produce a two-dimensional equivalent effective laser spot on said surface area, said effective laser spot having an energy distribution that is operative to induce hardening of the surface;
- wherein said energy distribution is dynamically adapted so that it is different in a more heat sensitive subarea than in a less heat sensitive subarea, so as to prevent overheating of said more heat sensitive subarea.

16. Method according to claim 15, comprising scanning the laser beam along a scanning pattern within said effective laser spot and modifying the power of the laser beam along said scanning pattern so as to obtain said energy distribution, optionally by turning the laser beam on and off along said scanning pattern.

17. Method according to claim 15, wherein the energy distribution is controlled by selectively adapting the power of the laser beam during scanning of the laser beam along the scanning pattern, so as to selectively set the laser beam into one of a plurality of available power states at least 300 times per second, more preferably at least 600 times per second, more preferably at least 1,000 times per second, more preferably at least 5,000 times per second, and even more preferably at least 10,000 times per second.

18. Method according to claim 17, wherein said scanning pattern comprises a plurality of segments, each of said segments having one of said available power states assigned to it, and wherein the power state assigned to at least one of said segments is different in said less heat sensitive subarea than in said more heat sensitive subarea.

19. Method according to claim 15, comprising the step of using a different scanning pattern for the laser beam within said effective laser spot, in said more heat sensitive subarea compared to in said less heat sensitive subarea.

20. Method according to claim 15, comprising the step of adapting said energy distribution by adapting the scanning speed so that it is different in at least part of said effective laser spot, in said more heat sensitive subarea compared to in said less heat sensitive subarea.

21. Method according to claim 15, wherein said effective laser spot comprises a leading portion with an energy distribution and density selected for heating a surface portion of the workpiece to a hardening temperature, an intermediate portion with an energy distribution and density selected so as to allow for cooling down of a heated surface portion for quenching, and a trailing portion having an energy distribution and density selected for heating the quenched portion so as to produce tempering thereof.

22. Method according to claim 15, wherein the effective laser spot is established by repetitively scanning the laser beam over the workpiece following a pattern comprising a plurality of lines, wherein said lines are preferably substantially parallel, and wherein the scanning is repeated with a scanning frequency, and wherein each of said plurality of lines comprises a plurality of segments, the method comprising assigning a predetermined laser beam power value to each of said segments so as to selectively set the output power of the laser beam to a different level at some of said segments than at other of said segments.

23. Method according to claim 22, wherein the scanning frequency is at least 50 Hz, preferably at least 100 Hz, wherein said plurality of lines comprises at least two lines, preferably at least 3 lines, more preferably at least 4 lines, such as 5-10 lines, and wherein each line comprises at least 3 segments, preferably at least 5 segments, and more preferably at least 10 segments, such as 10-20 segments.

24. Method according to claim 15, wherein scanning the laser beam is carried out so that the laser spot repetitively follows a scanning pattern comprising a plurality of segments, and wherein at least one parameter value influencing said two-dimensional energy distribution is associated with each of said segments, and wherein said at least one parameter value is dynamically adapted during operation so that said at least one parameter value is different for at least one of said segments when the effective laser spot is heating said more heat sensitive subarea than when heating said less heat sensitive subarea.

25. Method according to claim 24, wherein said at least one parameter value is indicative of at least one of scanning speed, size of the laser spot, power of the laser beam, power distribution within the laser beam, length of the corresponding segment and orientation of the corresponding segment.

26. Method according to claim 24, wherein said at least one parameter value is indicative of power of the laser beam in correspondence with said segment.

27. Method according to claim 24, comprising the step of storing, for each segment, the corresponding at least one parameter value in a memory, wherein for at least one segment at least two different parameter values are stored in said memory, a first one to be used when heating said less heat sensitive subarea and a second one to be applied when heating said more heat sensitive subarea.

28. Method according to claim 24, wherein the scanning is carried out at an average speed of at least 300 segments per second.

29. Method according to claim 15, comprising the step of reducing the energy density at a leading portion of the effective laser spot when the effective laser spot is arriving at a previously hardened portion of said surface area, such as at a previously hardened portion of a journal of a crankshaft hardened by displacing the effective laser spot around the journal in a circumferential direction.

30. Method according to claim 15, comprising the step of, when the effective laser spot is arriving at a previously hardened portion of said surface area, such as at a previously hardened portion of a journal of a crankshaft hardened by displacing the effective laser spot around the journal in a circumferential direction, interrupting the movement of said effective laser spot at a leading portion of said effective laser spot, whereas a trailing portion of said effective laser spot continues to move in said circumferential direction, thereby progressively reducing the size of said effective laser spot in said circumferential direction, until said effective laser spot vanishes.

31. Method according to claim 15,
wherein the scanning is performed so that the laser spot follows a scanning pattern on the surface area,
wherein at least one of
(i) a scanning speed; and/or
(ii) a laser beam power; and/or
(iii) a laser spot size;
is different in one part of the scanning pattern than in another part of the scanning pattern, so as to avoid overheating of the workpiece in the more heat sensitive subarea.

32. Method according to claim 31, wherein said scanning pattern comprises a plurality of segments, and wherein, to each of said segments, there is assigned
(i) a scanning speed; and/or
(ii) a laser beam power; and/or
(iii) a laser spot size;
whereby at least one of said scanning speed, laser beam power, and laser spot size is selected differently in relation to at least one of said segments compared to at least another of said segments.

33. Method according to claim 32, wherein the scanning speed is selected to be higher in a segment that is closer to a more heat sensitive subarea than in two adjacent segments that are further away from said heat sensitive subarea.

34. Method according to claim 32, wherein the laser beam power is selected to be lower in a segment that is closer to a more heat sensitive subarea than in two adjacent segments that are further away from said heat sensitive subarea.

35. Method according to claim 32, wherein the laser spot is selected to have a larger area in a segment that is closer to a more heat sensitive subarea than in two adjacent segments that are further away from said heat sensitive subarea.

36. Method according to claim 32, wherein the
(i) scanning speed; and/or
(ii) laser beam power; and/or
(iii) laser spot size;
assigned to one or more of the segments is modified at least once while the surface of the workpiece is moving in relation to the laser source.

37. Method according to claim 32, comprising the step of programming an electronic control means for controlling the laser beam by assigning, to each of said segments,
(i) at least one scanning speed; and/or
(ii) at least one laser beam power; and/or
(iii) at least one laser spot size.

38. Method according to claim 31, wherein the scanning pattern has a geometrical shape, wherein said geometrical shape of the scanning pattern is modified at least once while the surface of the workpiece is moving in relation to the laser source.

39. Method according to claim 15,
wherein the scanning is performed so that the laser spot follows a scanning pattern on the area, the scanning pattern having a geometrical configuration,
wherein
the geometrical configuration of the scanning pattern is modified at least once during the relative movement between the surface area and the laser source.

40. Method according to claim 15, the method comprising modulating the laser beam, wherein
the laser beam is modulated differently when the laser spot is in said more heat sensitive subarea than when it is in said less heat sensitive subarea, so as to prevent overheating of a respective portion of the workpiece; wherein A—the laser beam is modulated in power;
and/or
B—the laser beam is modulated in scanning speed;
and/or
C—the laser beam is modulated in its scanning pattern so that the laser spot beam follows a different scanning pattern in correspondence with said more heat sensitive subarea than in correspondence with said less heat sensitive subarea;
and/or
D—the laser beam is modulated in its laser spot size so that the laser spot size is different in correspondence with said more heat sensitive subarea than in correspondence with said less heat sensitive subarea.

41. Method according to claim 15, wherein a portion of the surface of the workpiece that enters an area swept by the laser beam first receives laser irradiation with a higher average power and subsequently receives laser irradiation with a lower average power.

42. Method according to claim 15, wherein producing a relative movement between the workpiece and the laser source includes rotating the workpiece around an axis of rotation, so that the laser light spot can access the entire circumference of the surface area to be hardened.

43. Method according to claim 42, wherein producing a relative movement between the workpiece and the laser source includes producing a relative movement in a first direction perpendicular to said axis of rotation and in a second direction perpendicular to said axis of rotation, wherein the movement in said first direction is produced by displacing the workpiece, and wherein the movement in the second direction is produced by displacing the laser source, and wherein, optionally, the laser source is movable in parallel with said axis of rotation.

44. Method according to claim 15, wherein the workpiece is a crankshaft with a plurality of oil lubrication holes.

45. Method according to claim 1, the crankshaft comprising main journals, rod journals and oil lubrication holes, wherein said relative movement is produced by rotating said crankshaft;
wherein
during rotation of said crankshaft, the laser beam is scanned across at least a portion of the surface of the journal, in accordance with a predetermined scanning pattern, so as to heat the surface,
and wherein
the scanning is performed so as to apply less energy to more heat sensitive subareas than to less heat sensitive subareas of said surface.

46. Method according to claim 45, wherein the scanning is performed maintaining the power of the laser beam substantially constant, and adapting the scanning speed and/or the scanning pattern so as to apply less energy to more heat sensitive subareas than to less heat sensitive subareas of said surface.

47. Method according to claim 45, wherein the scanning is performed maintaining the scanning pattern substantially constant, and adapting the scanning speed and/or the beam power so as to apply less energy to more heat sensitive subareas than to less heat sensitive subareas of said surface, for example, by dynamically adapting on-off state of the laser beam in correspondence to segments of the scanning pattern.

48. Method according to claim 45, wherein said scanning pattern comprises a plurality of segments, and wherein a beam power state is assigned to each of said segments in order to set the power of the laser beam, in correspondence with each segment, to a power level corresponding to said power state, and wherein the laser is arranged to change the power of the laser beam as required by said beam power states, and wherein the scanning takes place at a rate of at least 300 segments per second, preferably at least 600 segments per second, more preferably at least 1,000 segments per second, more preferably at least 5,000 segments per second, and even more preferably at least 10,000 segments per second, wherein the scanning pattern is repeated with a frequency of at least 10 Hz, preferably at least 50 Hz, more preferably at least 100 Hz, and wherein the power state assigned to at least one of said segments is different in correspondence with said more heat sensitive subarea than in correspondence with said less heat sensitive subarea.

49. Method according to claim 45, wherein the more heat sensitive subareas include areas adjacent to the oil lubrication holes and, optionally, areas adjacent to fillets at the axial ends of journals of the crankshaft.

50. Method according to claim 15, wherein said laser source comprises a fiber laser.

51. System for hardening at least part of the surface of a workpiece, the system comprising a laser source and means for generating relative movement between a surface of the workpiece and the laser source, the system further comprising electronic control means for controlling operation of the system,
wherein
the electronic control means are arranged for operating the system so as to carry out a method according to claim 15.

52. Computer program, comprising program instructions for carrying out the method of claim 15, when executed in a system for hardening at least part of the surface of a workpiece, the system comprising a laser source and means for generating relative movement between a surface of the workpiece and the laser source, the system further comprising electronic control means for controlling operation of the system, wherein the electronic control means are arranged for operating the system so as to carry out the method.

53. Information carrier storing the computer program according to claim 52.

54. Crankshaft comprising a plurality of journals, at least one of said journals having a surface that has been hardened by a method according to claim 1.

55. Method according to claim 1, wherein the surface area to be hardened is the general surface of the journal.

56. Method according to claim 1, wherein the effective laser spot extends, in said first direction, across more than 75% of the journal.

57. Method according to claim 44, wherein said at least one surface area to be hardened is the general surface of a journal of the crankshaft.

58. Method according to claim 44, wherein the effective laser spot extends across more than 50% of a journal of the crankshaft, preferably across more than 75% of the journal, in a direction parallel with a longitudinal direction of the crankshaft.

59. Method according to claim 15, wherein the scanning is performed maintaining the power of the laser beam substantially constantly, and adapting the scanning speed and/or the scanning pattern so as to apply less energy to more heat sensitive subareas than to less heat sensitive subareas of said surface.

\* \* \* \* \*